US008314585B2

(12) United States Patent
Baker

(10) Patent No.: US 8,314,585 B2
(45) Date of Patent: Nov. 20, 2012

(54) METHODS AND SYSTEMS FOR ELIMINATING STRUCTURAL MODES IN A SERVO MECHANISM EMPLOYED TO CONTROL A FLEXIBLE STRUCTURE

(75) Inventor: Edward Baker, Longwood, FL (US)

(73) Assignee: DRS RSTA, Inc., Dallas, TX (US)

( * ) Notice: Subject to any disclaimer, the term of this patent is extended or adjusted under 35 U.S.C. 154(b) by 223 days.

(21) Appl. No.: 12/891,314

(22) Filed: Sep. 27, 2010

(65) Prior Publication Data

US 2011/0074332 A1 Mar. 31, 2011

Related U.S. Application Data

(60) Provisional application No. 61/245,952, filed on Sep. 25, 2009.

(51) Int. Cl.
*G05D 23/275* (2006.01)

(52) U.S. Cl. .............. 318/632; 188/266.77; 188/378; 188/379; 248/550; 248/636; 267/136; 267/140.14; 73/496; 73/504.12; 73/514.35; 331/35; 331/156; 331/176

(58) Field of Classification Search ........... 318/266.7, 318/378, 379; 248/550, 636; 267/136, 140.14; 700/42, 280; 331/35, 156, 176; 355/52, 355/53; 73/496, 504.12, 514.35
See application file for complete search history.

(56) References Cited

U.S. PATENT DOCUMENTS

| 5,783,973 | A * | 7/1998 | Weinberg et al. ........... 331/35 |
| 5,823,307 | A * | 10/1998 | Schubert et al. ........... 188/378 |
| 2007/0227247 | A1 * | 10/2007 | Weber ........................ 73/496 |
| 2008/0271532 | A1 * | 11/2008 | Platt et al. ............... 73/504.12 |
| 2009/0255336 | A1 * | 10/2009 | Horning et al. .......... 73/504.12 |

* cited by examiner

*Primary Examiner* — Bentsu Ro
*Assistant Examiner* — Jorge Carrasquillo
(74) *Attorney, Agent, or Firm* — Don J. Pelto, Esquire; Sheppard, Mullin, Richter & Hampton LLP

(57) ABSTRACT

A servo system is provided for controlling movement of a flexible structure having multiple masses and elements. Each element couples a respective two of the masses and functions as a spring when the flexible structure is subject to a linear or rotational input at or above a frequency at which the respective element exhibits flexure. The servo system includes multiple sensors, where each sensor is disposed relative to a respective one of the masses to sense a respective acceleration. A motor having a torque input may operatively be configured to output one of a linear or rotational force on the first mass based on a torque signal present on the torque input. A servo controller that receives each sensed acceleration from each sensor may generate a compensation feedback signal based on a sum of sensed accelerations. The torque signal may be output to the motor based on the compensation feedback signal.

10 Claims, 43 Drawing Sheets

Structural Transfer Function - Mass 1

Structural Transfer Function - Mass 2

Structural Transfer Function - Mass 3

Structural Transfer Function - Mass 4

Structural Transfer Function - Four Sensors

Open Loop - Four Sensors

Closed Loop - Four Sensors

Torque Disturbance Rejection Ratio without Acceleration Feedback

Torque Disturbance Rejection Ratio with Acceleration Feedback

Open Loop without Notch Filters - Single Sensors

Open Loop with Notch Filters - Single Sensor

Closed Loop with Notch Filters - Single Sensor

Torque Disturbance Rejection Ratio with Notch Filter

Open Loop Phase Stabilized - Single Sensor

Closed Loop Phase Stabilized - Single Sensor

Torque Disturbance Rejection Ratio - Phase Stabilized

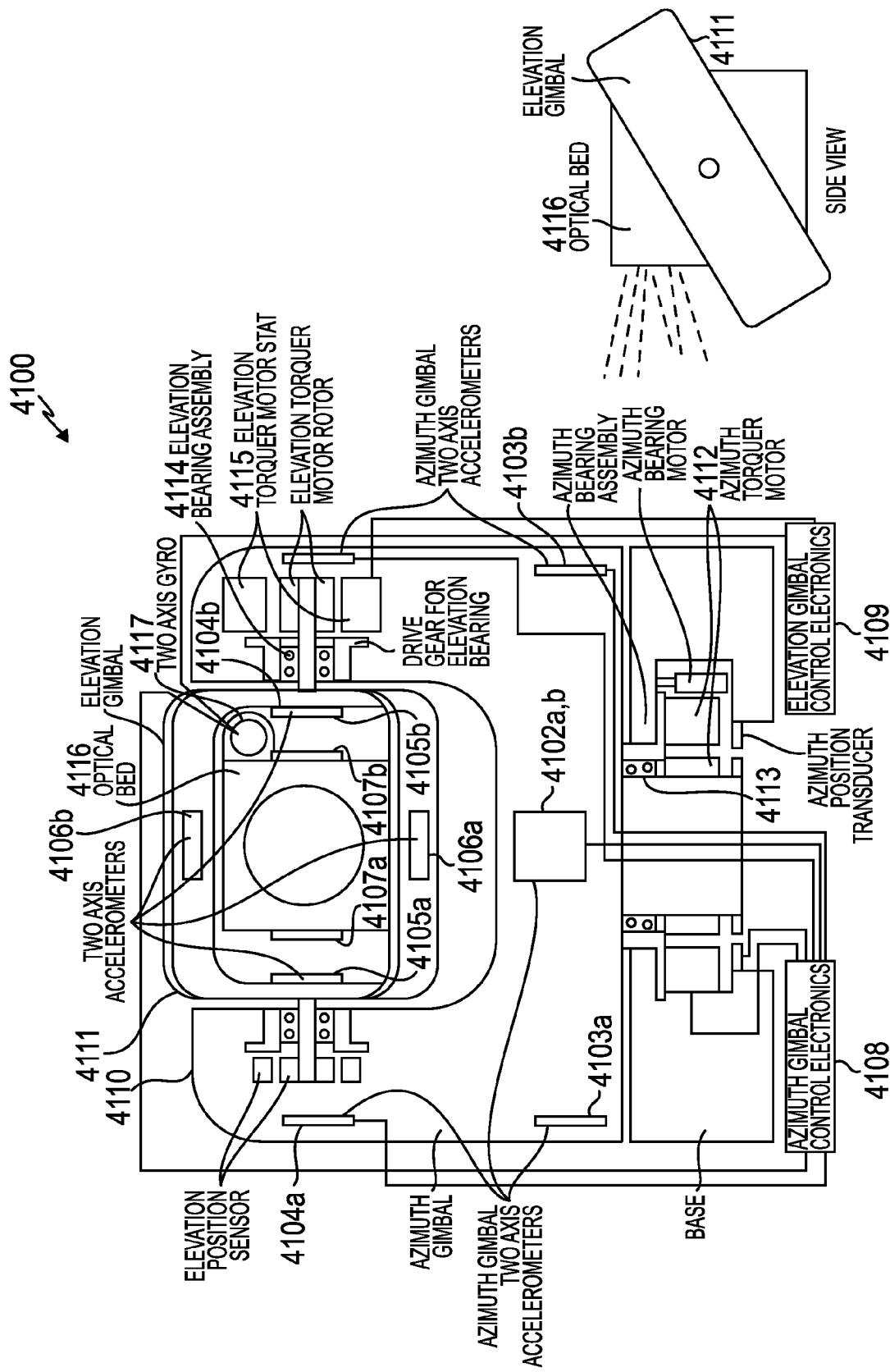
Figure 41 Two Axis Gimbal used for NASTRAN Analysis

METHODS AND SYSTEMS FOR ELIMINATING STRUCTURAL MODES IN A SERVO MECHANISM EMPLOYED TO CONTROL A FLEXIBLE STRUCTURE

CROSS-REFERENCE TO RELATED APPLICATIONS

This Application for Letters Patent claims priority to co-pending U.S. Provisional Patent Application 61/245,952 filed Sep. 25, 2009, the entire contents of which are herein incorporated by reference in their entirety.

BACKGROUND OF THE INVENTION

The present invention relates to a servo system used to control movement of a flexible structure, such as stabilizing a roller driven by a motor via a gear box or stabilizing one or more axis of a gimbaled platform. More particularly, the present invention relates to methods and systems for eliminating structural modes in a servo mechanism employed to control a flexible structure, using multiple accelerometers to collectively effectively sense the structural modes and compensating for the sensed structural modes in the servo mechanism.

Flexible structures, in general, cause problems with stability for servo mechanisms or controllers. Typically, such a flexible structure is comprised of at least two masses and at least one spring like element where each spring element couples every two masses. Each spring element functions as a spring when the flexible structure is subject to a linear or rotational input or disturbance at or above a particular disturbance frequency (e.g., the frequency at which the spring element exhibits flexure). The effect of the spring, however, may be a gradual one until the resonant frequency is reached. Typically, the effect of the spring below the resonant frequency is quite small. In one example of a flexible structure, a motor attached to and driving a shaft to rotate or linearly adjust the position of a mirror attached to the shaft may be collectively characterized as a flexible structure. In this example, the motor and the mirror function as respective rigid masses while the shaft may function as a torsion spring at a particular drive frequency and contribute to a resonance of this flexible structure. Another example of a flexible element is a motor that is attached to a gearbox that is attached to a roller for a press, rolling mill, or other machine. In this example, the motor and the roller function as the two masses while the gear box function as a torsion spring at a particular drive frequency. Likewise, in a gimbal system, a torquer motor attached to a shaft for driving a gimbal attached to a platform mount may be collectively viewed as a flexible structure. In this example, the torquer motor and gimbal may be viewed as two masses and the shaft may function as a torsion spring at a particular drive or disturbance frequency. In fact, certain components of a gimbal system (such as the yoke forming an azimuth gimbal) may appear to be continuously formed of one or more materials that act as a rigid body at low linear or rotational input frequencies (such as inputs from an the azimuth gimbal motor) but at high input frequencies act as a flexible structure with separate masses coupled by a respective torsion spring element. For example, the yoke of an azimuth gimbal may have a lower portion corresponding to a first mass, the ends of the arms of the azimuth gimbal yoke (which are typically pivotally attached to elevation gimbal) may correspond to a second mass, and the arms of the azimuth gimbal yoke below the yoke ends may function as a spring element at high drive input frequencies from the azimuth gimbal motor.

There are many papers in published trade literature and many patents that have been issued concerning the control of flexible structures. However, a search of the literature and patents does not reveal any fundamental system or method for controlling a flexible structure.

The primary measure of performance for a gimbal used to stabilize optics mounted on a platform or bed attached to the gimbal is jitter or movement of the line of sight (LOS) of the optics when the gimbal is being vibrated due to one of several causes, including the structural deformation of the flexible structure comprising the gimbal and optical bed or platform. Historically, a stabilization servo controller and a rate sensor, such as a gyro, positioned on the gimbal have been used to stabilize the gimbal and, thus, the LOS of the optics. The servo controller uses the gyro signal as a feedback signal, and, by sending a signal to a power amplifier which controls a torquer motor, attempts to keep the LOS of the optical system stable. This approach has been used for many years but does not compensate for LOS jitter caused by flexible structure deformation.

The LOS jitter for a gimbal is reduced if the zero dB crossover frequency of the stabilization servo is increased, so the objective of the servo design is to have the zero dB crossover frequency as high as possible to minimize the jitter. The desire for having the zero dB crossover frequency as high as possible is a result of the desire to have the gain as high as possible. It is gain that reduces the LOS jitter. The zero dB crossover frequency is not the same as the bandwidth, but should be close to the −90 deg phase of the closed loop servo. Five factors limit the zero dB crossover frequency: The gimbal structure, the frequency response of the rate sensor (gyro, quartz rate sensor (QRS), etc.), the iteration rate of the servo controller (assuming it is a digital controller), the bandwidth of the power amplifier driving the torquer motor, and the noise of the rate sensor). All sensors have some noise, and this noise must not saturate the power amplifier driving the torquer motor.

The principles of the present invention deal with the problem of the deformation of the structure, which may be characterized as a flexible structure as noted above. Historically, structural modes have been dealt with in several ways. The most common way is to limit the servo controller performance by having the 0 dB crossover frequency below the first structural mode at which the structure first exhibits flexure. This approach can severely limit the servo performance. Another common way is to use a notch filter and reduce the gain of the structural resonance. This allows the servo to have its 0 dB crossover closer to the structural resonance, but still limits the performance of the servo due to the phase loss of the notch filter. A third method, which is often used in aircraft and space craft autopilots, is to "phase stabilize" the structural deformation modes. However, a servo is not limited to just one crossover frequency. Multiple crossover frequencies are allowed as long as Nyquist's stability criteria are not violated. Phase stabilizing a servo has a very significant drawback in which the low frequency gain of the servo is limited by the stability requirements at the structural modes, and this limits the low frequency gain. High gain at low frequency is necessary to provide good LOS stabilization for a gimbal, good step response, low static and dynamic error, and good rejection of disturbances.

There is therefore a need for a servo system that overcomes the problems noted above and enables the realization of a method and a system for eliminating structural deformation modes in a servo mechanism or controller employed to control a flexible structure.

SUMMARY OF THE INVENTION

Systems, methods, and articles of manufacture consistent with the principles of the present invention provide a means for reducing the jitter caused by the deformation of a flexible structure controlled by a servo controller. A servo system consistent with the principles of the present invention employs a plurality of accelerometers to effectively sense accelerations associated with masses in the flexible structure coupled by one or more elements that each function as a spring when the flexible structure is subject to a linear or rotational input or disturbance at or above a frequency at which the respective element exhibits flexure. The servo system uses the sensed accelerations to enable the servo loop to be closed near or above the resonant disturbance frequency at which the structure exhibits flexure (i.e., a structural mode).

A servo system consistent with the principles of the present invention generates a feedback signal for stabilizing the flexible structure (e.g., a gimbal structure) that has had the response of the first several structural modes (at which the flexible structure exhibits flexure) eliminated from the feedback signal. Eliminating these modes from the feedback signal enables the gain of the servo controller to be increased while still maintaining good stability margins.

In one embodiment, in accordance with systems consistent with the present invention, a servo system is provided for controlling movement of a flexible structure having a plurality of masses and an element coupling two of the masses, where the element functions as a spring when the flexible structure is subject to a linear or rotational input at or above a first frequency at which the element exhibits flexure. The servo system may comprise a first sensor, a second sensor, a motor, and a servo controller. The first sensor is disposed relative to a first of the two masses of the flexible structure to sense a first acceleration of the first mass. The second sensor is disposed relative to a second of the two masses to sense a second acceleration of the second mass. The motor has a movement input (such as a rate, acceleration or torque input) and be operatively configured to output one of a linear or rotational force on the first mass based on a movement signal (such as a corresponding rate, acceleration or torque signal) present on the movement input. The servo controller is operatively configured to receive the first acceleration from the first sensor and the second acceleration from the second sensor, generate a compensation feedback signal based on the first and second accelerations, and output the movement signal to the movement input of the motor based on the compensation feedback signal.

The compensation feedback signal may be generated based on a sum of the first and second accelerations. In one implementation, the first mass has a first inertia and the second mass has a second inertia. The servo controller may include a first gain amplifier operatively configured to receive the first acceleration and generate a first weighted acceleration corresponding to the proportion of a first inertia and the sum of the first inertia and the second inertia. A second gain amplifier may operatively be configured to receive the second acceleration and generate a second weighted acceleration corresponding to the proportion of a second inertia and the sum of the first inertia and the second inertia. A summer may operatively be configured to receive each of the weighted accelerations and generate the compensation feedback signal based on the sum of each of the received weighted accelerations.

The servo controller may also include a first summer operatively configured to receive the compensation feedback signal and a movement command for the motor and to output the movement signal to the motor based on the difference of the movement command and the compensation feedback signal.

In one implementation, the first sensor is one of a first pair of sensors disposed relative to the first of the two masses and the second sensor is one of a second pair of sensors disposed relative to the second of the two masses. Each of the first pair of sensors senses a respective acceleration of the first mass, each of the second pair of sensors senses a respective acceleration of the second mass, and the servo controller generates the compensation feedback signal based on the accelerations sensed by the first pair of sensors and the accelerations sensed by the second pair of sensors. In this implementation, the first pair of sensors are spaced a first predetermined distance apart relative to the first mass, and the second pair of sensors are spaced a second predetermined distance apart relative to the second mass. The servo controller may generate a first collective acceleration based on a difference between the first and other accelerations sensed by the first pair of sensors divided by the first predetermined distance. The servo controller may generate a second collective acceleration based on a difference between the second and other accelerations sensed by the second pair of sensors divided by the second predetermined distance. The servo controller may generate the compensation feedback signal based on the sum of the first collective acceleration and the second collective acceleration.

In another embodiment, in accordance with systems consistent with the present invention, a servo system is provided for controlling movement of a flexible structure having a plurality of masses and a plurality of elements, where each element couples a respective two of the masses and functions as a spring when the flexible structure is subject to a linear or rotational input at or above a corresponding input frequency at which the respective element exhibits flexure. In this embodiment, the servo system includes multiple sensors, where each sensor is disposed relative to a respective one of the masses to sense an acceleration of the mass. A motor having a torque input may be operatively configured to output one of a linear or rotational force on the first mass based on a torque signal present on the torque input. A servo controller may operatively be configured to receive each sensed acceleration from each sensor and generate a compensation feedback signal based on a sum of sensed accelerations, and output the torque signal to the torque input of the motor based on the compensation feedback signal.

In accordance with systems consistent with the present invention, a method is provided for controlling movement of a flexible structure having a plurality of masses and an element coupling two of the masses. The element functions as a spring when the flexible structure is subject to a linear or rotational input at or above a first frequency at which the element exhibits flexure. The method comprises providing a first sensor disposed relative to a first of the two masses to sense a first acceleration of the first mass. A second sensor disposed relative to a second of the two masses to sense a second acceleration of the second mass may be provided. A motor having a movement input and operatively configured to output one of a linear or rotational force on the first mass based on a movement signal present on the movement input may also be provided. A compensation feedback signal may be generated based on the first and second accelerations. The movement signal may be output to the movement input of the motor based on the compensation feedback signal.

In one implementation of the method, the compensation feedback signal is generated based on a sum of the first acceleration and the second acceleration. In one embodiment of this implementation, the first mass has a first inertia and the second mass has a second inertia. In this implementation, the method further comprises generating a first weighted acceleration corresponding to the proportion of a first inertia and the sum of the first inertia and the second inertia. A second weighted acceleration corresponding to the proportion of a second inertia and the sum of the first inertia and the second inertia may be generated. The compensation feedback signal may be generated based on the sum of each of the received weighted accelerations.

In another implementation of the method, the providing of the first sensor may include providing the first sensor as one of a first pair of sensors disposed relative to the first of the two masses, where the other of the first pair of sensors senses another acceleration of the first mass. The providing of the second sensor may include providing the second sensor as one of a second pair of sensors disposed relative to the second of the two masses, where the other of the second pair of sensors senses another acceleration of the second mass. In this implementation, the compensation feedback signal may be generated based on the first and other accelerations sensed by the first pair of sensors and the second and other accelerations sensed by the second pair of sensors. In one embodiment of this implementation, the first pair of sensors are spaced a first predetermined distance apart relative to the first mass and the second pair of sensors are spaced a second predetermined distance apart relative to the second mass. In this embodiment, generating the compensation feedback signal may include (i) generating a first collective acceleration based on a difference between the first and other accelerations sensed by the first pair of sensors divided by the first predetermined distance, (ii) generating a second collective acceleration based on a difference between the second and other accelerations sensed by the second pair of sensors divided by the second predetermined distance, and (iii) generating the compensation feedback signal based on the sum of the first collective acceleration and the second collective acceleration.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate implementations of the present invention and, together with the description, serve to explain the advantages and principles of the invention. In the drawings:

FIG. 41 is a drawing of an illustrative two-axis gyro stabilized (see FIGS. 32-40) gimbal that was analyzed using NASTRAN to verify that this technique works for continuous structures having no distinct masses or inertias and no distinct springs;

DETAILED DESCRIPTION OF THE INVENTION

Reference will now be made in detail to implementations in accordance with methods, systems, and products consistent with the principles of the present invention as illustrated in the accompanying drawings.

Figure 1:
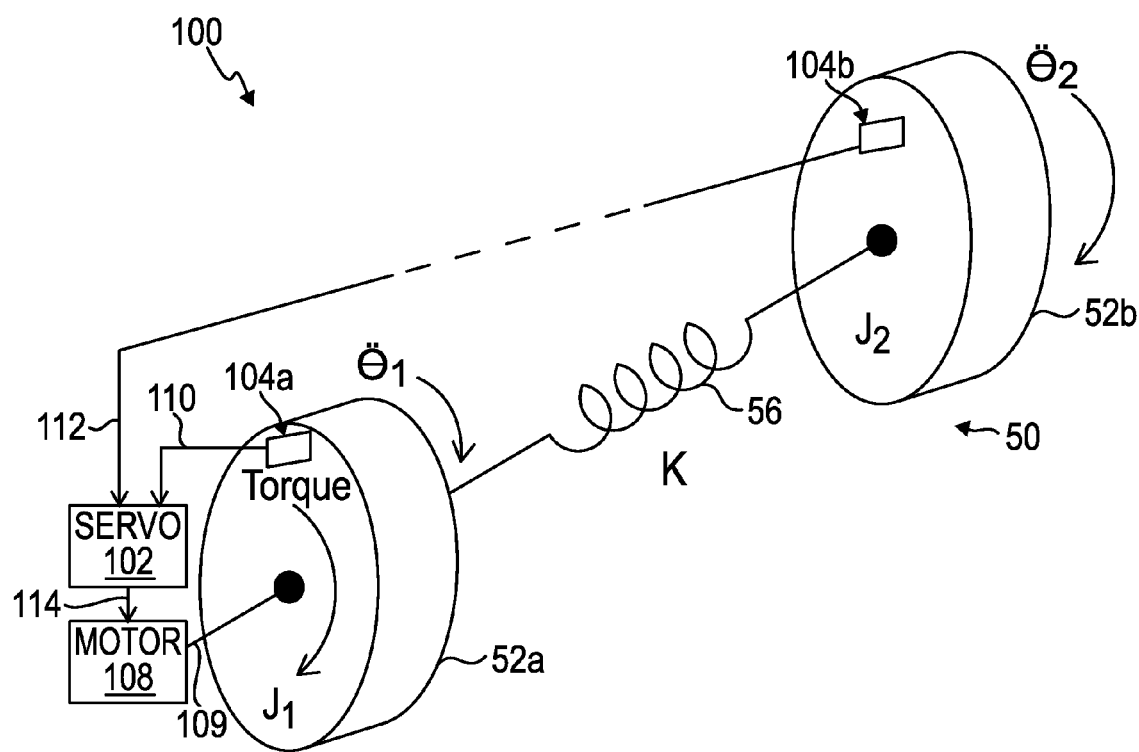
FIG. 1 is a block diagram view of a servo system consistent with the principles of the present invention, where the servo system includes a servo controller for controlling a flexible structure and two acceleration sensors disposed relative to respective masses of the flexible structure that are coupled by an element that functions as a spring when the flexible structure is subject to a linear or rotational input at or above a first frequency at which the element exhibits flexure.

FIG. 1 is a block diagram view of a servo system 100 consistent with the principles of the present invention. The servo system 100 includes a servo controller 102 for controlling a flexible structure 50 and two acceleration sensors 104a and 104b disposed relative to respective masses 52a and 52b of the flexible structure 50. The masses 52a and 52b are coupled by an element 56 that functions as a torsion spring when the flexible structure is subject to a linear or rotational input at or above a particular frequency from a rate or torquer motor 108 at which the element 56 exhibits flexure. The flexible structure 50 is characteristic of a simple model of a flexible structure 100 that may be controlled by a servo controller 102 using sensors 104a and 104b (such as commercially available accelerometers) to sense and compensate for structural mode deformations in the flexible structure 100 as further described herein. The flexible structure 50 may correspond to and model a motor (e.g., motor 108 in combination with mass 52a) that is attached to a gearbox (corresponding to spring element 56) that is attached to a roller (e.g., mass 52b) for a press, copier, or other machine. Alternatively, in a gimbal system, the flexible structure 50 may correspond to and model a torquer motor attached to a shaft (e.g., mass 52a) for driving a gimbal (spring element 56) attached to a platform or bed mount (e.g., mass 52b).

Each mass 52a and 52b has a respective moment of inertia about a shaft axis 109 of the motor 108. The spring element 56 has a weight that is negligible in comparison to the two masses 52a and 52b. When the motor 108 supplies a torque (referenced as the inertia $J_1$ of the first mass 52a) at low frequencies (e.g., less than 0.10 Hz for the flexible structure 50 in FIG. 1, and less than 20 Hz for the flexible structure 60 in FIG. 6) to the first mass 52a closest to the motor 108, the flexible structure 50 with the spring element 56 may function as a rigid body. When the torque applied to the first mass 52a of the flexible structure 50 is at or above a first or particular frequency at which the element 56 functions as a spring, the flexible structure 50 exhibits a deformation. When the input frequency is increased, the combination of the two masses 52a and 52b and the spring element 56 exhibit a resonant frequency (also referenced herein as a structural mode) corresponding to a peak in the torque versus angular acceleration transfer function plots discussed herein. As described in further detail below, the servo controller 102 effectively eliminates the structural mode (or resonant frequencies) from the servo controller 102 by generating a compensation feedback signal for adjusting the movement input 114 (e.g., rate or torque input) to the motor 108 based on accelerations 110 and 112 sensed by the accelerometer sensors 104a and 104b such that the servo controller is able to operate at higher bandwidths than would be possible without the principles of the present invention. The compensation feedback signal generated by the servo controller may also reduce the structural mode deformation of the flexible structure 50.

Figure 2:
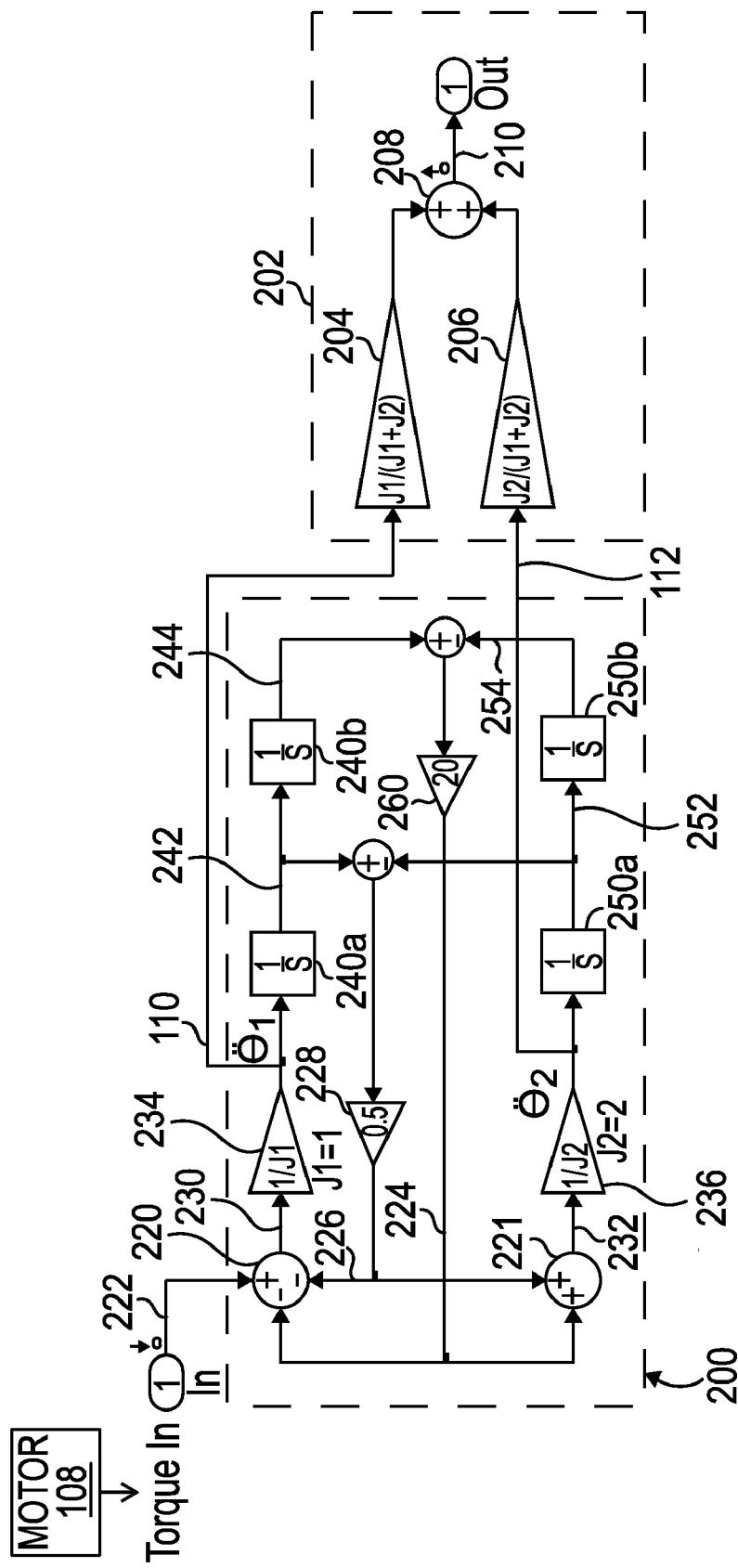
FIG. 2 is a functional block diagram view of the flexible structure receiving a torque input from a motor of the servo system, sensed acceleration signal outputs of the acceleration sensors, and components of the servo system employed to generate a compensation feedback signal based on the sensed acceleration signals.

FIG. 2 is a functional block diagram view of a mechanical model 200 of the flexible structure 50 (FIG. 1) receiving a torque input from the motor 108 of the servo system 100 and acceleration signal outputs 110 and 112 of the acceleration sensors 104a and 104b mounted relative to the masses 52a and 52b of the flexible structure 50. As shown in FIG. 2, a first torque summer 220 reflects the mechanical summation of the effective torque input 230 to the first mass 52a. The first torque summer 220 mechanically generates the effective torque input 230 to the first mass 52a by summing the torque input 222 from the motor 108 (as applied to the shaft 109 in FIG. 1), the counter or offset torque 224 from the spring element model 200 of the flexible structure 50, and a damping torque 226 output of a damper 228 that is a function of the sum of the rates of rotation of the inertias of the two masses 52a and 52b. A second torque summer 221 reflects a corresponding mechanical summation of the effective torque input 232 to the second mass 52b based on the sum of the counter or offset torque 224 from the spring element model 200 of the flexible structure 50, and the damping torque 226 output.

A gain amplifier 234 models the first mass's acceleration 110 (which is sensed by the first acceleration sensor) based on the effective torque input 230 to the first mass 52a and the gain associated with the inertia of the first mass 52a. Another gain amplifier 236 models the second mass's acceleration 112 (which is sensed by the second acceleration sensor) based on the effective torque input 232 to the second mass 52b and the gain associated with the inertia of the second mass 52b. Integrators 240a and 240b reflect the mechanical integration of the acceleration 110 by the first mass 52a to generate a corresponding angular rate 242 and a corresponding displacement 244. Similarly, integrators 250a and 250b reflect the mechanical integration of the acceleration 112 by the second mass 52b to generate a corresponding angular rate 252a and a corresponding displacement 252b. A spring constant amplifier 260 models the spring element 56. The amplifier 260 receives the combined difference of the displacements 244 and 254 of the two masses 52a and 52b that are mechanically applied to the spring element 56 and generates the counter torque 224 that is respectively applied to the two masses 52a and 52b.

FIG. 2 also depicts a detailed portion 202 of the servo controller 102 that includes two gain amplifiers 204 and 206 each of which receives a respective acceleration output 110 or 112 and outputs a corresponding weighted acceleration based on the ratio of the inertia ($J_1$ or $J_1$) for the respective mass (52a or 52b) versus the combined inertia ($J_1+J_1$) of the two masses. The servo controller 102 further comprises a summer 208 that generates a weighted sum acceleration output 210 based on the weighted acceleration outputs of the two gain amplifiers 204 and 206. As further explained herein, the servo controller 102 may use the weighted sum acceleration output 210 to generate a compensation feedback signal for adjusting the movement input 114 (e.g., rate or torque input) to the motor 108 to effectively eliminate the structural mode response of the flexible structure 50 from the servo controller.

Figure 3:
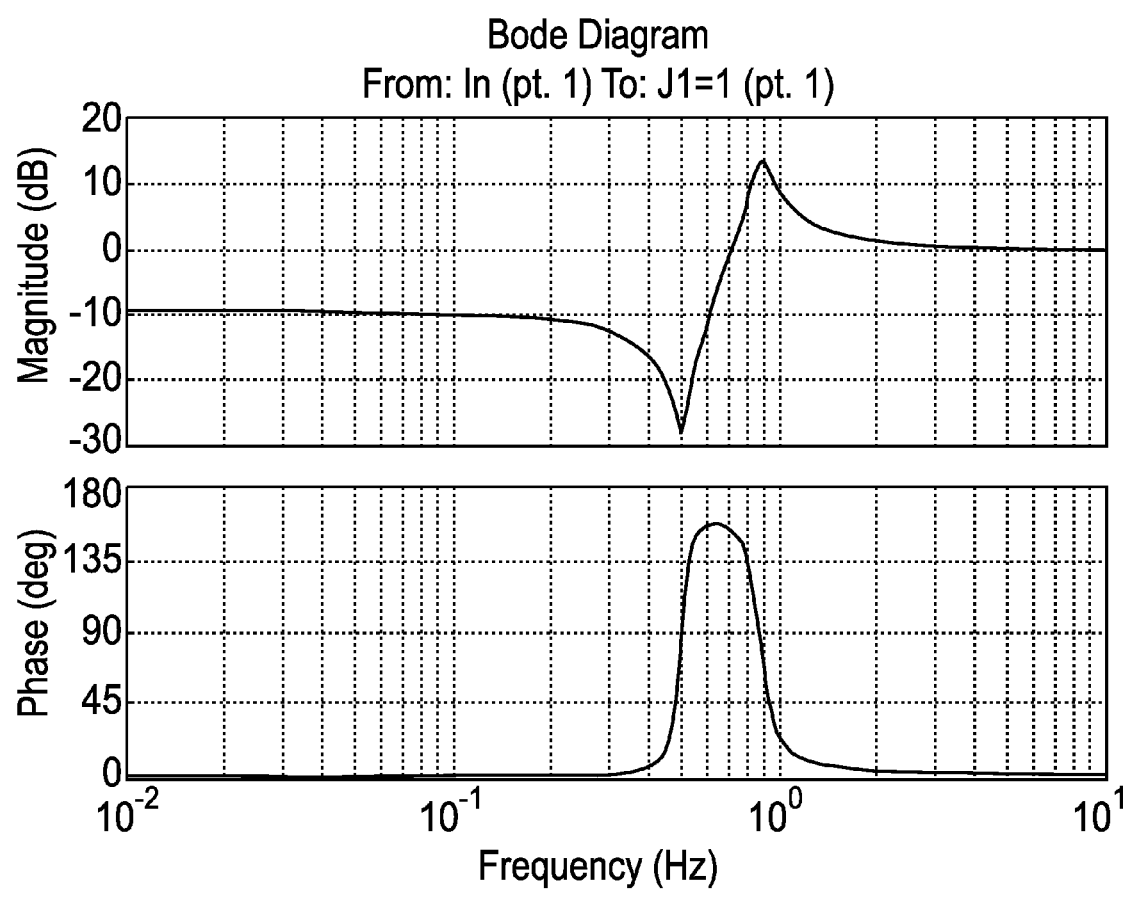
FIG. 3 is a graph of the transfer function of the angular acceleration sensed by the first acceleration sensor disposed relative to the first mass corresponding to or closest to the motor versus the torque input signal from the motor.

FIG. 3 is a graph of the transfer function of the angular acceleration 110 sensed by the first acceleration sensor 104a (FIG. 1) disposed relative to the first mass 52a corresponding to or closest to the motor 108 versus the torque input signal 222 from the motor 108. As shown in FIG. 3, at low torque input frequencies (less than 0.04 Hz for the example servo system 100 and flexible structure 50 depicted in FIG. 2), the magnitude of the acceleration 110 of the inertia of the first mass 52a is approximately constant at −9.54 dB. At a torque input frequency of 0.5 Hz and 0.9 Hz, the first mass 52a of the flexible structure 50 exhibits a resonant notch and a peak corresponding to the effect of the element 56 functioning as a spring that is displaced as a result the spring element 56 working against the first mass 52a and working against the second mass 52b. The resonant peak disturbance at 0.9 Hz is the Eigen value for the two masses. The resonant notch and peak reflect a structural mode deformation for the flexible structure 50 having two mass inertias with a coupling spring element. At high frequencies beyond the resonant peak disturbances (e.g., above 4 Hz in FIG. 3), the acceleration 110 of the first mass 52a is approximately constant at a magnitude of 0 dB as a result of the first mass 52a being effectively decoupled from the second mass 52b by the spring element 56.

Figure 4:
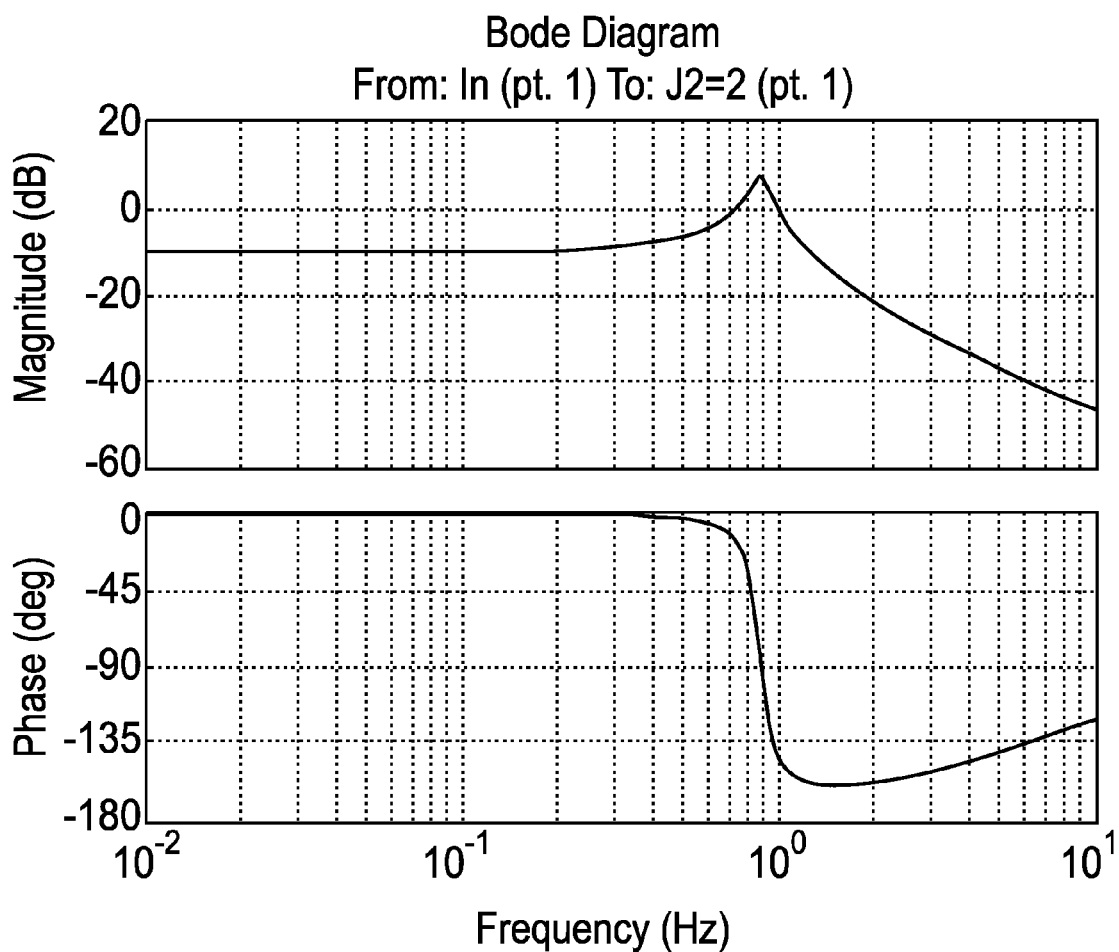
FIG. 4 is a graph of the transfer function of the angular acceleration sensed by the second acceleration sensor disposed relative to the second mass coupled via the spring element to the first mass versus the torque input signal from the motor.

FIG. 4 is a graph of the transfer function of the angular acceleration 112 sensed by the second acceleration sensor 104b disposed relative to the second mass 52b coupled via the spring element 56 to the first mass 52a versus the torque input signal 222 from the motor 108. As shown in FIG. 4, at low torque input frequencies (less than 0.1 Hz for the second mass 52b of the flexible structure 50 depicted in FIG. 2), the magnitude of the acceleration 112 of the inertia of the second mass 52b is approximately constant at −9.54 dB. Thus, at low frequencies, the first mass 52a, the second mass 52b and the spring element 56 that comprise the flexible element 50 collectively function as a rigid body. However, at a torque input frequency of 0.9 Hz, the second mass 52b of the flexible structure 50 exhibits a resonant peak disturbance corresponding to the effect of the element 56 functioning as a spring that is displaced as a result of working against the second mass 52b. In this example, at high frequencies beyond the resonant peak disturbance frequency of 0.9 Hz, the magnitude of the acceleration 112 of the second mass 52b decreases linearly with frequency squared (or frequency$^2$) as a result of the second mass 52b being effectively decoupled from the first mass 52a by the spring element 56.

Figure 5:
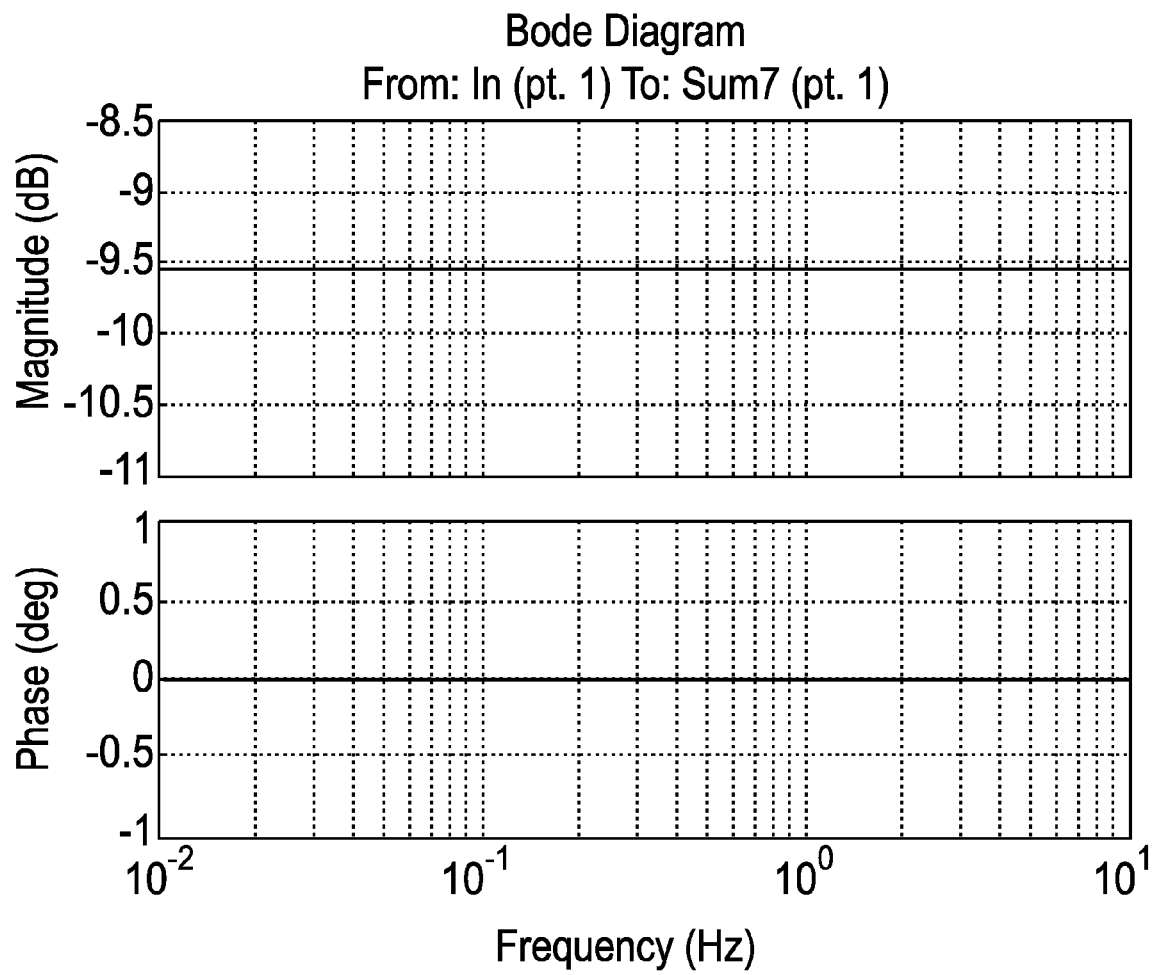
FIG. 5 is a graph of the transfer function of the compensation feedback signal generated by the servo system of FIG. 2 versus the torque input signal from the motor, where the compensation feedback signal is generated based on the weighted sum of the two angular acceleration sensed by the first and second acceleration sensors.

FIG. 5 is a Bode plot of the transfer function of the compensation feedback signal generated by the servo system 102 (and shown in further detail in 202) versus the torque input signal 222 from the motor 108. In this implementation, the compensation feedback signal corresponds to the weighted sum acceleration output 210 generated by the servo controller 102 based on the weighted sum of the angular accelerations sensed by the first and second acceleration sensors 104a and 104b. The servo controller 102 adjusts the movement input 114 (e.g., rate or torque input) to the motor 108 by the compensation feedback signal 210 to effectively eliminate the structural mode of the flexible structure 50 from the servo controller 102 so that the servo controller 102 may operate at higher input frequencies or bandwidth without exhibiting a stability issue or problem. Such a stability issue or problem may otherwise cap the input frequencies at which the servo controller 102 may effectively control the movement of the flexible structure via the motor 108. As shown in FIG. 5, when the servo controller 102 adjusts the movement input 114 to the motor 108 using the weighted sum acceleration compensation feedback signal 210, the magnitude of the combined acceleration output remains constant at approximately −9.55 dB, confirming the elimination of each of the resonant peak disturbances corresponding to the structural mode deformation of the flexible structure 50 that were present before the compensation feedback signal 210 was applied to the input 114 to the motor 108.

Figure 6:
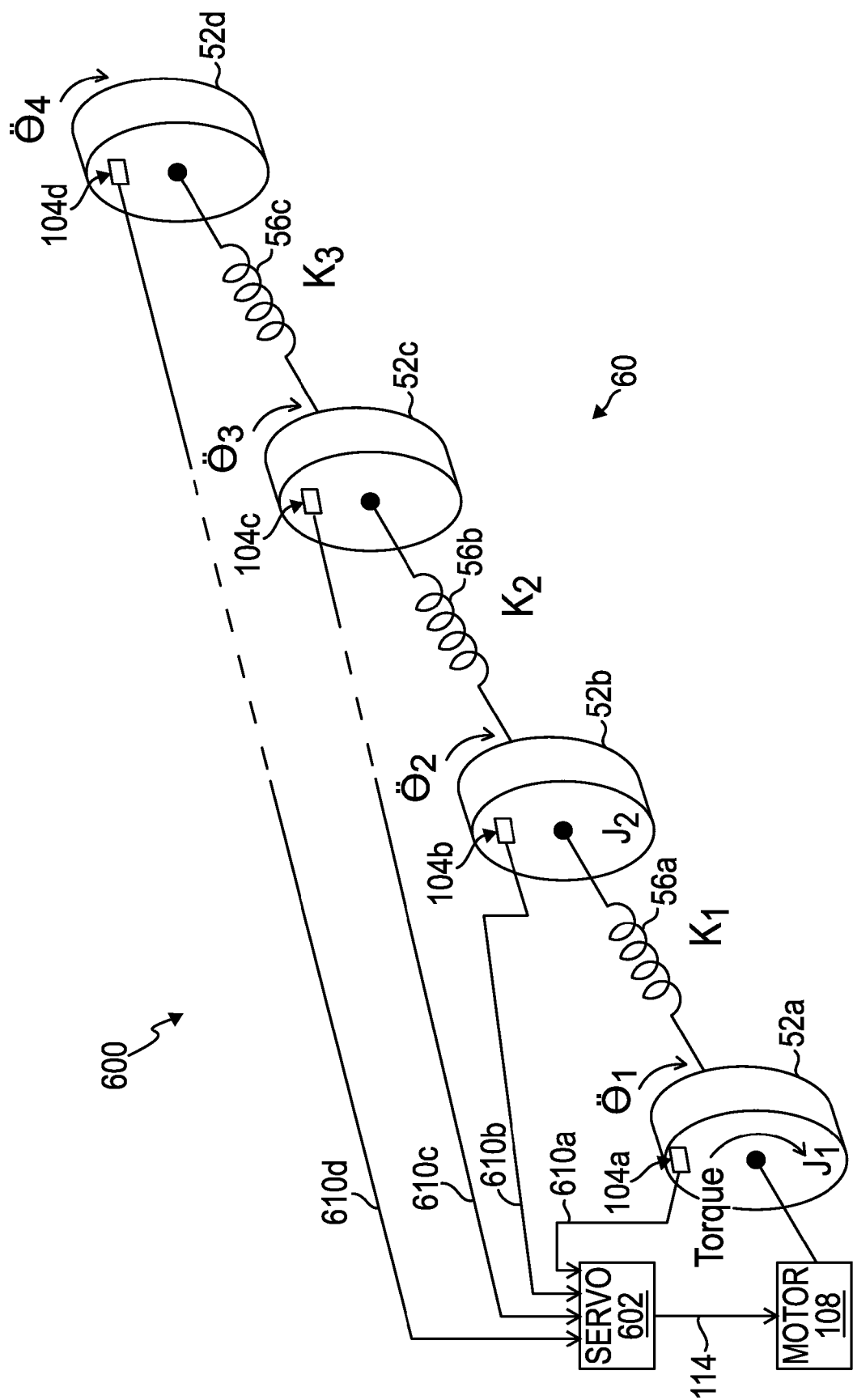
FIG. 6 is a block diagram view of a second embodiment of a servo system consistent with the principles of the present invention, where the servo system includes a servo controller and a plurality of acceleration sensors (e.g., four sensors) for controlling a flexible structure that has a plurality of masses (e.g., four masses) and a plurality of spring elements (e.g., three elements) each coupling two masses.

FIG. 6 is a block diagram view of a second embodiment of a servo system 600 consistent with the principles of the present invention for controlling movement of a flexible structure 60 that has a more complex structure than the flexible structure 50 depicted in FIG. 1. In this implementation, the servo system 600 includes a servo controller 602 and a plurality of acceleration sensors (e.g., four sensors 104a-104d) for controlling the flexible structure 60. The flexible structure 60 has n masses (e.g., four masses 52a-52d) and n−1 spring elements (e.g., three elements 56a-56c) each coupling a respective two of the masses 52a-52d. Each element 56a, 56b and 56c functions as a spring when the flexible structure 60 is subject to a linear or rotational input at or above a corresponding input frequency. The flexible structure 60 may correspond to and model a flexible azimuth gimbal structure or a flexible elevation gimbal structure or a combination of both structures in a gimbal system, where the combined flexible structure is driven at one end corresponding to the first mass 52a by an azimuth torquer motor.

In the implementation shown in FIG. 6, the first mass 52a of the four masses of the flexible structure 60 has an inertia that is driven by the motor 108. Each acceleration sensor 104a-104d is disposed on or relative to a respective mass 52a-52d of the flexible structure 60. As further disclosed below, a NASTRAN modeling program or other finite element analysis modeling program may be used to identify the masses 52a-52d coupled to elements 56a-56c that may exhibit spring characteristics at a particular torque or linear acceleration disturbance frequency so that a corresponding number of accelerometer sensors 104a-104d may be disposed on or near the identified masses 52a-52d.

Similar to the servo controller 102, the servo controller 602 is operatively configured to receive each sensed acceleration 610a-610d from each sensor 104a-104d and generate a compensation feedback signal based on a sum of sensed accelerations 610a-610d, and output a movement signal (e.g., a rate or torque signal depending on the type of input the motor 108 has) to the movement input of the motor based on the compensation feedback signal as described in further detail herein.

Figure 7:
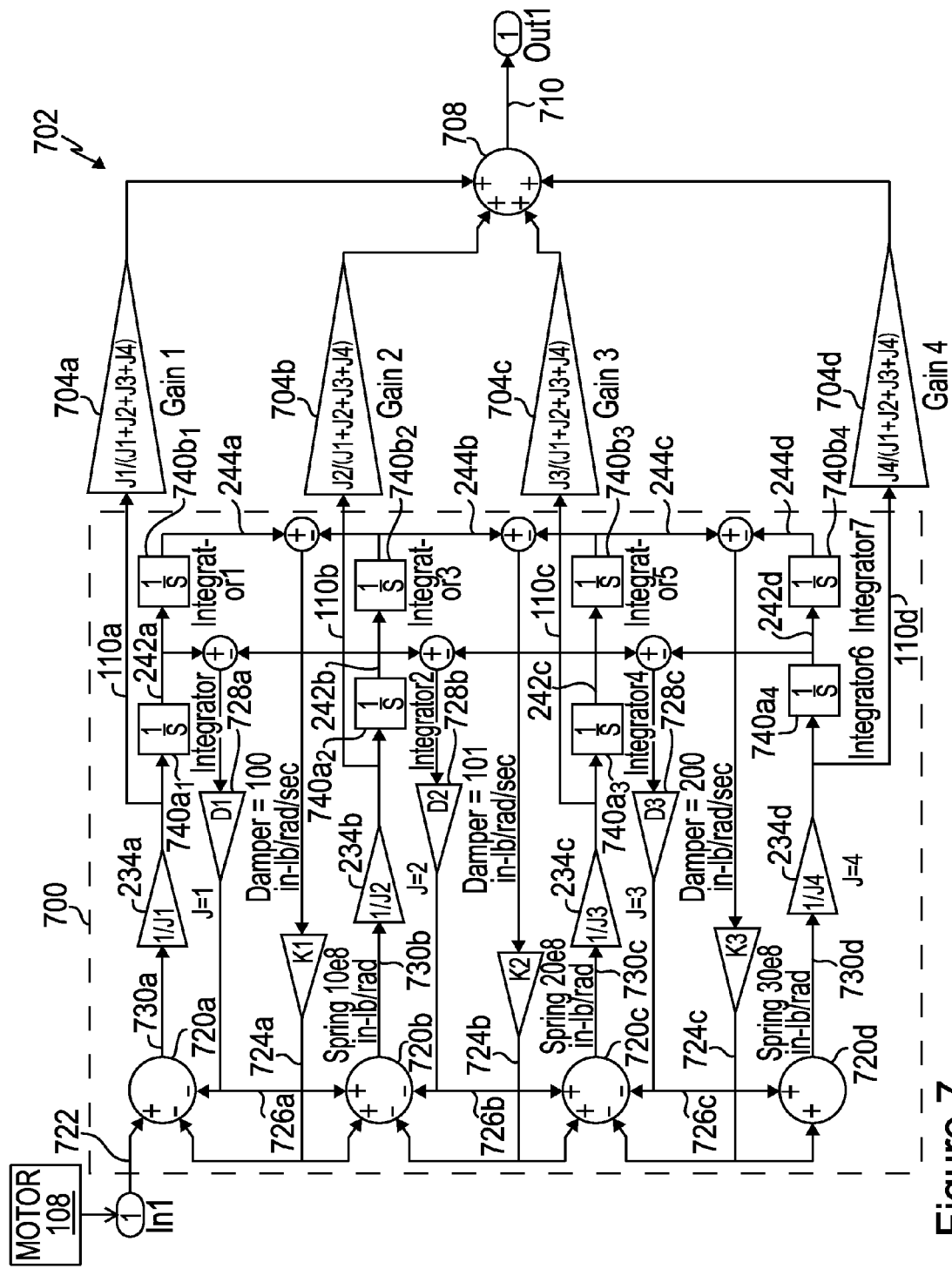
FIG. 7 is a functional block diagram view of the flexible structure in FIG. 6 receiving a torque input from a motor of the servo system, sensed acceleration signal outputs from each of the acceleration sensors, and components of the servo system of FIG. 6 employed to generate a compensation feedback signal based on each of the sensed acceleration signals.

FIG. 7 is a functional block diagram view of a mechanical model 700 of the flexible structure 60 (FIG. 6) receiving a torque input 722 from the motor 108 of the servo system 600. FIG. 7 also depicts the acceleration signals 110a-110d that are sensed by the acceleration sensors 104a-104d mounted relative to the masses 52a-52d of the flexible structure 60. As shown in FIG. 7, the first mass 52a of the flexible structure 60 that is driven by the motor 108 has a first torque summer 220a that models the mechanical summation of the torque input 722 from the motor 108, the counter torque 724a from the first spring element (as modeled by the spring constant amplifier 728a) coupling the first mass 52a to the next mass 52b, and a damping torque 726a output of a damper 728a that is a function of the difference of the rates of rotation of the inertias of the two masses 52a and 52b coupled by the first spring element 56a. Each subsequent intermediate mass 52b and 52c also has a mechanical torque summer 720b or 720c that sums the counter torque 724a or 724b from the preceding spring element (as modeled by 728a or 724b) coupling the respective intermediate mass 52b or 52c to the preceding mass 52a or 52b and the counter torque 724b or 724c from the subsequent spring element (as modeled by 728b or 724c) coupling the respective intermediate mass 52b or 52c to the subsequent mass 52c or 52d in the flexible structure 60. The mechanical torque summer 720b or 720c for each intermediate mass 52b and 52c may also sum the preceding damping torque 726a or 726b corresponding to the respective mass 52a and the preceding mass 52a or 52b and the subsequent damping torque 726b or 726c corresponding to the respective mass 52b or 52c and the subsequent mass 52c or 52d. In the implementation shown in FIG. 7, the last mass 52d in the flexible structure 60 also has a mechanical torque summer 220d that sums the counter torque 724c from the preceding spring element (as modeled by 724c) coupling the last mass 52d to the preceding mass 52c and the preceding damping torque 726c corresponding to the last mass 52d and the preceding mass 52c.

Each of the gain amplifiers 234a-234d reflect the generation of the acceleration 110a-110d of a respective mass 52a-52d based on the effective torque input 230a-230d to the mass 52a-52d and the inertia of the respective mass 52a-52d. Integrators $740a_1$ and $740b_1$ reflect the mechanical integration of the acceleration 110a by the first mass 52a to generate a corresponding angular rate 242a and a corresponding displacement 244b. Similarly, integrators $740a_2$ and $740b_2$, $740a_3$ and $740b_3$, and $740a_4$ and $740b_4$ reflect the mechanical integration of the acceleration 112 by each subsequent mass 52b, 52c and 52d to generate a corresponding angular rate 242b, 242c and 242d, and a corresponding displacement 244b, 244c and 244d.

FIG. 7 also depicts a detailed portion 702 of the servo controller 602 that includes a gain amplifier 704a, 704b, 704c and 704d for each sensor 104a-140d. Each gain amplifier 704a-704d receives a respective acceleration output 110a, 110b, 110c or 110d and outputs a corresponding weighted acceleration based on the ratio of the inertia ($J_1, J_2, J_3$ or $J_4$) for the respective mass (52a, 52b, 52c or 52d) versus the combined inertia ($J_1+J_2+J_3+J_4$) of the each of the masses 52a-52d in the flexible structure 60. The servo controller 602 further comprises a summer 708 that generates a weighted sum acceleration output 710 based on the weighted acceleration outputs of each of the gain amplifiers 704a-704d. As further explained herein, the servo controller 602 may use the weighted sum acceleration output 710 to generate a compensation feedback signal for adjusting the movement input 114 (e.g., rate or torque input) to the motor 108, which effectively eliminates the structural mode of the flexible structure 60 from the servo controller 602 that would otherwise cause a stability issue for the servo controller and correspondingly limit the input frequency bandwidth at which the servo controller 602 may operate.

Figure 8:
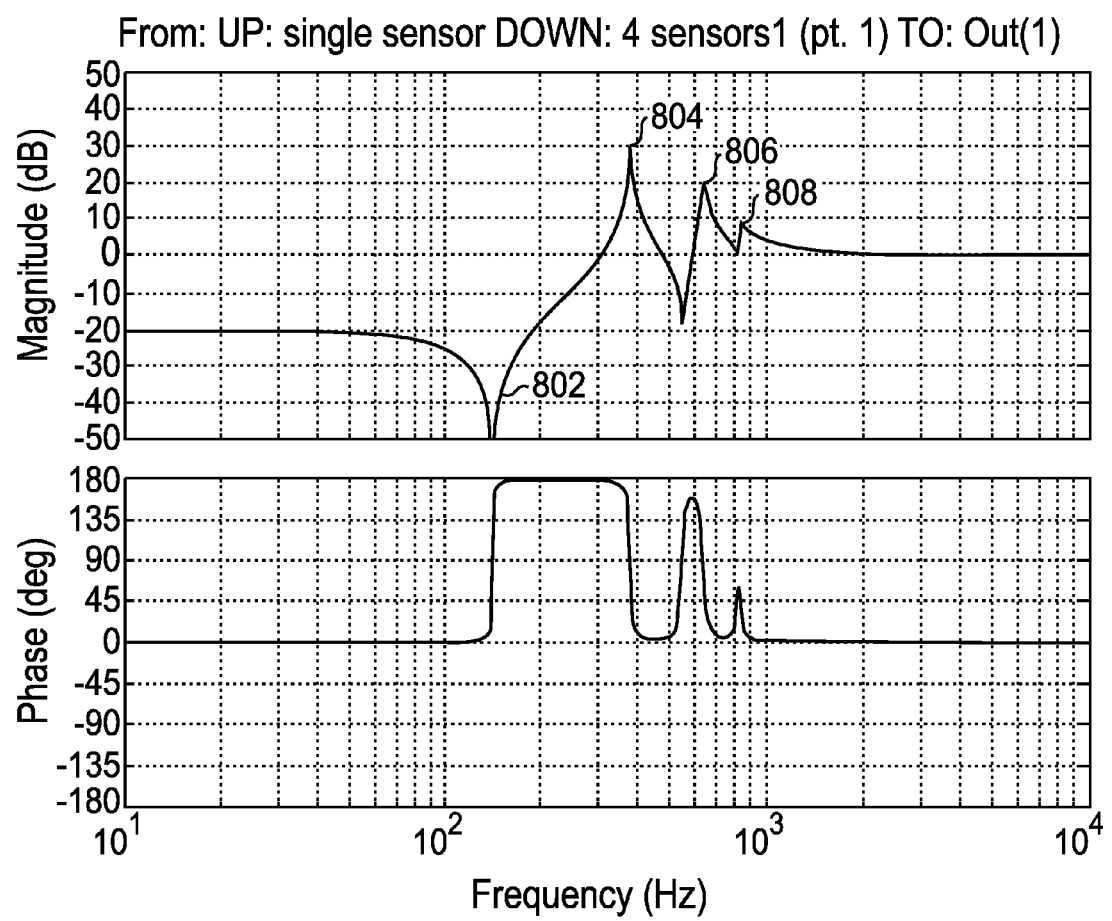
FIG. 8 is a graph of the transfer function of the angular acceleration sensed by the first acceleration sensor in FIG. 6 disposed relative to the first mass corresponding to or closest to the motor versus the torque input signal from the motor.

FIG. 8 is a graph of the transfer function of the angular acceleration 110a sensed by the first acceleration sensor 104a disposed relative to the first mass 52a of the flexible structure 60 versus the torque input signal 722 from the motor 108 of the servo system 600. As shown in FIG. 8, at low torque input frequencies (less than 100 Hz for the example servo system 600 and flexible structure 60 depicted in FIG. 6), the magnitude of the acceleration 110a of the inertia of the first mass 52a is approximately constant at −20 dB. At a torque input frequency of 150 Hz, the first mass 52a of the flexible structure 60 exhibits a resonant notch 802. At a torque input frequency of 390 Hz, 640 Hz, and 850 Hz, the first mass 52a of the flexible structure 60 exhibits respective peak responses 804, 806 and 808 corresponding to the effect of elements 56a, 56b and 56c each functioning as a respective spring that is displaced at the respective peak disturbance frequency 804, 806 and 808 as a result the spring elements 56a, 56b and 56c working against the first mass 52a and the subsequent masses 52b, 52c and 52d. The resonant notch and each of the peak disturbances reflect structural mode deformations for the flexible structure 60. At high frequencies beyond the last resonant peak disturbance 808, the acceleration 110a of the first mass 52a is approximately constant at a higher magnitude of 0 dB as a result of the spring elements 56a-56c effectively decoupling the other masses 52b-52c from the first mass 56a.

Figure 9:
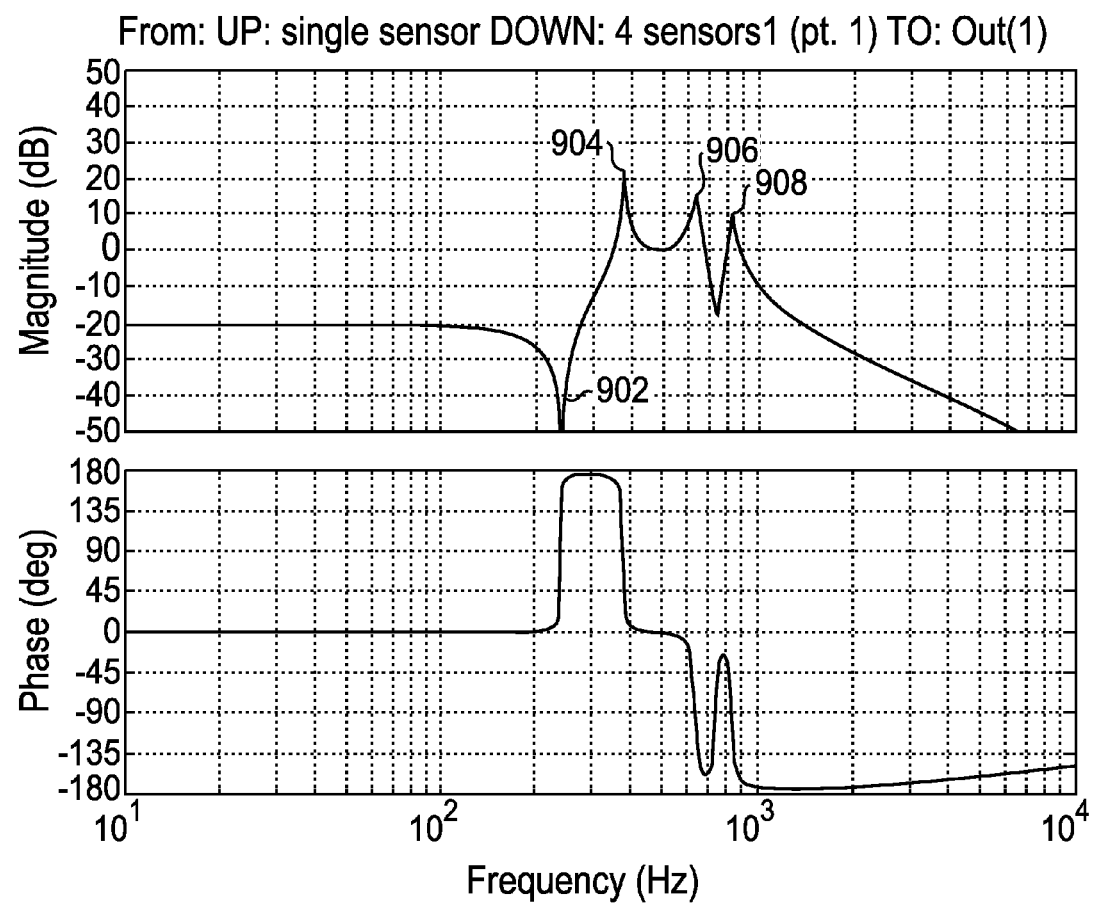
FIG. 9 is a graph of the transfer function of the angular acceleration sensed by the second acceleration sensor disposed relative to the second mass coupled via the first spring element to the first mass versus the torque input signal from the motor.

FIG. 9 is a graph of the transfer function of the angular acceleration 110b sensed by the next acceleration sensor 104b disposed relative to the intermediate mass 52b coupled via the spring element 56a to the first mass 52a versus the torque input signal 722 from the motor 108. As shown in FIG. 9, at low torque input frequencies (less than 50 Hz for the second mass 52b of the flexible structure 60 depicted in FIG.

6), the magnitude of the acceleration 110b of the inertia of the second mass 52b is approximately constant at −20 dB. At a torque input frequency of approximately 250 Hz, the second mass 52b of the flexible structure 60 exhibits a resonant notch 902 consistent with the notch exhibited by the first mass 52a at approximately 150 Hz. As with the first mass 52a, at a torque input frequency of 390 Hz, 640 Hz, and 850 Hz, the second mass 52b of the flexible structure 60 exhibits respective peak disturbances 904, 906 and 908 corresponding to the effect of elements 56a, 56b and 56c functioning as a respective spring and working against the second mass 52b. The resonant notch and each of the peak disturbances 904, 906 and 908 also reflect similar structural mode deformations for the flexible structure 60 as exhibited by the first mass 52a at approximately the same disturbance frequencies 390 Hz, 640 Hz, and 850 Hz based on the flexure of the springs 56a-56c at these frequencies. At high frequencies beyond the last resonant peak disturbance 908, the magnitude of the acceleration 110b of the second mass 52b decreases as a result of the spring elements 52a-56c effectively decoupling the subsequent masses 52b-52d from the first mass 52a.

Figure 10:
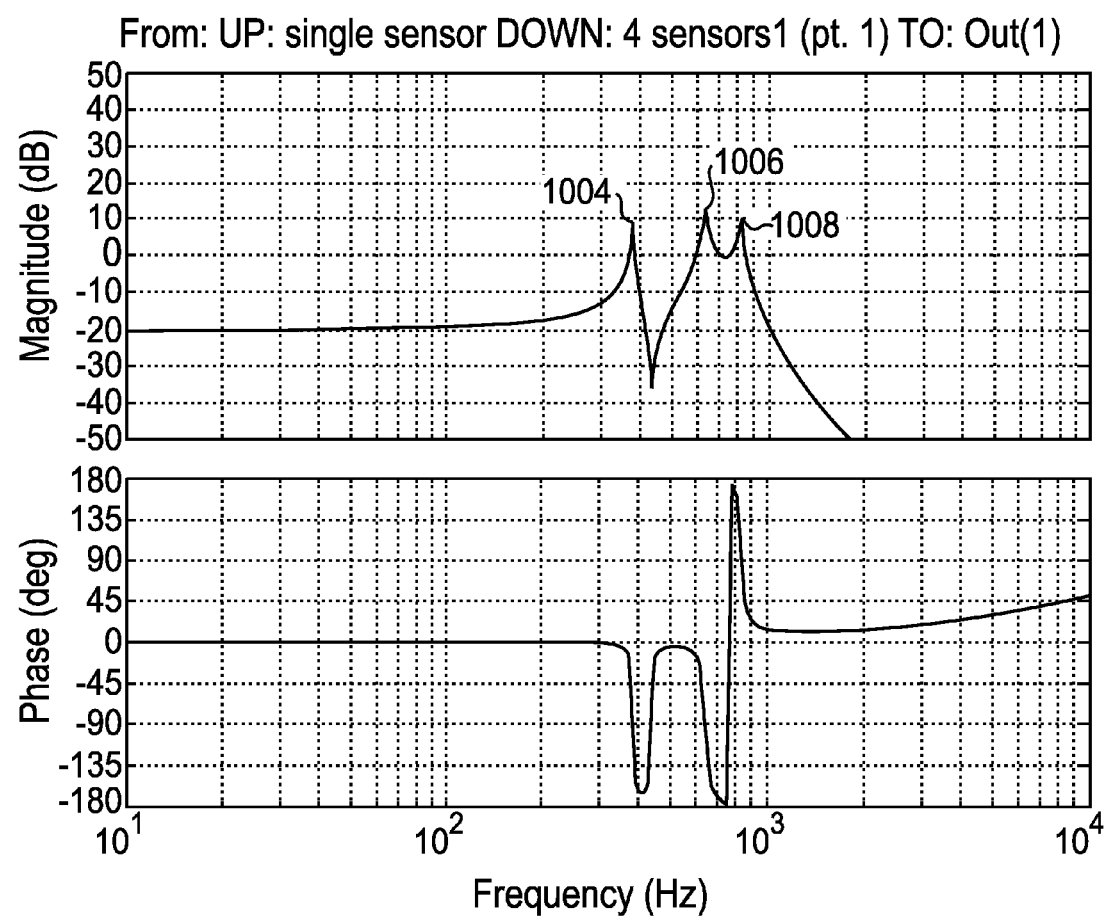
FIG. 10 is a graph of the transfer function of the angular acceleration sensed by the third acceleration sensor disposed relative to the third mass coupled via the second spring element to the second mass versus the torque input signal from the motor.

FIG. 10 is a graph of the transfer function of the angular acceleration 110c sensed by the next acceleration sensor 104c disposed relative to the intermediate mass 52c coupled via the spring elements 56a and 56b to the first mass 52a versus the torque input signal 722 from the motor 108. As shown in FIG. 10, at low torque input frequencies (less than 60 Hz for the third mass 52c of the flexible structure 60 depicted in FIG. 6), the magnitude of the acceleration 110c of the inertia of the third mass 52c is approximately constant at −20 dB. Like the first and second masses 52a and 52b, at a torque input frequency of 390 Hz, 640 Hz, and 850 Hz, the third mass 52c of the flexible structure 60 exhibits respective peak disturbances 1004, 1006 and 1008 corresponding to the effect of elements 56a, 56b and 56c each functioning as a respective spring and working against the third mass 52c. Each of the peak disturbances 1004, 1006 and 1008 also reflect similar structural mode deformations for the flexible structure 60 as exhibited by the two masses 52a and 52b at approximately the same disturbance frequencies 390 Hz, 640 Hz, and 850 Hz based on the flexure of the springs 56a-56c at these frequencies. At high frequencies beyond the last resonant peak disturbance 1008, the magnitude of the acceleration 110c of the third mass 52c decreases as a result of the spring elements 52a-56c effectively decoupling the subsequent masses 52b-52d from the first mass 52a.

Figure 11:
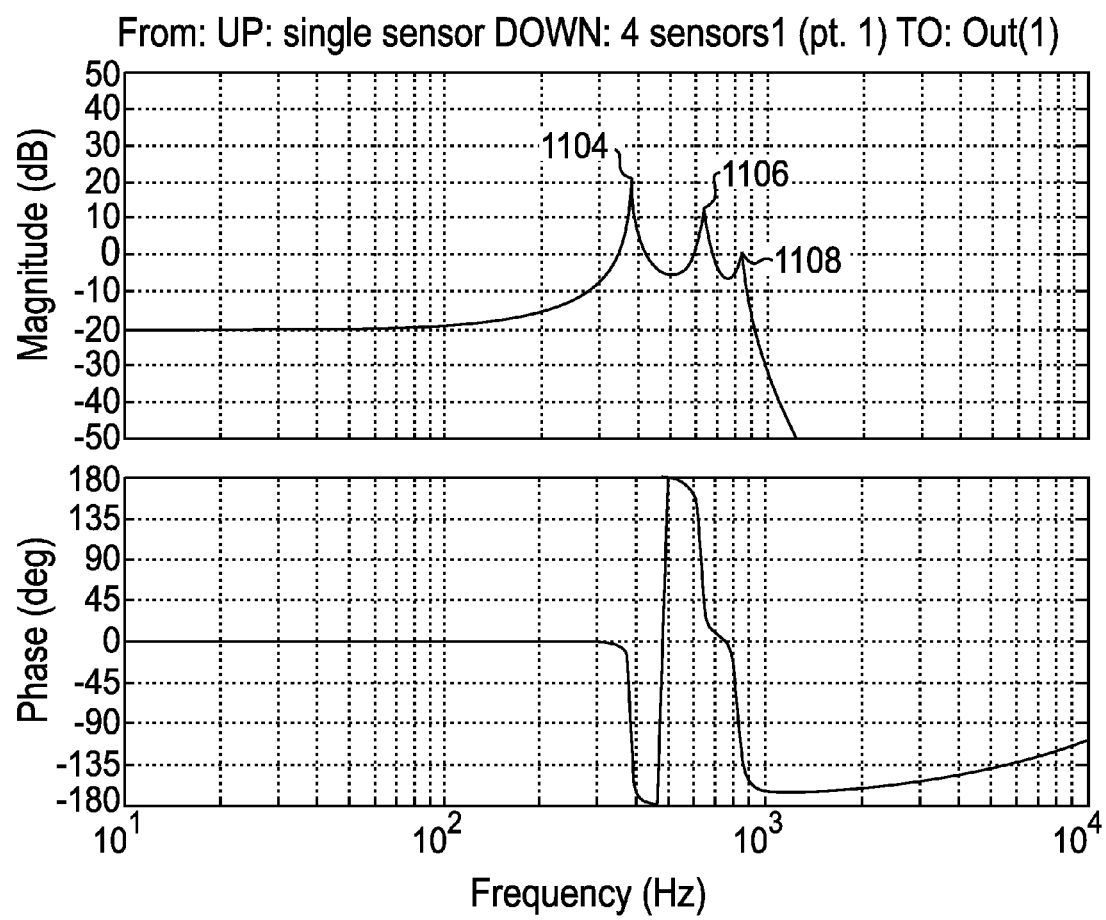
FIG. 11 is a graph of the transfer function of the angular acceleration sensed by the fourth acceleration sensor disposed relative to the fourth mass coupled via the third spring element to the third mass versus the torque input signal from the motor.

FIG. 11 is a graph of the transfer function of the angular acceleration 110d sensed by the last acceleration sensor 104d disposed relative to the last mass 52d coupled via the spring elements 56a, 56b and 56c to the first mass 52a versus the torque input signal 722 from the motor 108. As shown in FIG. 11, at low torque input frequencies (less than 60 Hz for the last mass 52d of the flexible structure 60 depicted in FIG. 6), the magnitude of the acceleration 110d of the inertia of the last mass 52d is also approximately constant at −20 dB. Thus, at low frequencies (at least less than 40 Hz as shown in FIG. 8 for the acceleration transfer function of the first mass 52a), each of the masses 52a-52d and the spring elements 56a-56c that comprise the flexible element 60 collectively function as a rigid body. Like the first, second and third masses 52a-52c, at a torque input frequency of 390 Hz, 640 Hz, and 850 Hz, the last mass 52d of the flexible structure 60 exhibits respective peak disturbances 1104, 1106 and 1108 corresponding to the effect of elements 56a, 56b and 56c each functioning as a respective spring and working against the last mass 52d. Thus, for the implementation of the flexible structure 60 depicted in FIG. 6, the peak responses 1104, 1106 and 1108 confirm the structural mode deformations for the flexible structure 60 at the input frequencies 390 Hz, 640 Hz, and 850 Hz based on the flexure of the springs 56a-56c at these frequencies.

Figure 12:
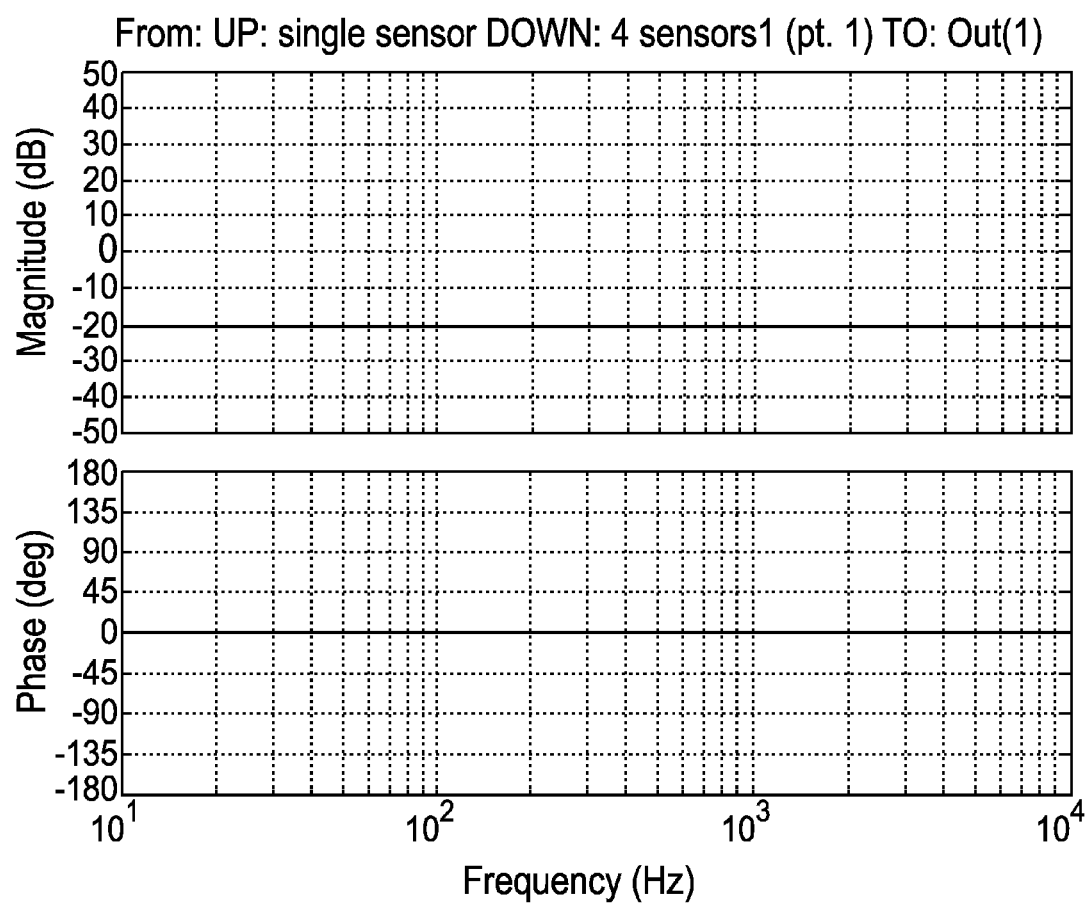
FIG. 12 is a graph of the transfer function of the weighted sum output generated by the servo system of FIG. 6 based on each of the four angular accelerations sensed by the four acceleration sensors versus the torque input signal from the motor.

FIG. 12 is a Bode plot of the transfer function of the compensation feedback signal generated by the servo system 602 (and shown in further detail in 702) versus the torque input signal 722 from the motor 108. In this implementation, the compensation feedback signal corresponds to the weighted sum acceleration output 710 generated by the servo controller 602 based on the weighted sum of the angular accelerations sensed by each of the four acceleration sensors 104a-104d. As shown in FIG. 12, when the servo controller 602 adjusts the movement input 114 to the motor 108 using the weighted sum acceleration compensation feedback signal 710, the magnitude of the combined acceleration output remains constant at approximately −20 dB, confirming the elimination of each of the resonant peak disturbances corresponding to the structural mode deformation of the flexible structure 60 that were present before the compensation feedback signal 710 was applied by the servo controller 602 to the input 114 to the motor 108.

Figures 13, 13A:
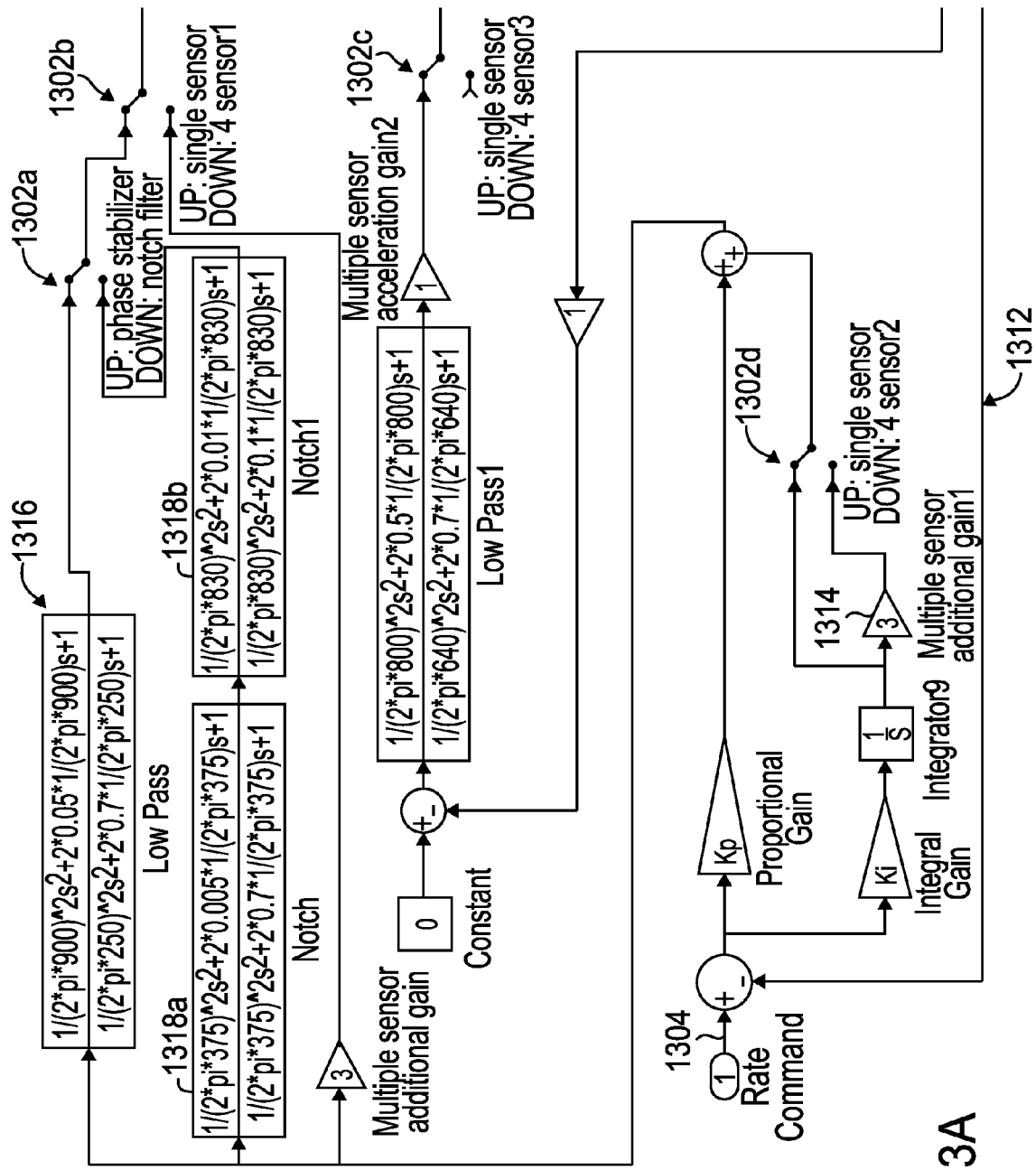
FIG. 13 is a detailed block diagram view of the servo system of FIG. 6, depicting additional components of the servo controller that may be employed to control the flexible structure depicted in FIG. 6.
Figure 13B:
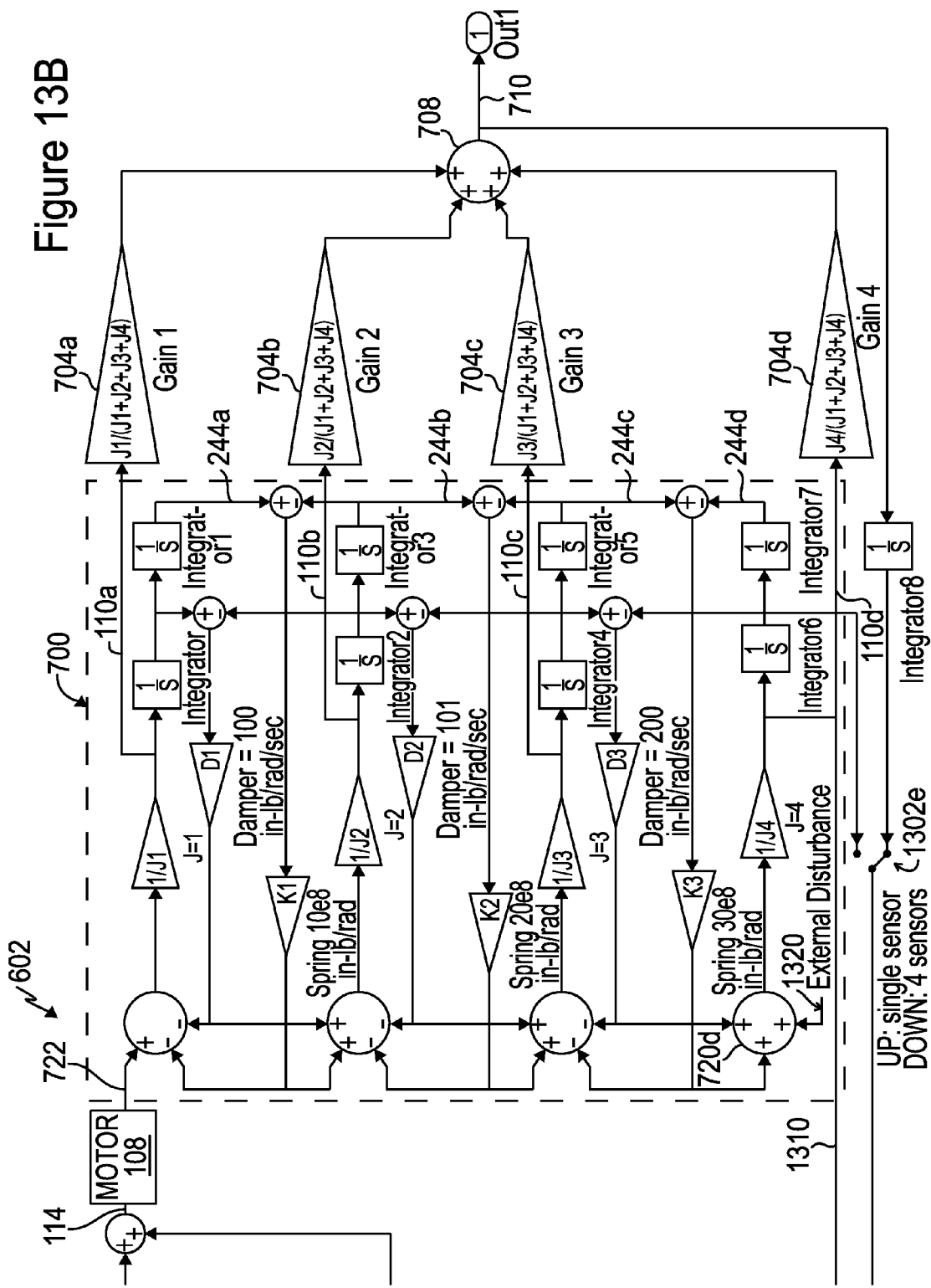

FIG. 13 is a detailed block diagram view of the servo system 600, depicting additional components of the servo controller 602 that may be employed to control the flexible structure 60. In this implementation, the servo controller 602 employs switches 1302a-1302e to switch in different configurations of the servo controller 602 for comparison purposes and to selectively include different components, such as an acceleration feedback path 1310 from the last accelerometer 104d sensing the acceleration 110d of the last mass 52d farthest from the first mass 52a to the movement input 114 (i.e., the rate or torque input to the power amplifier of the motor 108) that is used by the motor 108 to generate the torque input 722 to drive the flexible structure 60. In the example implementation shown in FIG. 13, switch 1302e enables the servo controller 602 to switch between using either a single accelerometer (i.e., sensor 104d) or all four accelerometers 104a-104d for generating a compensation feedback signal 1312 for adjusting the movement (i.e., rate or torque) command input 1304 to the motor 108 that is used to generate the movement signal applied to the movement (i.e., rate or torque) input 114 to the motor 108. Switch 1302d enables the servo controller 602 to switch in additional gain amplifier 1314 when switch 1302e is set so that the servo controller 602 uses all four accelerometer sensors 104a-104d to generate the compensation feedback signal 1312. Switch 1302c enables the servo controller 602 to switch between adding or not adding the acceleration feedback path 1310 to further adjust the compensation feedback signal 1312 for the motor 108. Switch 1302b enables the servo controller 602 to switch between adding or not adding in a low pass, phase stabilization filter 1316 or a series of notch filters 1318a and 1318b for making further corrections to the movement signal (or adjusted compensation feedback signal 1312) that is provided as the movement input 114 to the motor 108 as further explained below. Since generating a compensation feedback signal 1312 using a weighted sum of all sensed accelerations 110a-110d effectively eliminates the structural modes (i.e., resonant peaks shown in FIGS. 8-11), the low pass, phase stabilization filter 1316 or a series of notch filters 1318a and 1318b are not needed when switch 1302e is set to enable the servo controller 602 to use all four accelerometer sensors 104a-104d for generating a compensation feedback signal 1312. Switch 1302b enables the servo controller 602 to switch between adding in either the low pass, phase stabilization filter 1314 or the series of notch filters 1318a and 1318*b* for the single accelerometer sensor configuration. The notch filters 1318*a* and 1318*b* are configured to attenuate the first and third structural modes (e.g., resonant peaks 1104 and 1108 in FIG. 11) associated with the spring elements 56*a*, 56*b* and 56*c* in the flexible structure 60.

Figure 14:
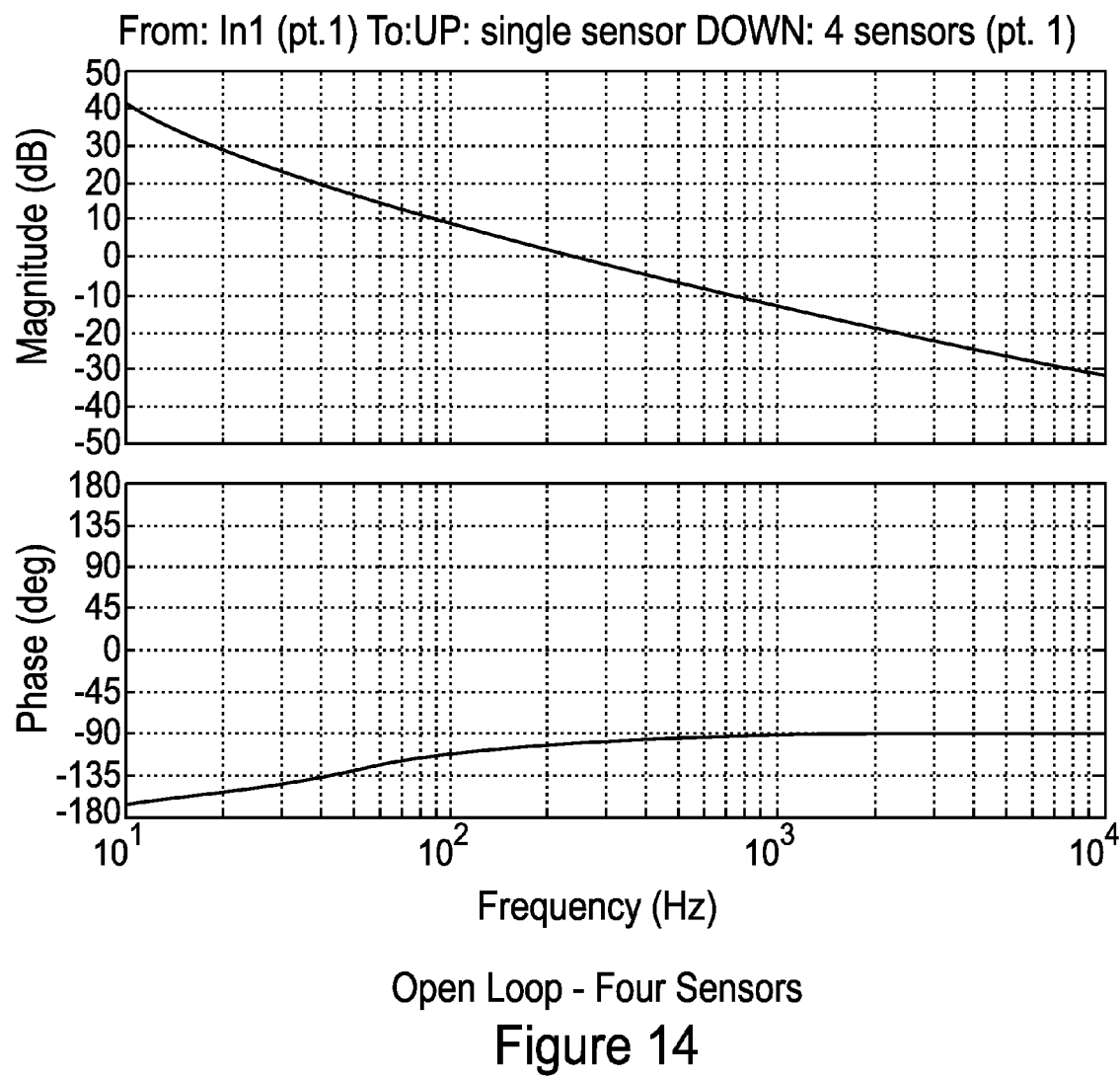
FIG. 14 is a graph depicting the open loop response of the servo system of FIG. 13, where the open loop response corresponds to the transfer function of the weighted sum output generated by the servo system based on each of the four angular accelerations sensed by the four acceleration sensors versus the torque input signal from the motor, but the weighted sum output is not provided as a compensation feedback signal to the motor.
Figure 15:
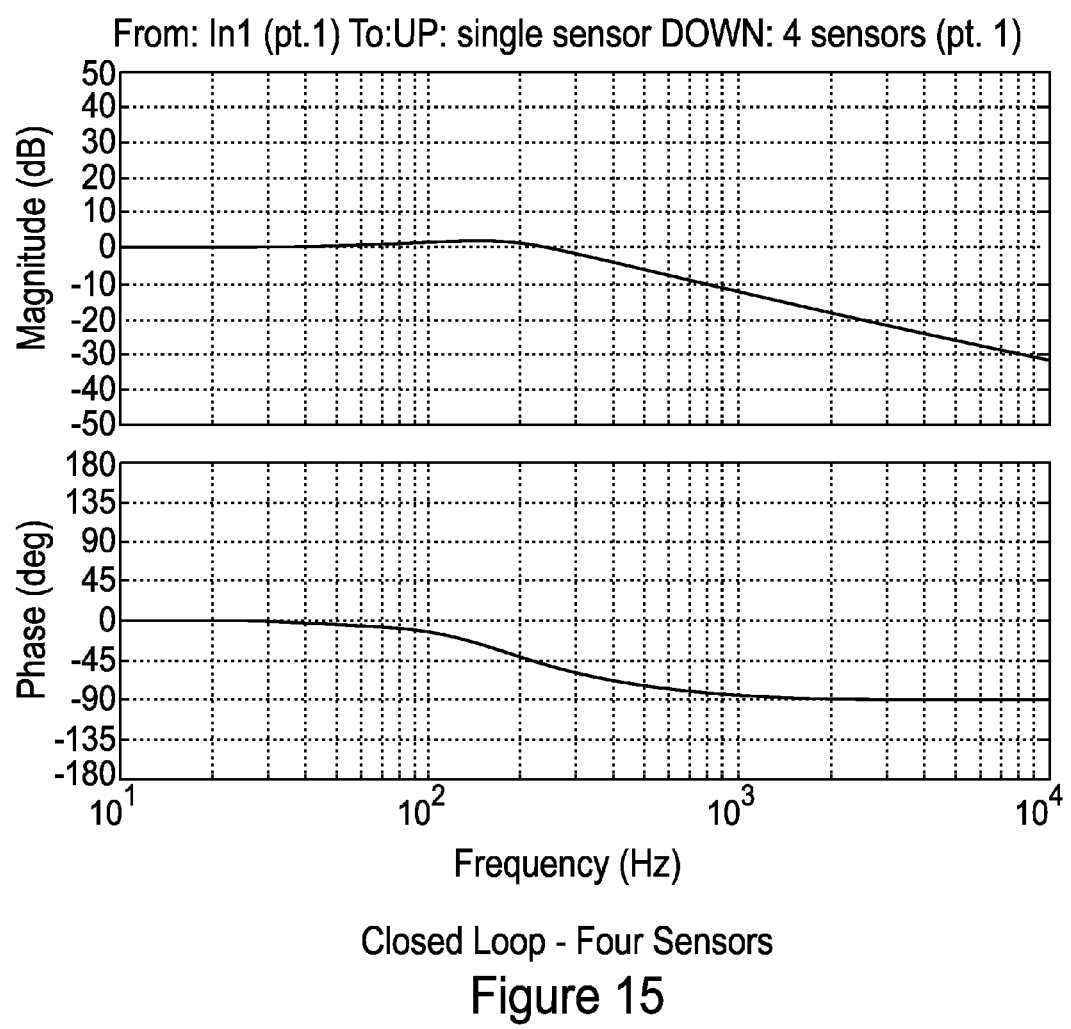
FIG. 15 is a graph depicting the closed loop response of the servo system of FIG. 13, where the open loop response corresponds to the transfer function of the weighted sum output generated by the servo system based on each of the four angular accelerations sensed by the four acceleration sensors versus the torque input signal from the motor, and the weighted sum output is provided as a compensation feedback signal to the motor.

FIG. 14 shows the open loop response for the servo controller 602 as implemented in FIG. 13, with all the switches 1302*a*-1302*e* switched to the down position for the all accelerometer sensor configuration and the compensation feedback signal 1312 removed from the servo controller 602. FIG. 15 shows the closed loop response for the servo controller 602 as implemented in FIG. 13 for the all accelerometer sensor configuration in which the compensation feedback signal 1312 is generated by the servo controller 602 (using the weighted sum output 710 of all the sensed accelerations 110*a*-110*d*) to adjust the movement command 1304 and the resulting signal that is applied to the movement input 114 of the motor 108. As shown in FIG. 15, for the implementation of the servo system 600 having the servo controller 602 implemented in FIG. 13, there is no limit to the bandwidth of the servo controller 602. However, in other implementations of a servo system consistent with the principles of the present invention, some component other than the low frequency structural modes may limit the servo controller performance. For example, unless an accelerometer is employed for each two masses coupled by a spring element in the flexible structure under consideration, there may be high frequency structural modes that are not compensated by using a servo controller and technique for generating a motor compensation feedback signal using a weighted sum of sensed accelerations of the masses of the flexible structure. Also, the power amplifier (not shown in the figures) driving the motor 108 may have a limited bandwidth.

Figure 16A:
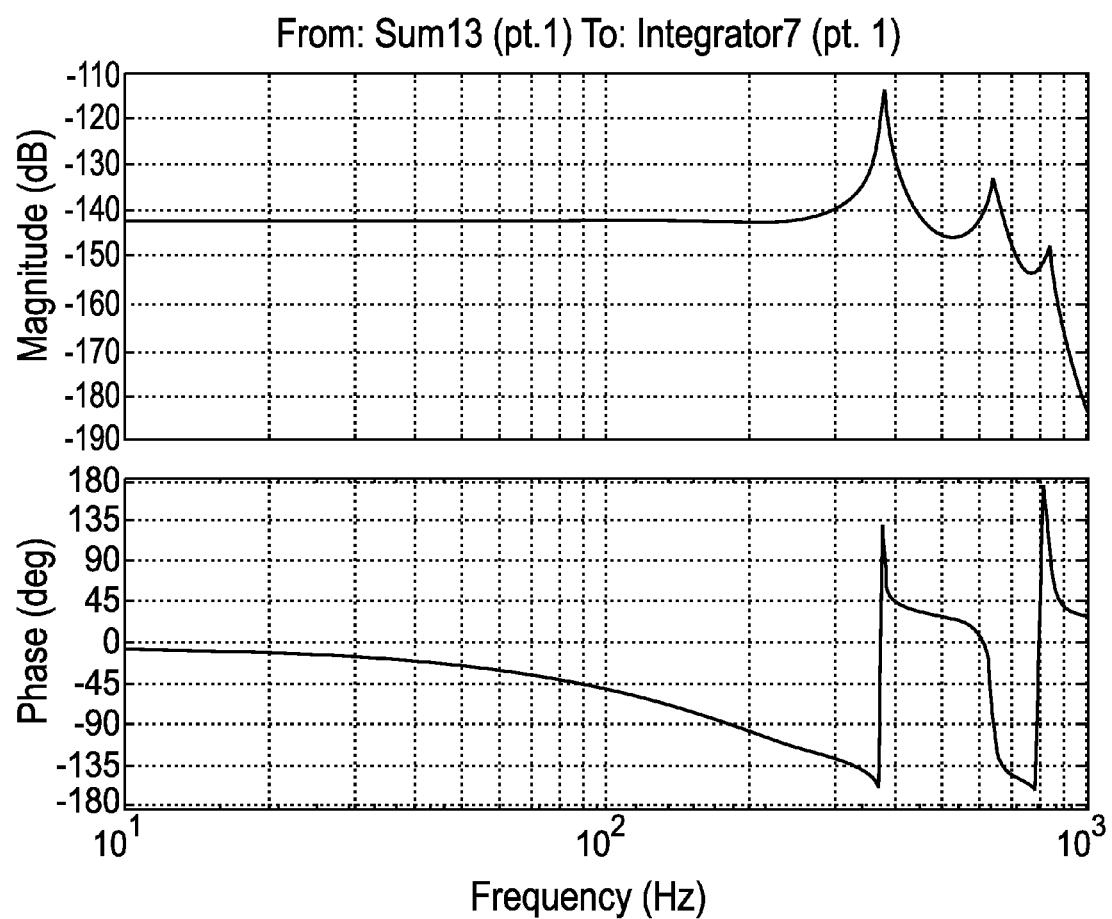
FIG. 16a is a graph depicting the torque disturbance rejection ratio (TDRR) for the servo system of FIG. 13 without employing an acceleration feedback from the last (e.g., fourth) sensor to adjust the compensation feedback signal to further compensate for an external disturbance applied to the flexible structure.

To evaluate the addition of the acceleration feedback path 1310*a* to the servo controller 602, an external disturbance signal 1320 was applied to the flexible structure 60 near the fourth or last mass 52*d* as reflected by the additional input to the mechanical summer 720*d* associated with the fourth or last mass 52*d*. The switch 1302*c* was set so that the acceleration feedback 1310 from the fourth or last sensor 104*d* was removed or not used by the servo controller 602. The angular displacement signal 244*d* for the fourth or last mass 52*d* was then measured. The resulting torque disturbance rejection ratio (TDRR) for the servo system 602 without employing the acceleration feedback 1310 is shown in FIG. 16*a*. The same external disturbance signal 1320 was then applied with the switch 1302*c* set so that the acceleration feedback 1310 was used by the servo controller 602 to further adjust the compensation feedback signal 1312 and the resulting movement signal provided as the movement input 114 to the motor 108. As shown in comparing the TDRR in FIG. 16*a* with the TDRR in FIG. 16*b*, by employing the acceleration feedback 1310, the servo controller 602 dampens the first structural resonance peak that occurs at approximately 385 Hz and attenuates the TDRR at this first structural resonance by approximately 14 dB. The TDRR is radians/in-lb. The TDRR is a primary measure of the performance of the servo controller 602 as the servo controller is a disturbance rejecter. When the servo controller is employed to control a gimbal in a gimbal system, the servo controller's primary purpose is to reduce the LOS jitter of the gimbal when disturbing torques are present. Thus, employing the acceleration feedback 1310 enables the servo controller 602 to provide additional reduction of LOS jitter.

Figure 17:
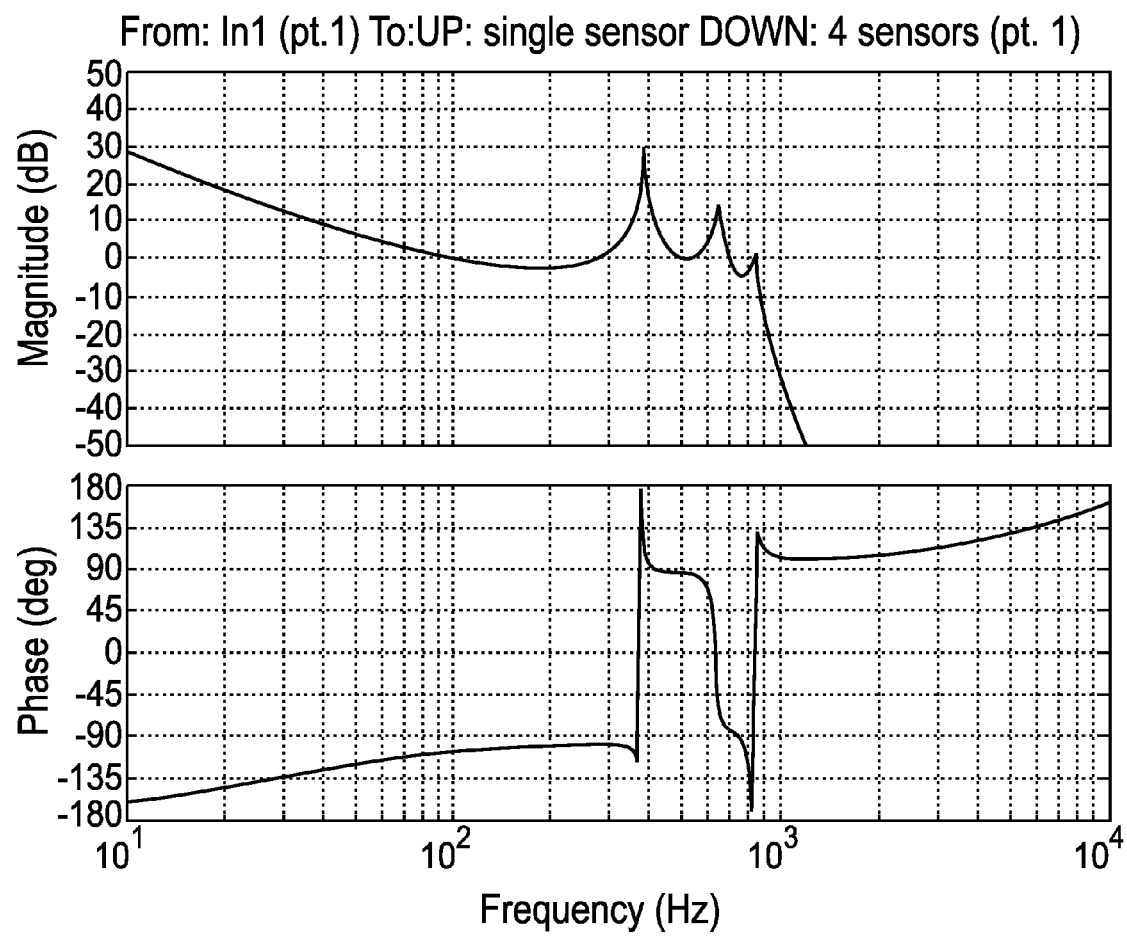
FIG. 17 is a graph depicting the open loop response of the servo system of FIG. 13, where the open loop response corresponds to the transfer function of the angular acceleration sensed by a single acceleration sensor (e.g., the fourth or last sensor) versus the torque input signal from the motor.

For comparison, the open loop response of the servo controller with only a single feedback accelerometer configuration is shown as FIG. 17. In this implementation of the servo controller, the notch filters 1318*a* and 1318*b* or the phase stabilizing filter 1316 were switched out or not employed so the response measurement in FIG. 17 excludes the response of these filters from the plot. In this configuration, switches 1302*d* and 1302*e* are in the up position, switch 1302*c* is in the down position to remove the acceleration feedback 1310, while switches 1302*a* and 1302*b* are both in the up positions so that the servo controller 602 employs the phase stabilization filter 1316 rather the series of notch filters 1318*a*-1318*b*. As shown in FIG. 17, in the single accelerometer sensor configuration, the servo controller 602 exhibits resonant peak disturbances at 385 Hz and 820 Hz corresponding to the first and third structural mode deformations of the flexible structure 60.

Figure 18:
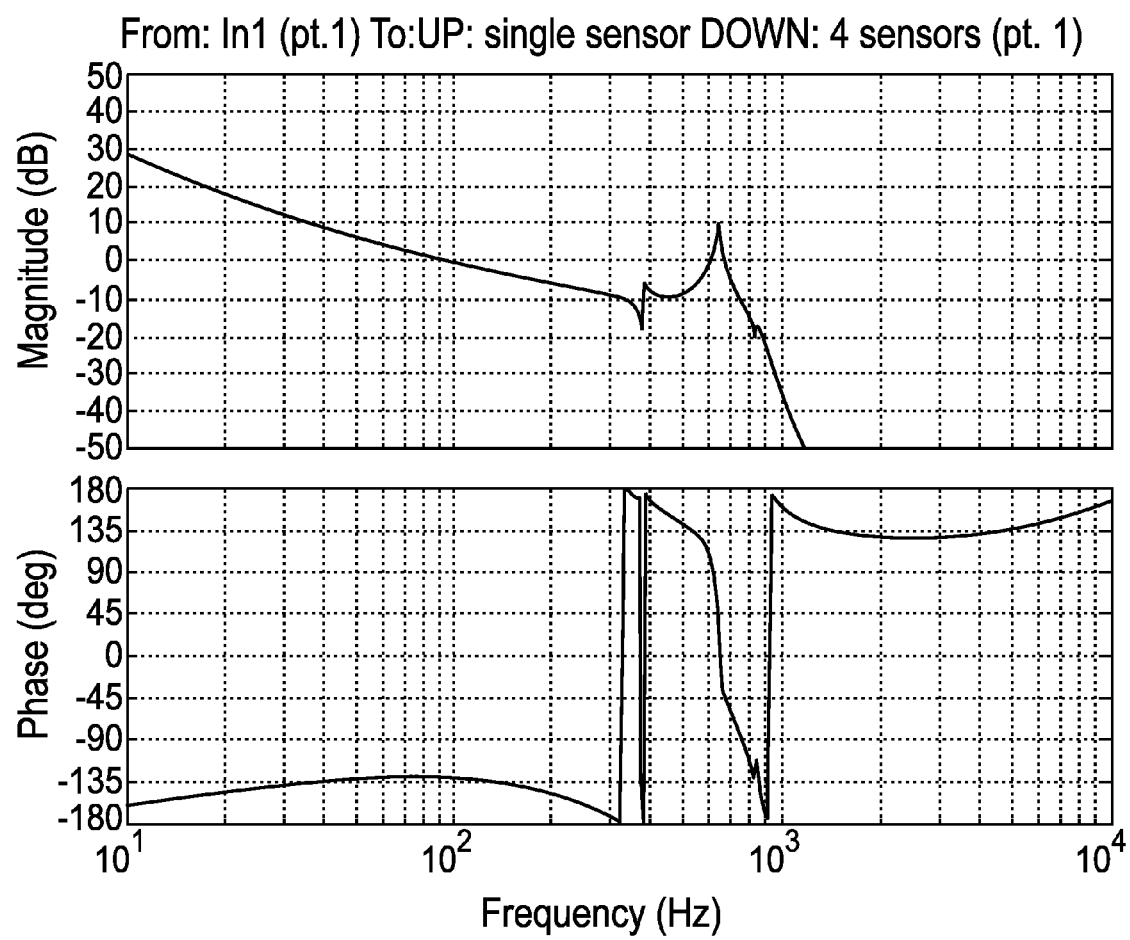
FIG. 18 is a graph depicting the open loop response of the servo system of FIG. 13 implemented for single acceleration sensor compensation as reflected in FIG. 17, except the servo controller is configured to employ two notch filters to the compensation signal generated by the servo controller, where the first notch filter is configured to attenuate the first structural mode of the flexible structure corresponding to the first input frequency at which a combination of masses and the springs of the structure exhibit resonance and where the second notch filter is configured to attenuate the third structural mode corresponding to the third input frequency at which another combination of masses and the springs of the structure exhibit resonance.

FIG. 18 depicts the open loop response of the servo controller with only a single feedback accelerometer configuration and switch 1302*c* set in the down position so that the servo controller 602 employs the series of notch filters 1318*a* and 1318*b*. As shown in FIG. 18, with the notch filters 1318*a* and 1318*b*, the servo controller 602 effectively eliminates the first and third structural modes of the flexible structure 60. FIG. 18 also indicates that the second structural mode corresponding to the resonant peak at approximately 600 Hz is phase stabilized.

Figure 19:
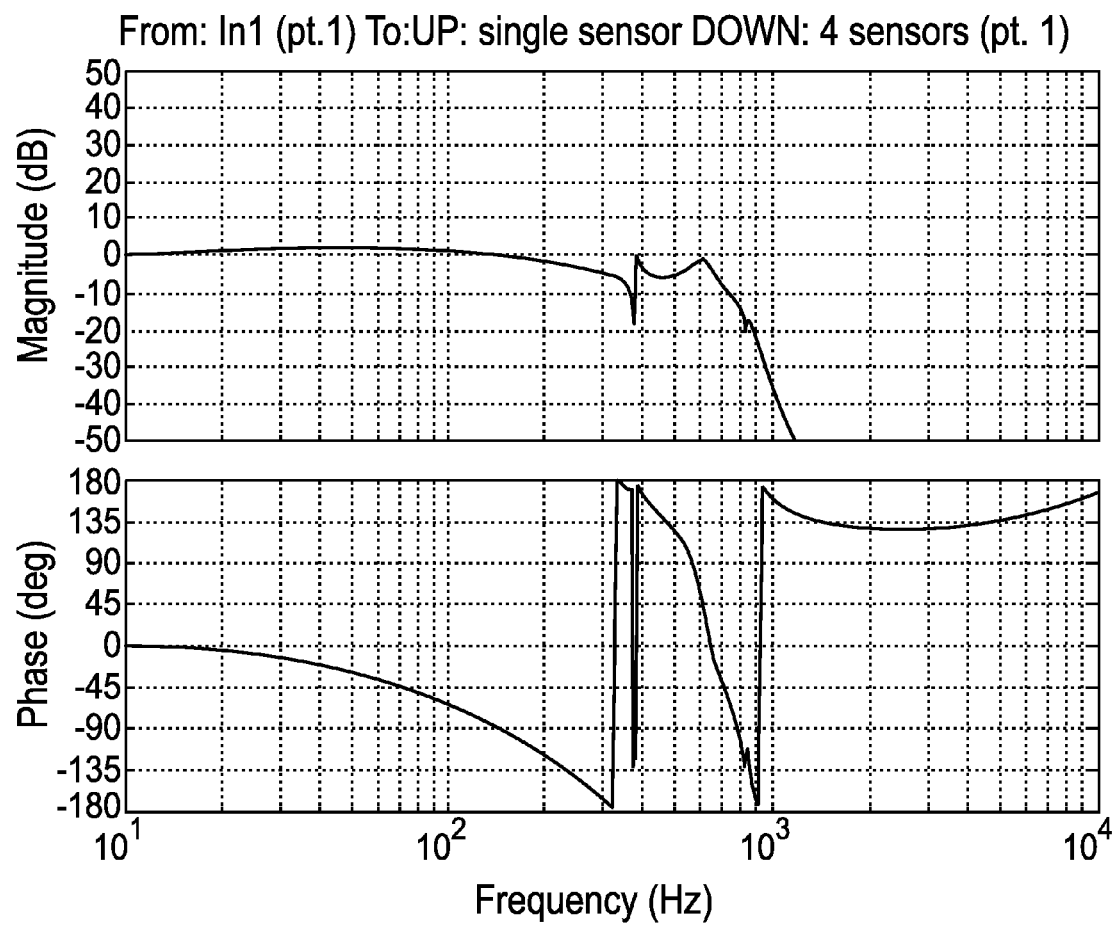
FIG. 19 is a graph depicting the closed loop response of the servo system of FIG. 13 implemented for single acceleration sensor compensation as reflected in FIG. 18 and employing the two notch filters to compensate for the first and third structural modes of the flexible structure.

The closed loop response of the servo controller 602 with the two notch filters 1318*a* and 1318*b* is depicted in FIG. 19. Examination of the Bode plot shown in FIG. 19 indicates that even though the notch filters 1318*a* and 1318*b* attenuate the structural resonance, the addition of the notch filters 1318*a* and 1318*b* adds enough phase loss that the servo loop bandwidth (0 dB crossover frequency) is severely compromised. Thus, with the single accelerometer sensor and notch filters configured to attenuate structural mode resonances attributed to the flexible structure's spring elements, it is likely impossible to close the servo loop above the resonances.

Figure 16B:
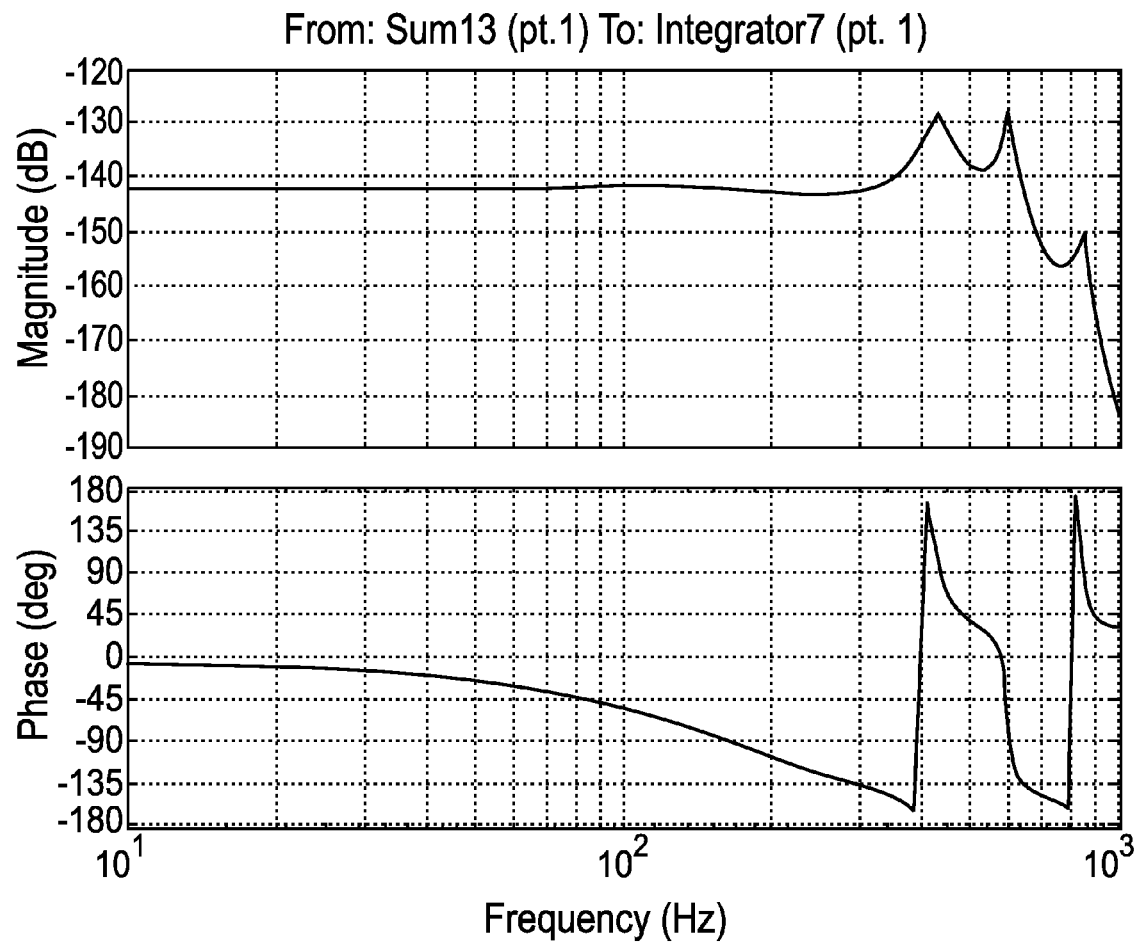
FIG. 16b is a graph depicting the TDRR for the servo system of FIG. 13 with an acceleration feedback from the last (e.g., fourth) sensor employed in the servo controller to adjust the compensation feedback signal to further compensate for an external disturbance applied to the flexible structure.
Figure 20:
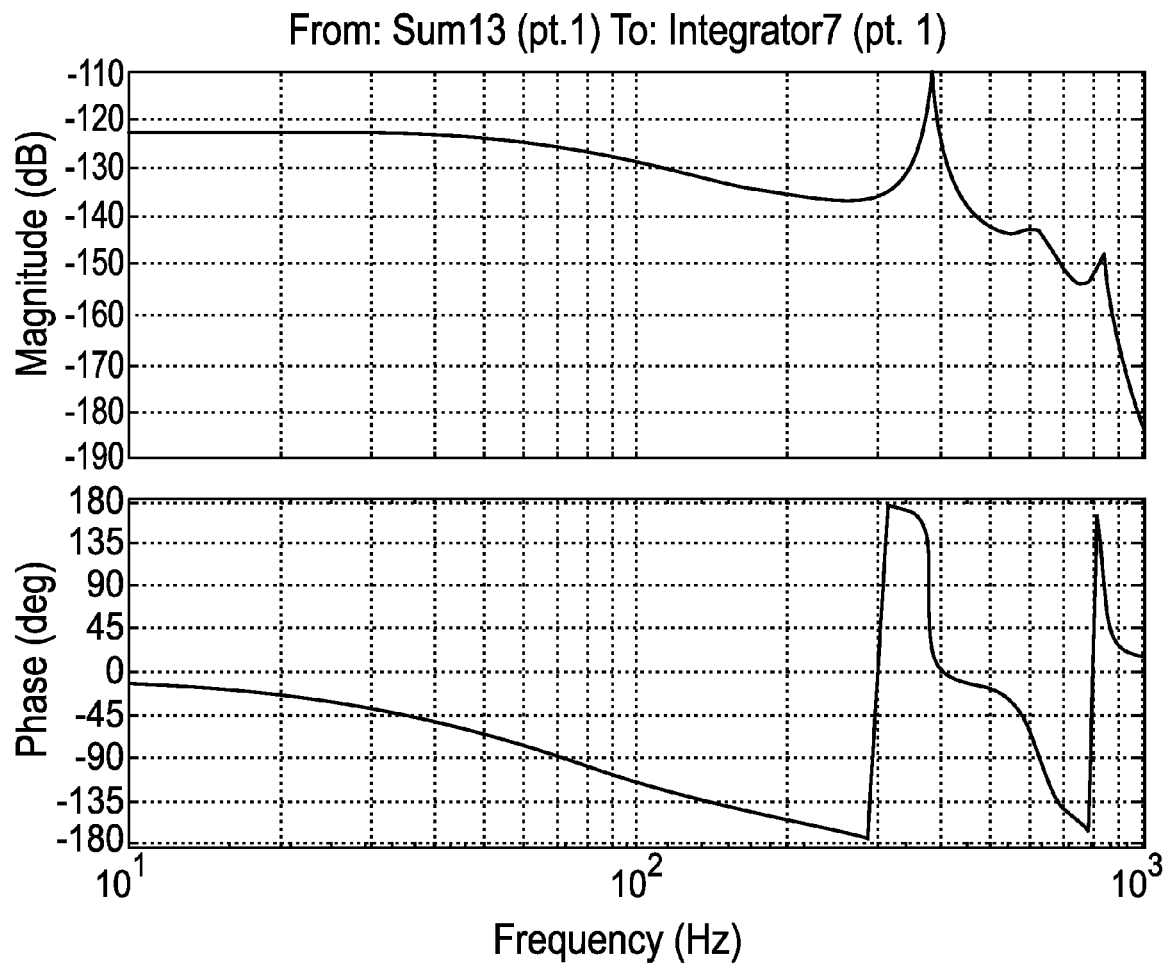
FIG. 20 is a graph depicting the TDRR for the servo system of FIG. 13 implemented for single acceleration sensor compensation as reflected in FIG. 18 and employing the two notch filters to compensate for the first and third structural modes of the flexible structure.

FIG. 20 depicts the TDRR for the servo controller 602 in the closed loop, single accelerometer sensor configuration and employing the notch filters 1318*a*-1318*b* similar to the implementation reflected in FIG. 17. Note that the TDRR magnitude shown in FIG. 16*b* for the all accelerometer sensor configuration (with the weighted sum signal 710 used as the compensation feedback signal 1312) is significantly lower (by approximately 20 dB) than the TDRR magnitude shown in FIG. 20 for the single accelerometer sensor configuration with servo controller 602 employing the notch filters 1318*a*-1318*b*. At low frequencies (e.g., less than 100 Hz), the TDRR of the servo controller 602 for the all accelerometer sensor configuration shown in FIG. 16*b* is lower than the TDRR of the servo controller 602 for the single accelerometer sensor configuration with the notch filters 1318*a*-1318*b* shown in FIG. 20 because the open loop gain using all four accelerometers is much higher than when only one accelerometer is used to generate the compensation feedback signal 1312 for adjusting the movement signal applied to the movement input 114 of the motor 108.

Figure 21:
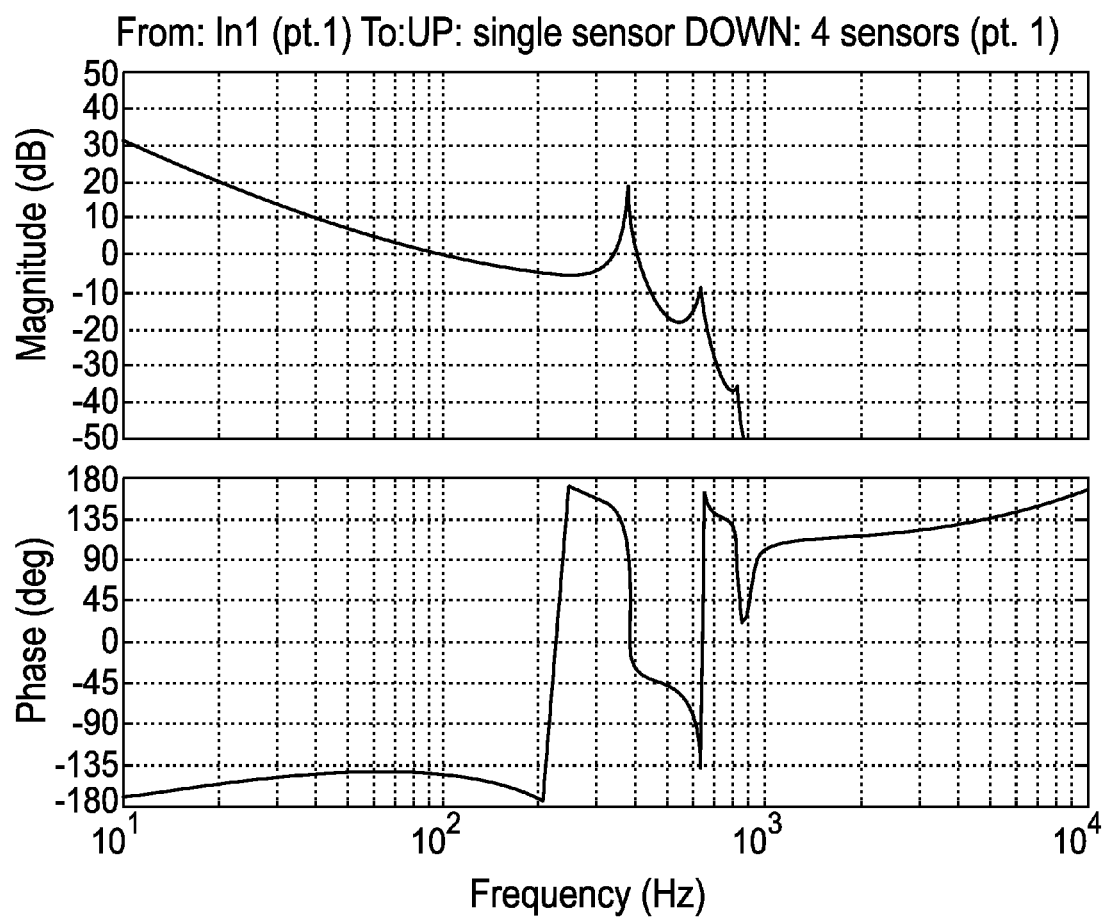
FIG. 21 is a graph depicting the open loop response of the servo system of FIG. 13 implemented for single acceleration sensor compensation as reflected in FIG. 17, except the servo controller is configured to employ a low pass filter to the compensation feedback signal generated by the servo controller to phase stabilize the structural modes of the flexible structure.

FIG. 21 shows a Bode plot of the open loop response of the servo controller 602 in the single accelerometer sensor configuration (i.e., using a single accelerometer sensor 104 to generate the compensation feedback signal 1312) and employing the low pass, phase stabilization filter 1316 rather than the notch filters 1318*a*-138*b*. In this configuration, switches 1302*d* and 1302*e* are still in the up position, switch 1302*c* remains in the down position to remove the acceleration feedback 1310, and switches 1302*a* and 1302*b* are both in the up positions so that the servo controller 602 employs the phase stabilization filter 1316 rather the series of notch filters 1318*a*-1318*b*.

Figure 22:
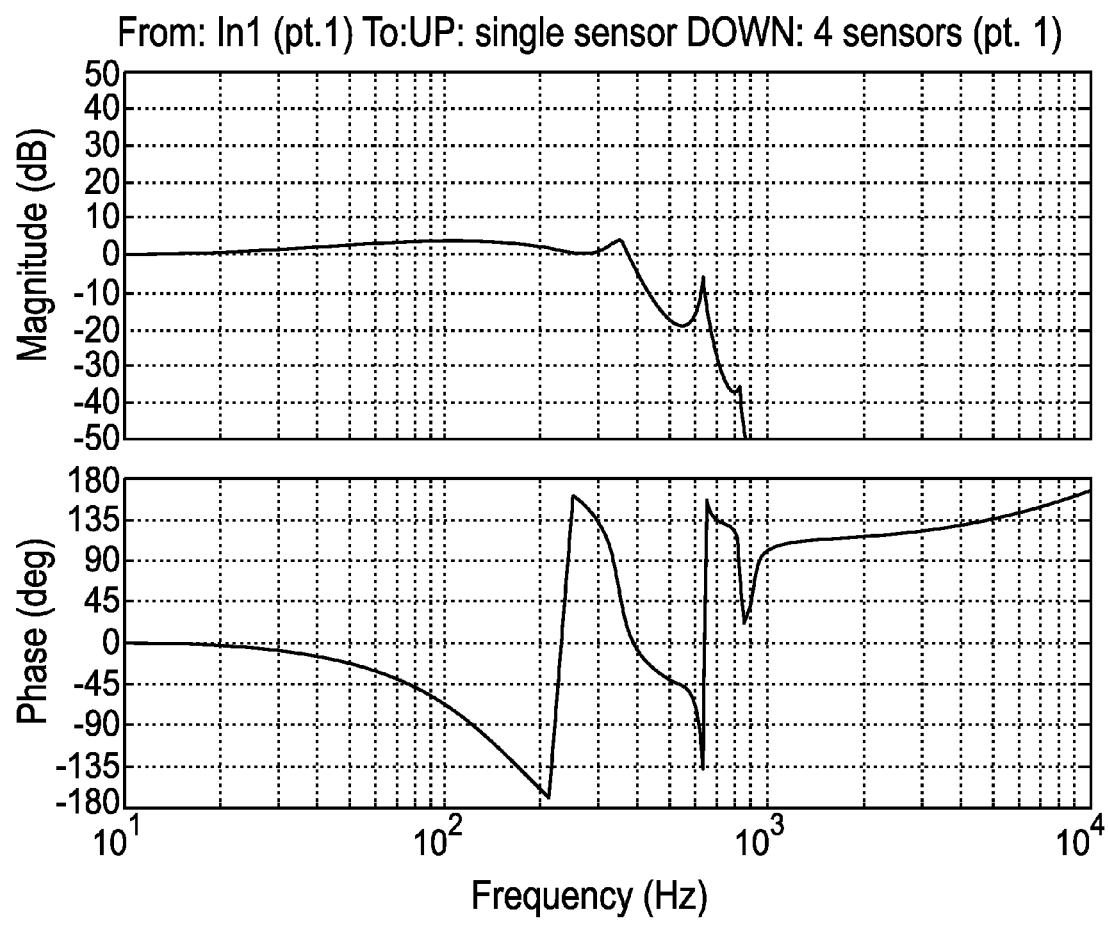
FIG. 22 is a graph depicting the closed loop response of the servo system of FIG. 13 implemented for single acceleration sensor compensation as reflected in FIG. 21 and employing the low pass filter to the compensation feedback signal generated by the servo controller to phase stabilize the first structural mode of the flexible structure.

For comparison, FIG. 22 shows a Bode plot of the closed loop response of the servo controller 602 in the single accelerometer sensor configuration and employing the low pass, phase stabilization filter 1316. As shown in comparing FIG. 19 and FIG. 22, the performance of the servo controller 602 with phase stabilizing is better than with a notch filter in the single accelerometer sensor configuration and the resonance damping of the first structural resonance by the servo controller 602 with the phase stabilization is approximately the same as that exhibited when acceleration feedback is used with acceleration feedback from all the acceleration sensors.

Figure 23:
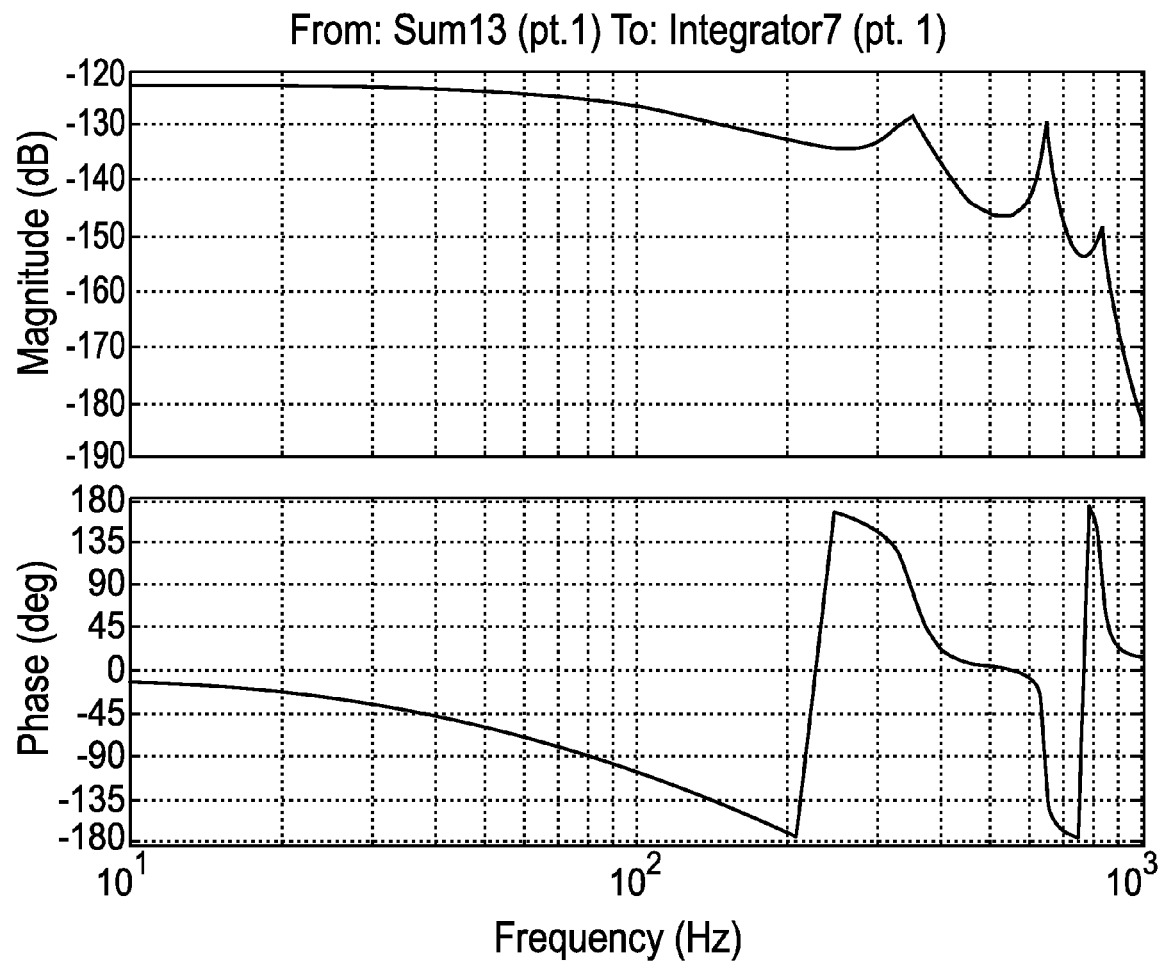
FIG. 23 is a graph depicting the TDRR for the servo system of FIG. 13 implemented for single acceleration sensor compensation as reflected in FIG. 22 and employing the low pass filter to the compensation feedback signal generated by the servo controller to phase stabilize the first structural mode of the flexible structure.

FIG. 23 depicts the TDRR for the servo controller 602 in the closed loop, single accelerometer sensor configuration and employing the phase stabilization filter 1316 similar to the implementation reflected in FIG. 22. As shown in FIG. 23, the TDRR at the first structural resonance at approximately 350 Hz is well damped because phase stabilization damps this resonance. However, the TDRR magnitude shown in FIG. 16b for the all accelerometer sensor configuration (with the weighted sum signal 710 used as the compensation feedback signal 1312) at low frequencies (e.g., less than 100 Hz) is still significantly lower than the TDRR magnitude shown in FIG. 23 for the single accelerometer sensor configuration with servo controller 602 employing the phase stabilization filter 1316.

As previously noted, a servo system having a servo controller consistent with the servo controller 602 depicted in FIG. 13 and using multiple accelerometers may be used to control a flexible azimuth gimbal structure or a flexible elevation gimbal structure or a combination of both structures in a two axis gimbal system. The Bode plots illustrated in FIGS. 25-31 were taken from a simulation model of a two axis gimbal that is modeled as several coupled masses similar to the flexible structure 60 shown in FIG. 6 and mechanically modeled as 700 in FIGS. 7 and 13. Each mass has both moments and products of inertia, and each mass is coupled to the other masses with springs and dampers similar to the flexible structure 60 as modeled in FIGS. 7 and 13. The outer axis of the gimbal system is the azimuth gimbal, and the inner axis of the gimbal system is the elevation gimbal. The azimuth gimbal has a yoke shape with opposing yoke arms centered about the azimuth axis of rotation. The elevation gimbal (which has a ring shape) is coupled between the yoke arms of the azimuth gimbal using elevation bearings. Each elevation bearing has a radial and axial stiffness and damping such that each elevation bearing functions as a spring when subject to particular input frequencies. In the yaw or pitch degree of freedom, the azimuth gimbal is modeled as three masses 52a-52c with corresponding inertias coupled by torsion springs 56a-56b, with the azimuth motor driving the lower mass inertia (e.g., 52a) of the azimuth gimbal and the elevation gimbal that is coupled to the upper mass inertia of the azimuth gimbal (e.g., 52c). There are accelerometers 104a-104c attached to each of the mass inertias (e.g., 52a-52c).

Figure 24:
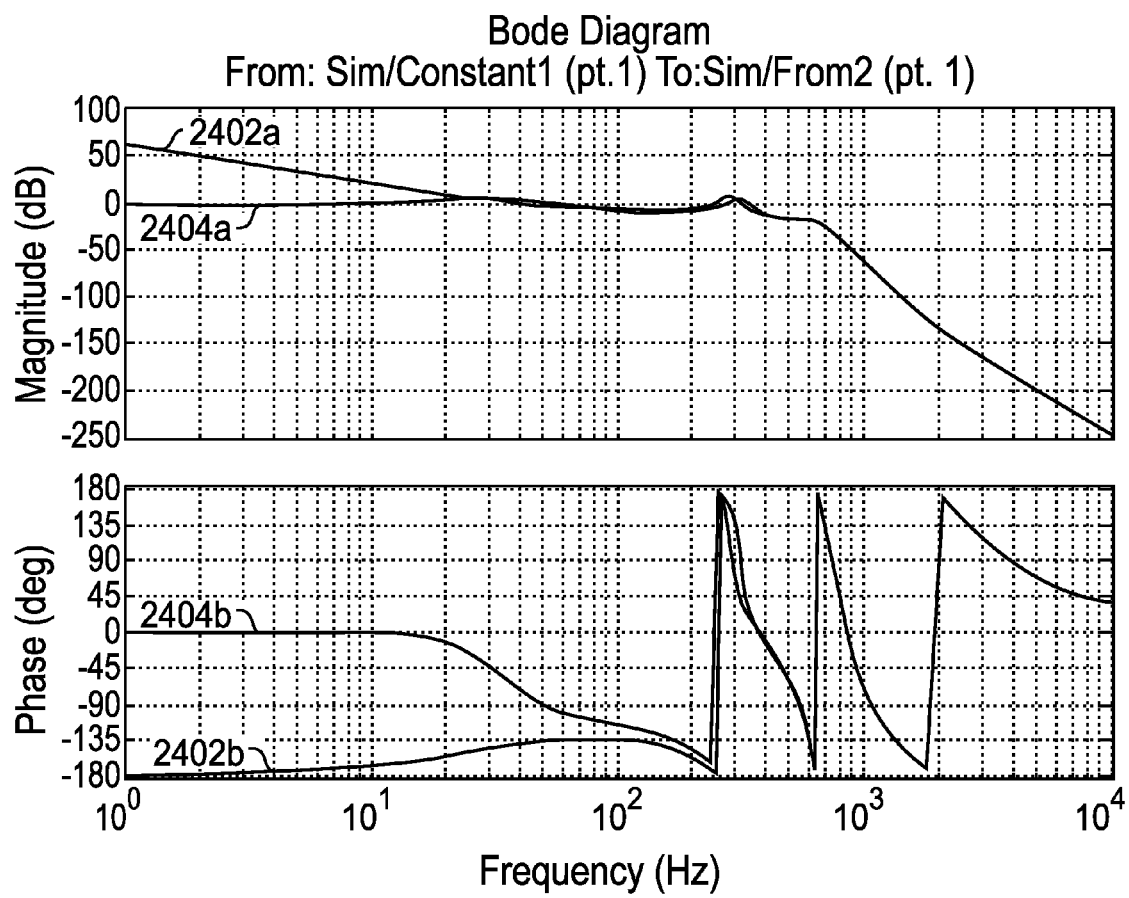
FIG. 24 is a graph depicting Bode plots of the open and closed loop responses of a servo system consistent with the principles of the present invention configured to control a flexible structure corresponding to the azimuth gimbal of a two axis gimbal system when only the accelerometers in the elevation gimbal are used by the servo controller of the servo system to compensate for structural modes of the gimbal system and no notch filter or other compensating filter is used to stabilize the servo controller.
Figure 25:
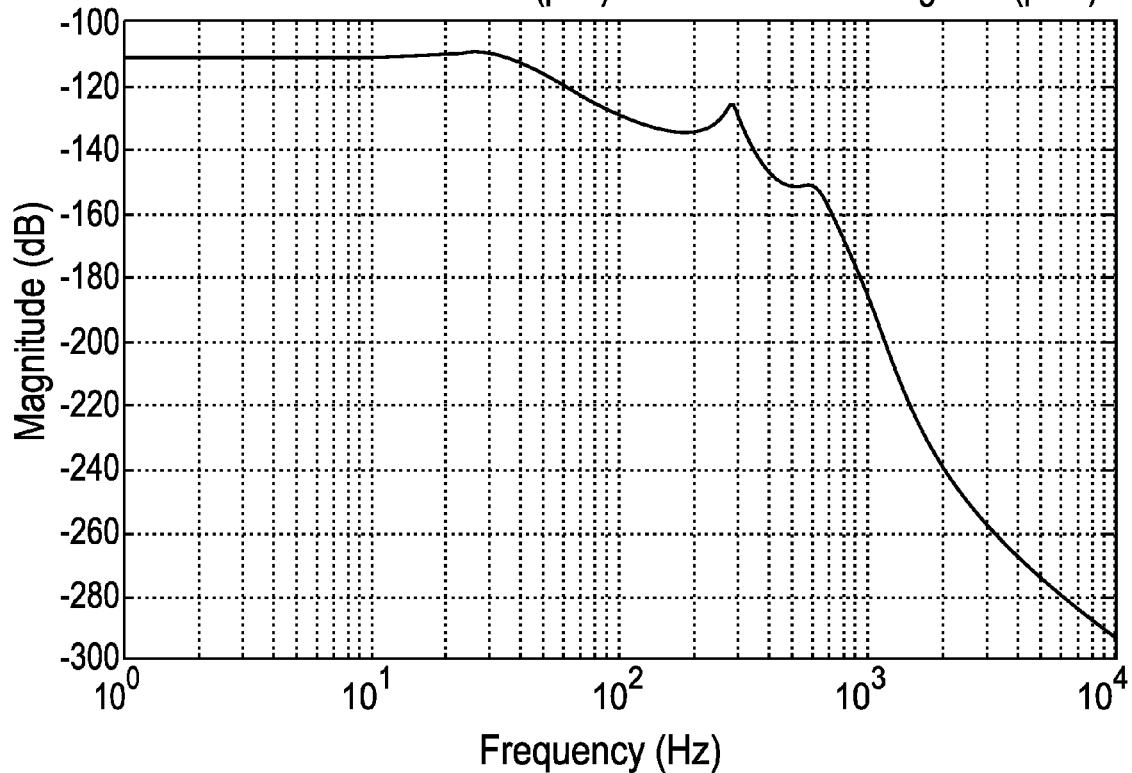
FIG. 25 is a graph depicting the TDRR of a servo system for controlling a flexible structure corresponding to the azimuth gimbal of a two axis gimbal system as reflected in FIG. 24.

FIG. 24 shows the open and closed loop Bode plots (respectively referenced as 2402 and 2404) of the servo controller consistent with the servo controller 602 in FIG. 13 for controlling the gimbal flexible structure as described when only the accelerometers 110 attached to the elevation gimbal are used and no notch filter, no phase stabilization filter or other compensating filter is used to stabilize the servo controller. As shown in FIG. 24, there is a strong structural mode resonance at 300 Hz in the open loop response. This servo controller was stabilized by turning down the gain until the resonance at 300 Hz was stable. FIG. 25 depicts the TDRR for this servo controller when an external disturbance input 1320 is applied to the elevation gimbal mass of the above described flexible gimbal structure. As shown in FIG. 25, at low frequencies (e.g., less than 30 Hz), the TDRR is −115 dB rad/in-lb. This indicates that the flexible gimbal structure will exhibit a LOS jitter of 1.8 μrad for every inch-pound of torque applied to the gimbal at low frequencies and less than 1.8 μrad/in-lb at higher frequencies.

Figure 26:
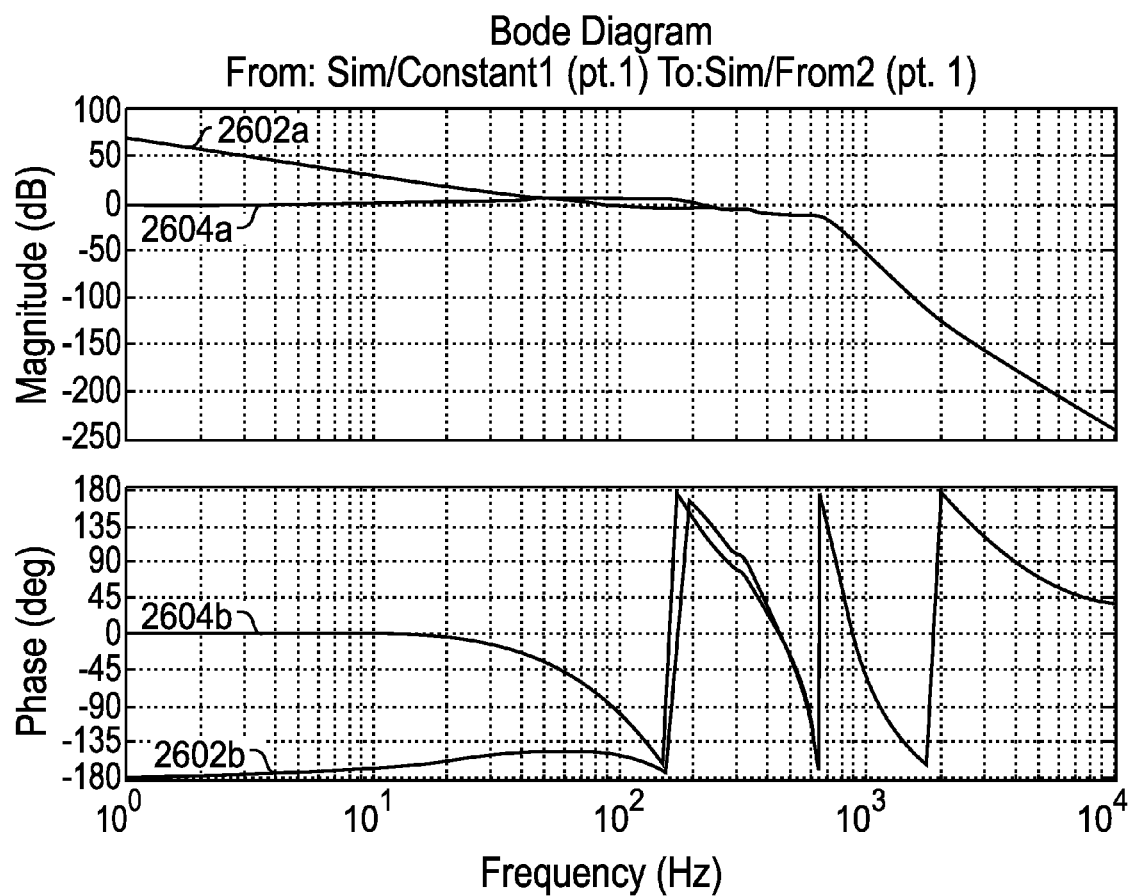
FIG. 26 is a graph depicting Bode plots of the open and closed loop responses of a servo system consistent with the principles of the present invention configured to control a flexible elevation and azimuth structure corresponding to the azimuth gimbal of a two axis gimbal system as reflected in FIG. 24 when only the accelerometers in the elevation gimbal are used by the servo controller, except a notch filter is used by the servo controller to stabilize the servo controller by reducing at least one of the structural modes of the flexible elevation and azimuth gimbal structure.
Figure 27:
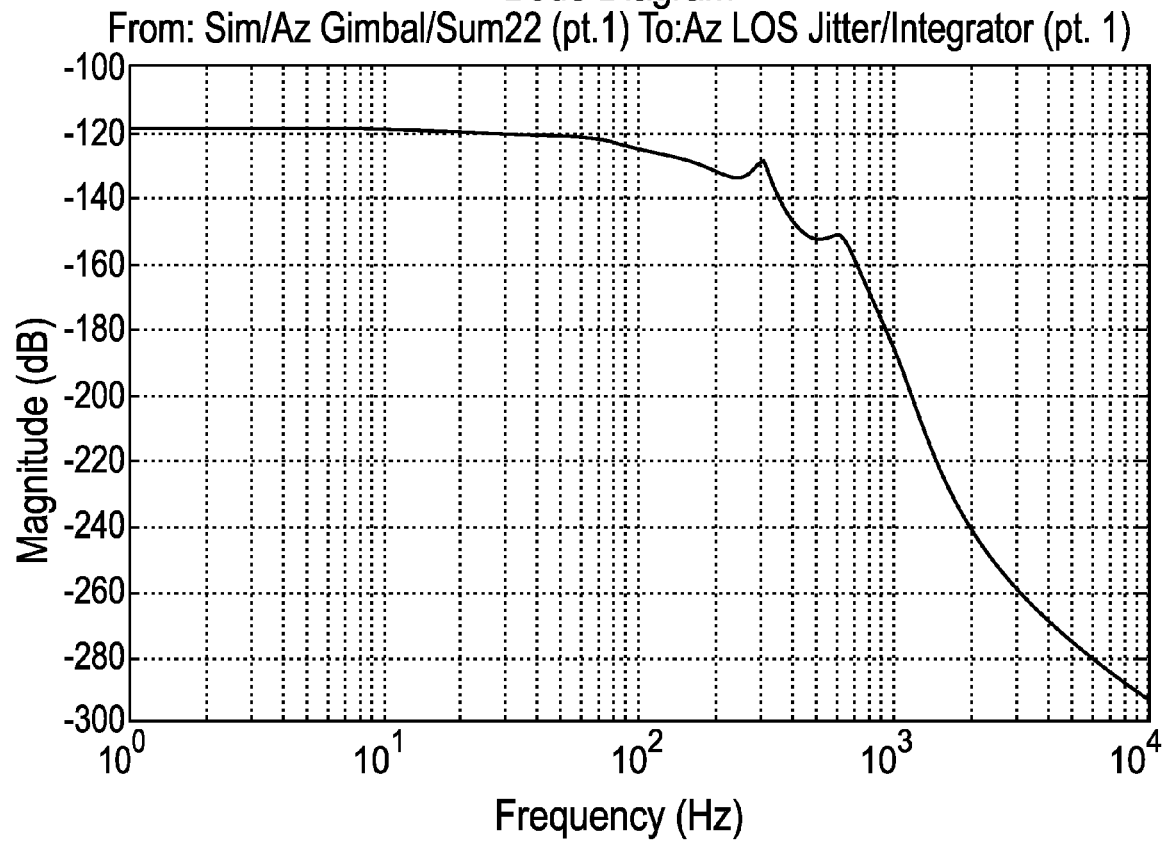
FIG. 27 is a graph depicting the TDRR of the servo system for controlling the flexible elevation and azimuth gimbal structure of a two axis gimbal system as reflected in FIG. 26.

FIG. 26 shows the open and closed loop Bode plots (respectively referenced as 2602 and 2604) of the servo controller consistent with the servo controller 602 in FIG. 13 for controlling the gimbal flexible structure as described when only the accelerometers 110 attached to the elevation gimbal are used and a notch filter is employed to further adjust the compensation feedback signal 1312 to stabilize the servo controller for the resonant peak disturbance exhibited at 300 Hz. As shown in FIG. 26, the strong structural mode resonance at 300 Hz in the open loop response has been eliminated by the notch filter. FIG. 27 depicts the TDRR for this servo controller when an external disturbance input 1320 is applied to the elevation gimbal mass of the above described flexible gimbal structure. At low frequencies (e.g., less than 30 Hz), the TDRR is −119 dB rad/in-lb. This indicates that the flexible gimbal structure will exhibit a LOS jitter of 1.1 μrad for every inch-pound of torque applied to the gimbal structure at low frequencies and less than 1.1 μrad/in-lb at higher frequencies.

Figure 28:
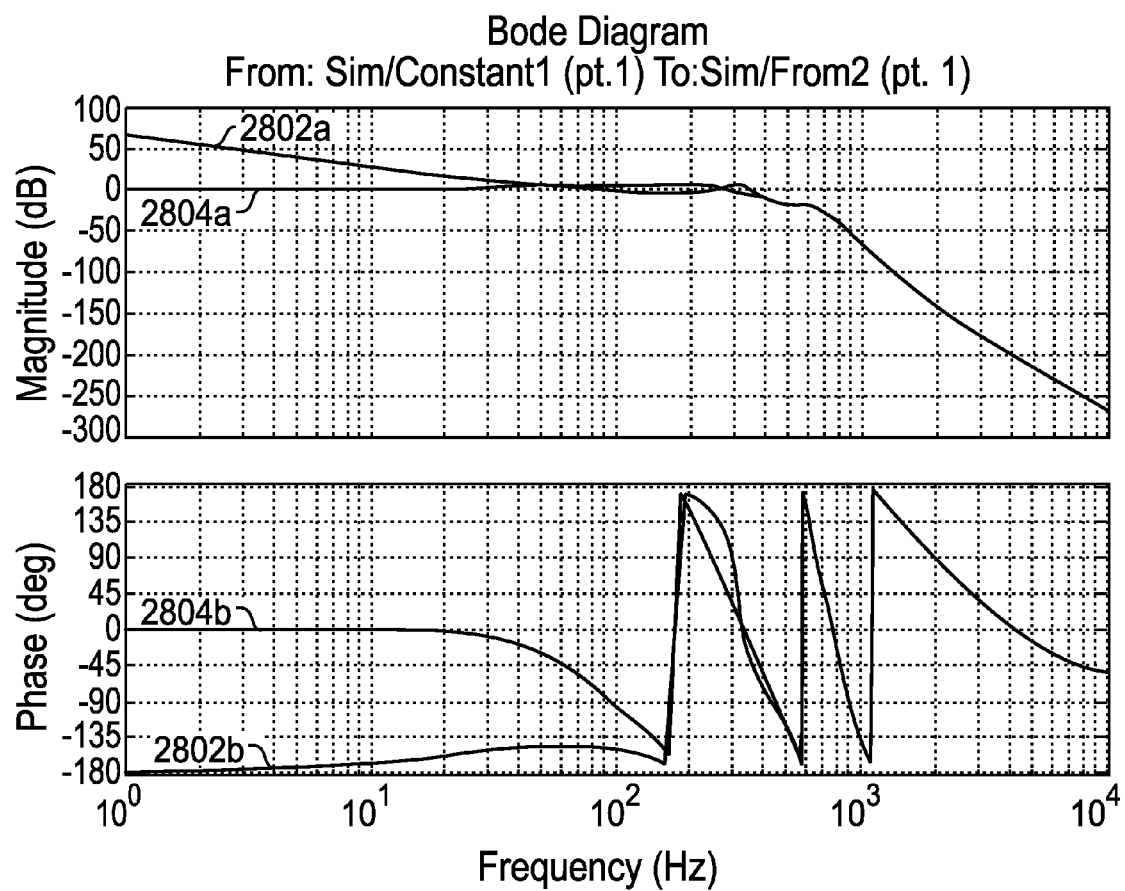
FIG. 28 is a graph depicting Bode plots of the open and closed loop responses of a servo system consistent with the principles of the present invention configured to control a flexible elevation and azimuth gimbal structure of a two axis gimbal system when only the accelerometers in the elevation gimbal are used by the servo controller, except a low pass filter is used by the servo controller to phase stabilize the servo controller.

FIG. 28 shows the open and closed loop Bode plots (respectively referenced as 2802 and 2804) of the servo controller consistent with the servo controller 602 in FIG. 13 for controlling the gimbal flexible structure as described when only the accelerometers 110 attached to the elevation gimbal are used and a low pass, phase stabilization filter (e.g., 1316) is employed to further adjust the compensation feedback signal 1312 to stabilize the servo controller for the resonant peak disturbance exhibited at 300 Hz. As shown in FIG. 28, there is a strong structural mode resonance at 300 Hz in the open loop response that is damped in the closed loop response due in part to the phase stabilization filter 1316 employed in the servo controller to further adjust the compensation feedback signal to the azimuth gimbal torquer motor. This implementation of the servo controller with the phase stabilization filter 1316 is a robust design since a change in the damping or frequency of the 300 Hz resonance will not cause the servo to become unstable.

Figure 29:
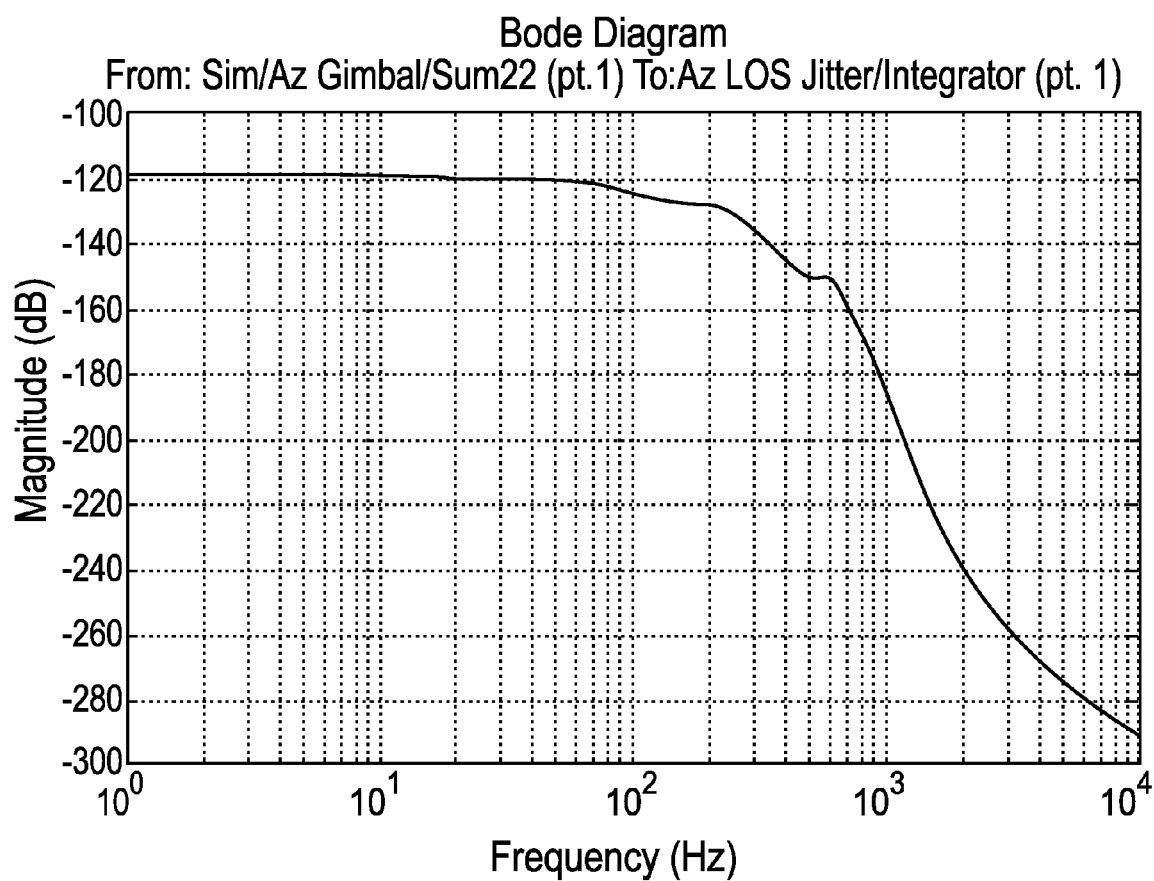
FIG. 29 is a graph depicting the torque disturbance rejection ratio (TDRR) of the servo system for controlling the flexible elevation and azimuth gimbal structure of a two axis gimbal system as reflected in FIG. 28.

FIG. 29 depicts the TDRR for this servo controller when an external disturbance input 1320 is applied to the elevation gimbal mass of the above described flexible gimbal structure. As shown in FIG. 29, at low frequencies (e.g., less than 50 Hz), the TDRR is −119 dB rad/in-lb. This indicates that the flexible gimbal structure will exhibit a LOS jitter of 1.1 μrad for every inch-pound of torque applied to the gimbal at low frequency and less than 1.1 μrad/in-lb at higher frequencies. Examination of the TDRR curve in FIG. 29 also indicates that the structural mode resonance at 300 Hz is damped for this servo controller with the phase stabilization filter, while the same structural mode resonance at 300 Hz for the servo controller configured with a notch filter is not damped.

Figure 30:
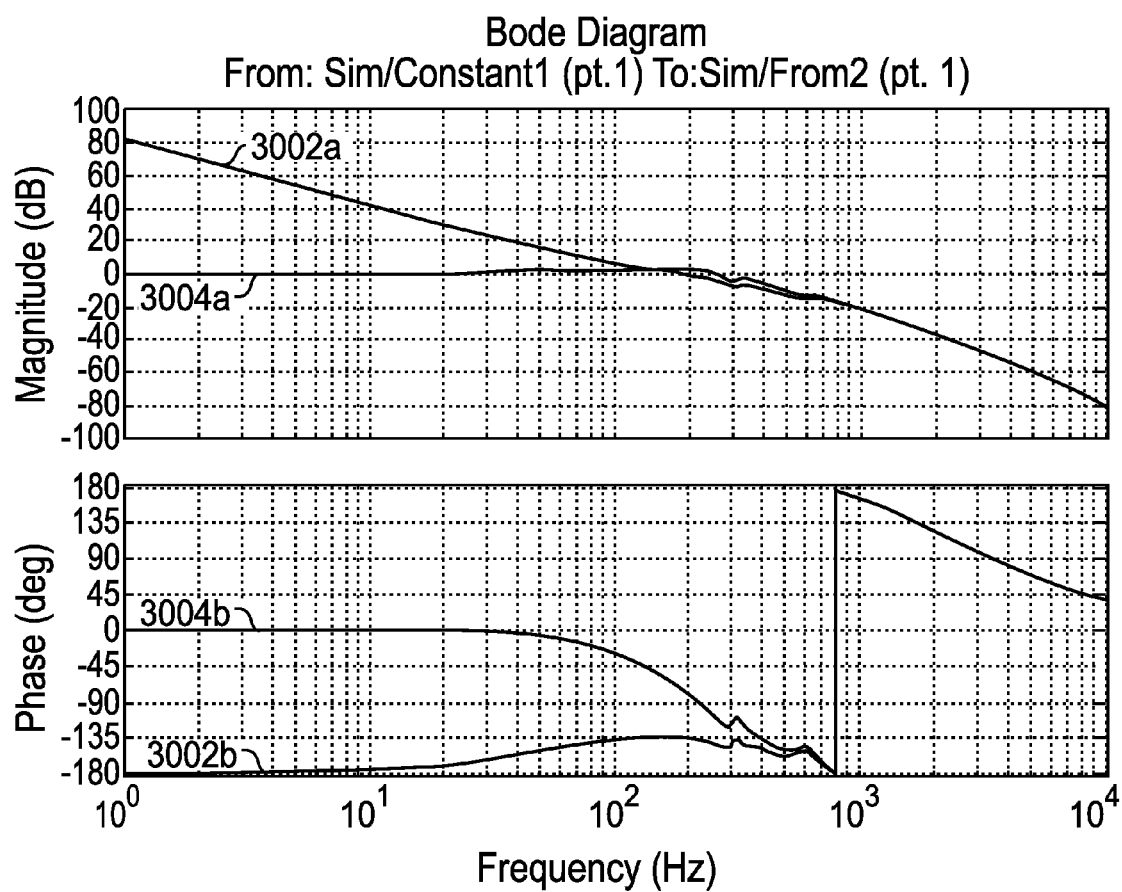
FIG. 30 is a graph depicting Bode plots of the open and closed loop responses of a servo system consistent with the principles of the present invention configured to control a flexible elevation and azimuth gimbal structure of a two axis gimbal system when each of the plurality of accelerometers disposed relative to masses of the flexible elevation gimbal structure and each of the plurality of accelerometers disposed relative to masses of the flexible azimuth gimbal structure are each used to generate a compensation feedback signal.

FIG. 30 depicts the open and closed loop Bode plots (respectively referenced as 3002 and 3004) of the servo controller consistent with the servo controller 602 in FIG. 13 for controlling the gimbal flexible structure as described when all the accelerometers 104 attached to the azimuth and elevation gimbals (i.e., attached to each mass 52 of the flexible gimbal structure) are used by the servo controller to generate the compensation feedback signal based on the weighted sum (e.g., 710) of the accelerations 110 of all the accelerometers. As shown in FIG. 30 in comparison to FIG. 24, when the servo controller is configured to generate the compensation feedback signal 1312 based on the weighted sum of all the sensed accelerations of the masses 52 coupled to spring elements 56 in the flexible gimbal structure, the magnitude of the torque input to the azimuth motor is effectively constant at low frequencies (e.g., less than 200 Hz) below the structural mode disturbance frequency (e.g., 300 Hz shown in FIG. 24) and the resonant peak disturbance at 300 Hz is effectively eliminated. The remaining small ripples in the gain and phase curve at 300 Hz in FIG. 30 are caused by inertia coupling of the various masses 52 in the flexible gimbal structure. The servo controller performance, when using all the accelerometer sensors 104 to generate the compensation feedback signal 1312, now is only limited by the frequency response of the power amplifier of the azimuth torquer motor (e.g., corresponding to 108 in FIG. 13) and the iteration rate of the servo controller. For this gimbal design, a digital servo controller with an iteration rate of 40 kHz is used, and the phase loss of this controller is approximated by a first order lag at 4 kHz. The power amplifier current loop is closed at 3000 Hz. Because the structural mode resonances associated with the flexible gimbal structure are no longer a concern, the servo controller gain may be raised so that the crossover frequency is now 170 Hz.

Figure 31:
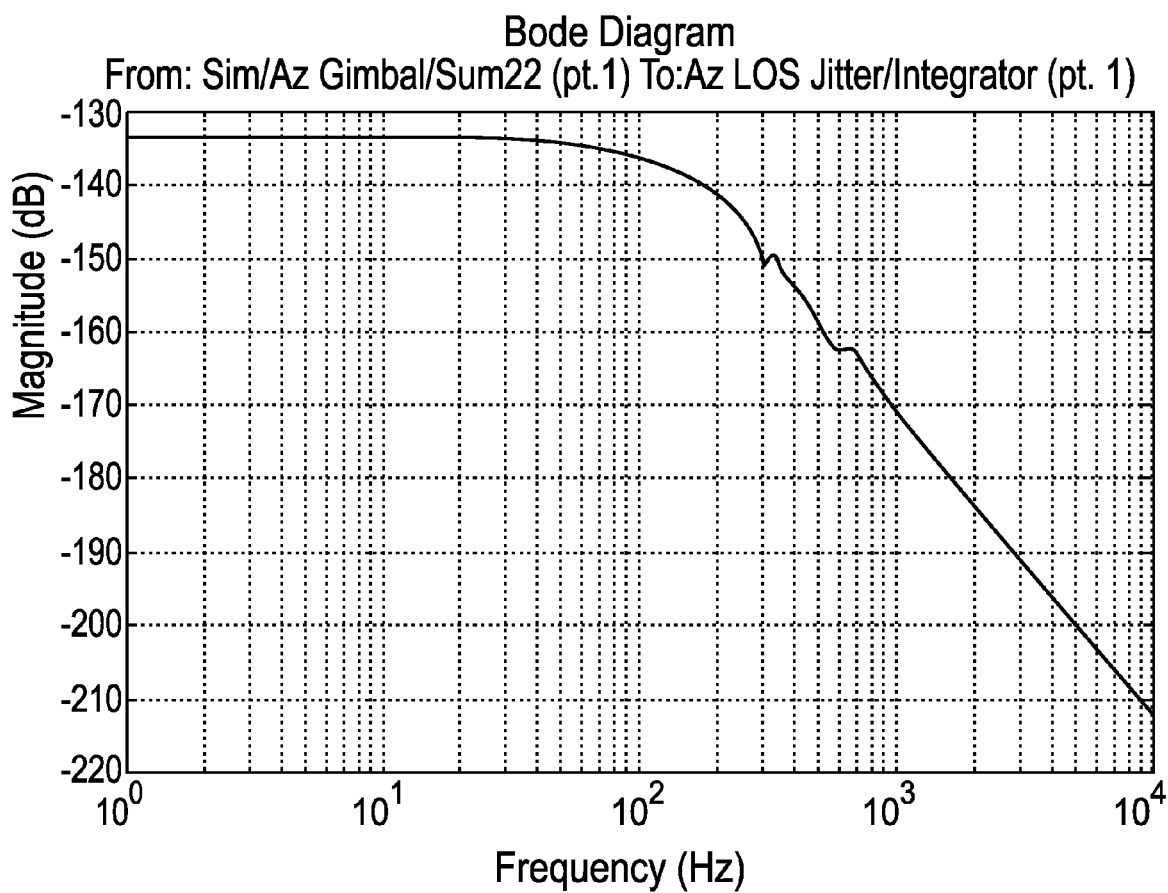
FIG. 31 is a graph depicting the torque disturbance rejection ratio (TDRR) of the servo system for controlling the flexible elevation and azimuth gimbal structure of a two axis gimbal system as reflected in FIG. 30.

FIG. 31 depicts the TDRR for this servo controller (configured to use all the sensed accelerations to generate the compensation feedback signal 1312 as described herein) when an external disturbance input 1320 is applied to the elevation gimbal mass of the above described flexible gimbal structure. As shown in FIG. 31, the TDRR now is −134 dB at low frequencies (e.g., 50 Hz) or 0.2 μrad/in-lb, five times better than the TDRR shown in FIG. 25, in which the servo controller is configured to use only the accelerations of the accelerometers mounted to the elevation gimbal. Furthermore, this all acceleration sensor configuration of the servo controller is robust as changes in frequency or damping of the structural modes do not affect the open loop response as shown in FIG. 30.

A further benefit of using multiple accelerometers in a servo system consistent with the principles of the present invention can be seen by examining FIG. 31 in comparison with FIGS. 27 and 29. Note that the amplitude at 300 Hz in FIG. 31 is lower than the amplitude at 300 Hz shown in FIG. 27 (i.e., servo controller using only elevation gimbal acceleration sensors and a resonant peak notch filter 1318) and lower than the amplitude at 300 Hz shown in FIG. 29 (i.e., servo controller using only elevation gimbal acceleration sensors and a phase stabilization filter 1316). Thus, the multiple accelerometer configuration servo controller dampens the mechanical resonance at 300 Hz better than the other two designs.

To further confirm that servo controllers implemented to use accelerometer sensors mounted on a gimbal flexible structure is effective to eliminate structural modes associated with the flexible gimbal structure, the inventor utilized a commercially available NASTRAN modeling program (although another finite element analysis modeling program may have been used) to model a two axis gimbal system having a flexible gimbal structure (the "NASTRAN" modeled servo system).

FIG. 41 is a drawing of the gimbal used for this analysis. This analysis differs from the previous analyses in that this structure is a continuous structure and not a lumped element structure. In other words, the structure is not formed of distinct masses or inertias and springs. The outer azimuth gimbal was analyzed using a NASTRAN structural model and excited with a unit torque at the Azimuth motor. The acceleration was measured at the location of each of twelve accelerometers. The accelerations were measured in the direction perpendicular to the drawing (i.e., out of the paper). Note that the accelerometers are installed in pairs, and the calculated accelerations of each pair of accelerometers were differenced, which was divided by the distance between the accelerometers to produce an angular acceleration.

Because of the continuous structure, the weighting coefficients are determined by a trial and error analysis rather than calculated from known inertias, and the location of the accelerometers are determined either (i) by analysis using trial and error with NASTRAN (or any other suitable finite element modeling program) or (ii) by trial and error using the real hardware. In this case, the trial and error to determine the weighting coefficients was done using a Microsoft Excel® spreadsheet. For a continuous structure, the concept of inertia that is used for simple lumped element models is no longer valid. As understood in the art, any measurement made of the inertia of the gimbal results in an inertia that is frequency dependent.

The modeled flexible gimbal structure 4100 has more masses 52 and coupling spring elements 56 than in the previously described two axis gimbal system having three inertia masses 52 and in the flexible structures 50 or 60 having two and four inertia masses 52, respectively. The NASTRAN modeled servo system has three sets of accelerometers 4102a and 4102b (collectively 4102), 4103a and 4103b (collectively 4103), and 4104a and 4104b (collectively 4104), disposed on the azimuth gimbal yoke, two sets of accelerometers 4105a and 4105b (collectively 4105), and 4106a and 4106b (collectively 4106) disposed on the elevation gimbal, and one set of accelerometers 4107a and 4107b (collectively 4107) disposed on an optical bed 4116. The accelerometers are linear accelerometers used in pairs to measure angular acceleration. The angular acceleration is calculated from the measured linear accelerations from each of the pairs of accelerometers by taking the difference of the two accelerations and dividing by the distance between the accelerometers. In this implementation, a servo controller, which includes the azimuth gimbal control electronics 4108 and elevation gimbal control electronics 4109, is consistent with the servo controller 602, except the servo controller generates a respective collective acceleration based on a difference between the accelerations (e.g., 4102 for the first set) sensed by each of the respective set or pair of sensors (e.g., two sensors 4102 located on the flexible gimbal structure 4100) divided by the predetermined distance between the respective set of sensors. The weighted sum of each of the collective accelerations from each of the sensor pairs is generated by the servo controller and used as the compensation feedback signal internal to the azimuth and elevation gimbal control electronics 4108 and 4109. In addition, in this implementation, the gimbal system 4100 of the NASTRAN modeled servo system may be mounted on a ground vehicle, so the elevation axis is above the azimuth gimbal bearing assembly 4113 that defines the azimuth axis of rotation and about which the azimuth gimbal yoke arms rotate.

The first set 4102 of the three sets of accelerometers for the azimuth gimbal 4110 is mounted a first predetermined distance apart on the fore and aft sides of the azimuth gimbal yoke just above the azimuth gimbal torquer motor 4112 and the azimuth gimbal bearing assembly 4113. Structurally, the first set or pair 4102 of accelerometers is closest to the azimuth torquer motor 4112. The second set of accelerometers 4103 is mounted a second predetermined distance apart on the left and right sides of the azimuth gimbal 4110 about 2 inches above the azimuth gimbal bearing 4112. The third set of accelerometers 4104 is mounted a third predetermined distance apart on the left and right sides of the azimuth yoke arms in line with the elevation bearings 4114.

The fourth set of accelerometers 4105 is mounted a fourth predetermined distance apart on the left and right sides of the elevation gimbal ring 4111, just inside of the elevation bearings that connect the elevation gimbal ring 4111 between the azimuth gimbal 4110 yoke arms. The fifth set of accelerometers 4106 is mounted a fifth predetermined distance apart on the fore and aft sides of the elevation gimbal ring 4111. In this implementation, the elevation gimbal ring 4111 is nearly horizontal when the line of sight elevation angle is zero. The sixth set of accelerometers 4107 is attached to the optical bed 4115. The sixth sensor could also be a gyro mounted on the optical bed 4116 that is attached to the elevation gimbal ring 4111 even though a gyro 4117 typically does not measure angular acceleration, but rather measures angular rate or angular position, the gyro 4117 is still valid to measure the angular acceleration at the optical bed 4116 for purposes of this analysis.)

Figure 32:
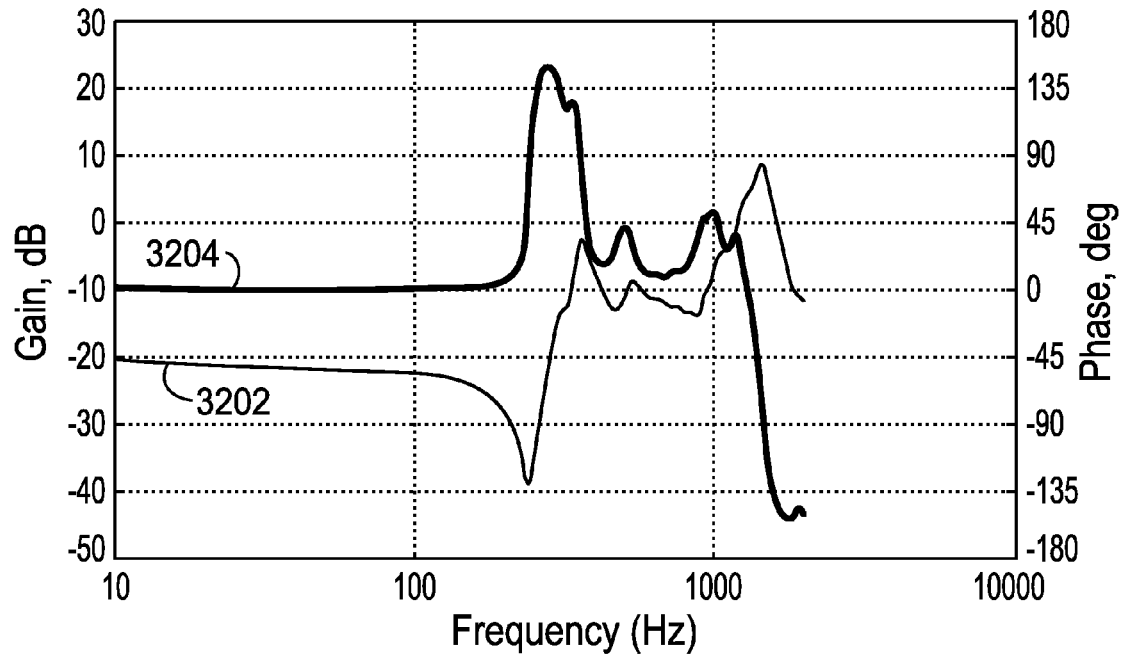
FIG. 32 is a graph depicting the torque to angular acceleration transfer function of the first set of accelerometers mounted on the azimuth gimbal of FIG. 41 near the bottom of the azimuth gimbal showing the response of the flexible gimbal structure and used by a servo controller (implemented consistent with the present invention using a NASTRAN finite element analysis modeling program) to control the flexible gimbal structure in accordance with the principles of the present invention.

FIG. 32 is a graph depicting the torque to angular acceleration transfer function (i.e., the gain versus input frequency and the phase versus input frequency) for the first set of accelerometers used by the servo controller of the NAS-TRAN servo system to control the flexible gimbal structure 4100, where the flexible gimbal structure 4100 is excited by the azimuth torquer motor 4112. As previously noted, the first two accelerometers 4102 comprising the first set of accelerometers mounted to the azimuth gimbal 4110 are mounted a first predetermined distance apart on the fore yoke and aft yoke of the azimuth gimbal 4110 above the azimuth torquer motor 4112 and azimuth bearing 4113. In this implementation, the servo controller is consistent with the servo controller 602. However, the servo controller generates a first collective acceleration based on a difference between the accelerations 4102 sensed by the first set or pair of sensors (e.g., two sensors 4102 associated with a mass of the azimuth gimbal yoke) divided by the first predetermined distance between the first set of sensors 4102a and 4102b. In FIG. 32, the gain response associated with the first collective angular acceleration from the first set or pair of accelerometers 4102 mounted on the azimuth gimbal yoke is referenced as 3202 and the phase response associated with the first collective angular acceleration from the first set or pair of accelerometers 4102 mounted on the azimuth gimbal yoke is referenced as 3204. As shown in FIG. 32, the gain 3202 and phase 3204 of the first collective angular acceleration generated by the servo controller 4108 based on the sensed accelerations of the first set of sensors 4102 shows a peak response associated with a structural mode caused by the flexibility of the gimbal structure 4100 at approximately 150 Hz.

Figure 33:
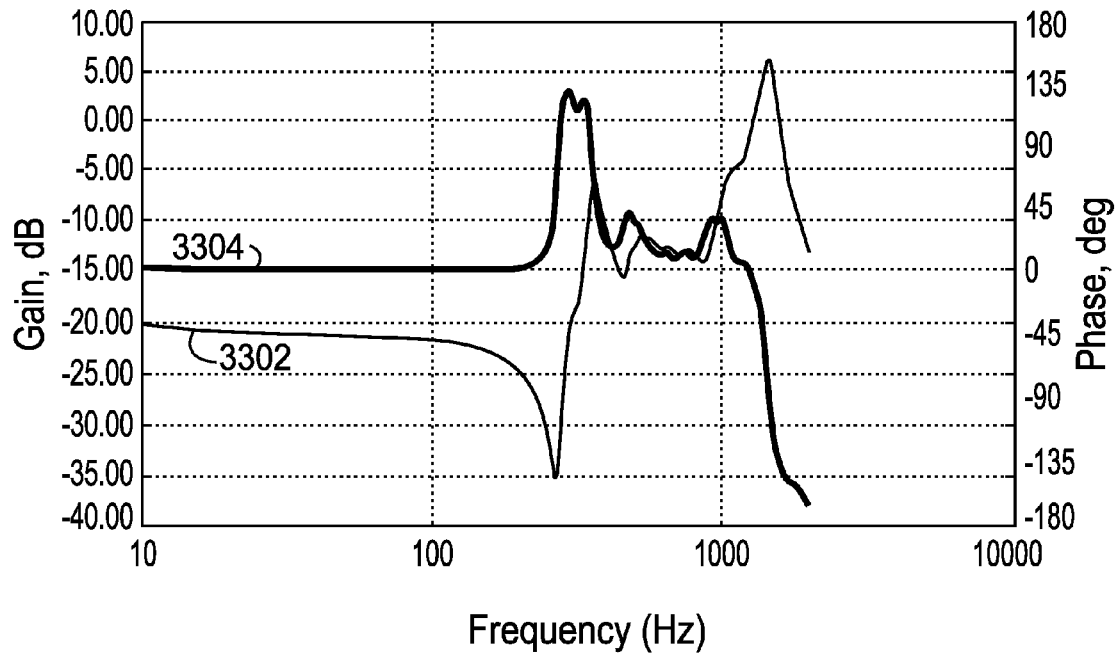
FIG. 33 is a graph depicting the torque to angular acceleration transfer function of the second set of accelerometers on the azimuth gimbal mounted on either side near the bottom of the gimbal showing the response of the flexible gimbal structure of FIG. 41 and used by the NASTRAN modeled servo controller described in reference to FIGS. 13 and 32 to control the flexible gimbal structure in accordance with the principles of the present invention.

FIG. 33 shows the torque to acceleration transfer function of the second set of accelerometers 4103, where the flexible gimbal structure is excited by the azimuth torquer motor 4112. As previously noted, the second set of accelerometers 4103 are mounted a second predetermined distance apart on the left and right sides of the arms of the azimuth gimbal yoke about 2 inches above the azimuth gimbal bearing assembly 4113. The servo controller 4108 and 4109 generates a second collective acceleration based on a difference between the accelerations sensed by the second set or pair of sensors 4103 divided by the second predetermined distance between the second set of sensors 4103. In FIG. 33, the gain response associated with the second collective angular acceleration from the second set or pair of accelerometers 4103 mounted on the left and right sides of the azimuth gimbal yoke is referenced as 3302 and the phase response associated with the first collective angular acceleration from the first set or pair of accelerometers is referenced as 3304. As shown in FIG. 33, the gain 3302 and phase 3304 of the second collective angular acceleration generated by the servo controller based on the sensed accelerations of the second set of sensors 4103 shows a peak response associated with another structural mode caused by the flexibility of the gimbal structure 4100 at approximately 170 Hz.

Figure 34:
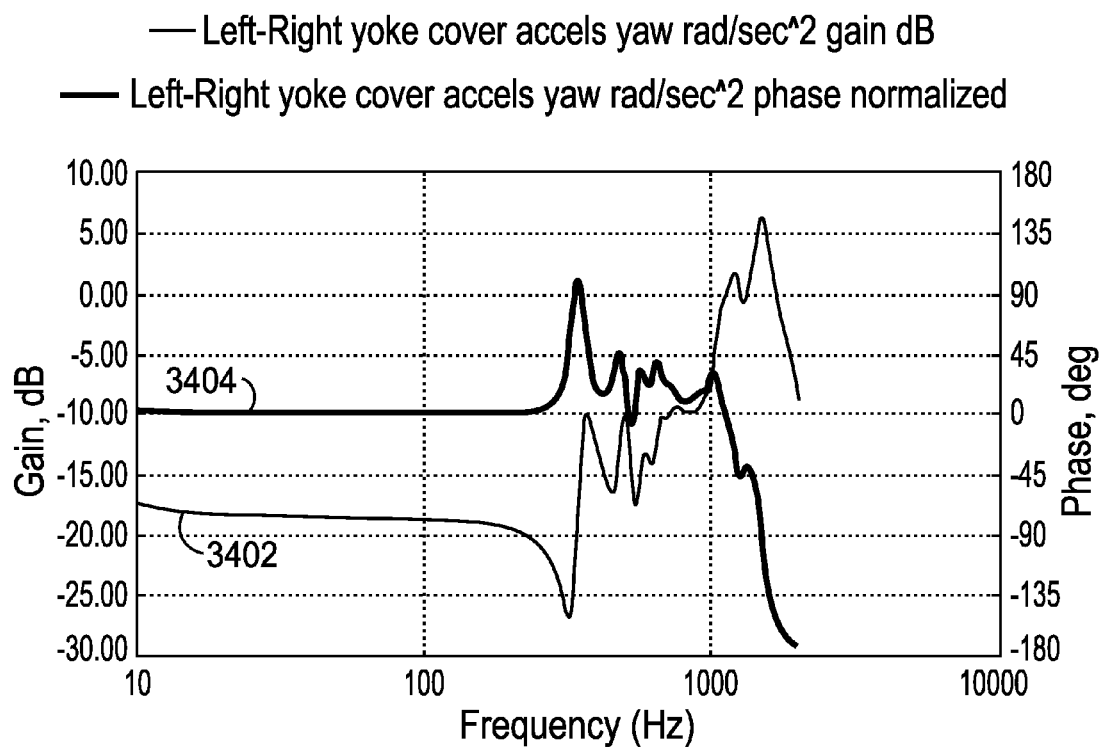
FIG. 34 is a graph depicting the torque to angular acceleration transfer function of the third set of accelerometers on the azimuth gimbal of FIG. 41 mounted on the azimuth gimbal near the elevation gimbal bearings showing the response of the flexible gimbal structure of FIG. 41 and used by the NASTRAN modeled servo controller described in reference to FIGS. 13 and 32 to control the flexible gimbal structure of the gimbal system in accordance with the principles of the present invention.

FIG. 34 shows the torque to acceleration transfer function of the third set of accelerometers 4104, where the flexible gimbal structure is excited by the azimuth torquer motor 4112. The servo controller generates a third collective acceleration based on a difference between the accelerations sensed by the third set or pair of sensors 4104 associated with a third mass of the azimuth gimbal yoke divided by the third predetermined distance between the third set of sensors 4104. In FIG. 34, the gain response associated with the third collective angular acceleration from the third set or pair of accelerometers 4104 mounted on the azimuth gimbal yoke arms is referenced as 3402 and the phase response associated with the first collective angular acceleration from the third set or pair of accelerometers 4104 mounted on the azimuth gimbal yoke arms is referenced as 3404. As shown in FIG. 34, the gain 3402 and phase 3404 of the third collective angular acceleration generated by the azimuth servo controller 4108 based on the sensed accelerations of the third set of sensors shows a peak response (i.e., associated with a structural mode) caused by the flexibility of the gimbal structure at approximately 230 Hz.

Figure 35:
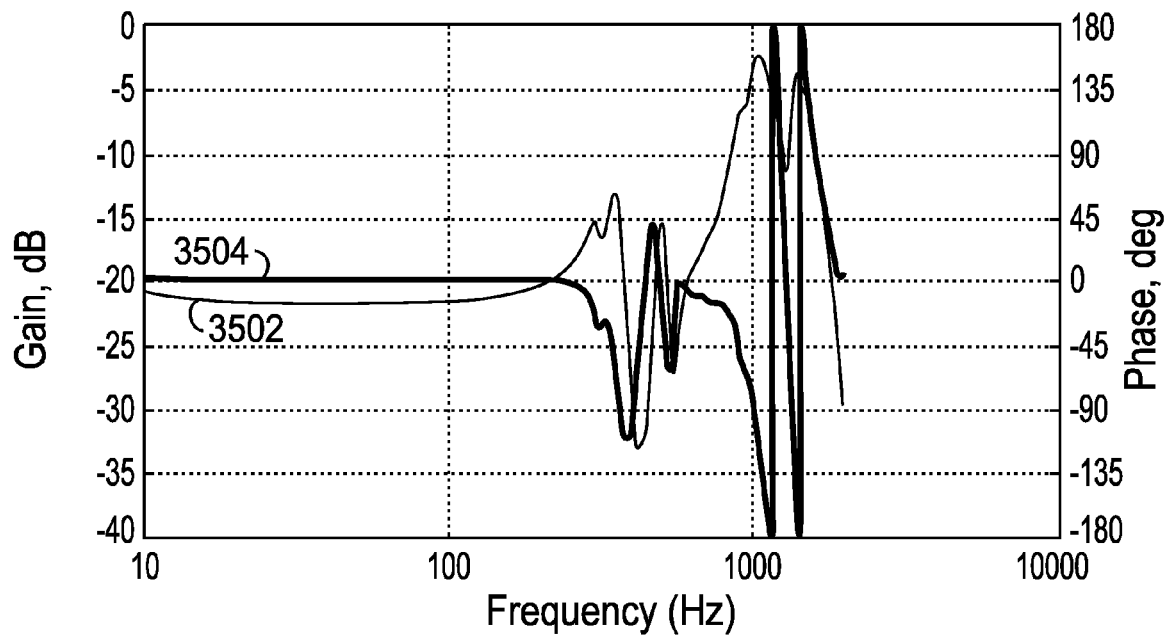
FIG. 35 is a graph depicting the torque to angular acceleration transfer function of the fourth set of accelerometers on the elevation gimbal of FIG. 41 mounted near the elevation bearings showing response the flexible gimbal structure of FIG. 41 and used by the NASTRAN modeled servo controller described in reference to FIGS. 13 and 32 to control the flexible gimbal structure in accordance with the principles of the present invention.

FIG. 35 shows the torque to acceleration transfer function of the fourth set of accelerometers (4105), where the flexible gimbal structure is excited by the azimuth torquer motor 4112. The fourth set of the accelerometers comprises the two accelerometers (4105) mounted a fourth predetermined distance apart on the left and right sides of the elevation gimbal ring 4111. The servo controller 4109 generates a fourth collective acceleration based on a difference between the accelerations 110d sensed by the fourth set or pair of sensors 4105 associated with a mass of the elevation gimbal ring divided by the fourth predetermined distance between the fourth set of sensors 4105. In FIG. 35, the gain response associated with the fourth collective angular acceleration from the fourth set or pair of accelerometers 4105 mounted on the elevation gimbal ring 4111 is referenced as 3502 and the phase response associated with the fourth collective angular acceleration from the fourth set or pair of accelerometers 4105 mounted on the elevation gimbal ring 4111 is referenced as 3504. As shown in FIG. 35, the gain 3502 and phase 3504 of the fourth collective angular acceleration generated by the servo controller based on the sensed accelerations of the fourth set of sensors shows a peak response (e.g., associated with another structural mode) caused by the flexibility of the gimbal structure at approximately 300 Hz.

Figure 36:
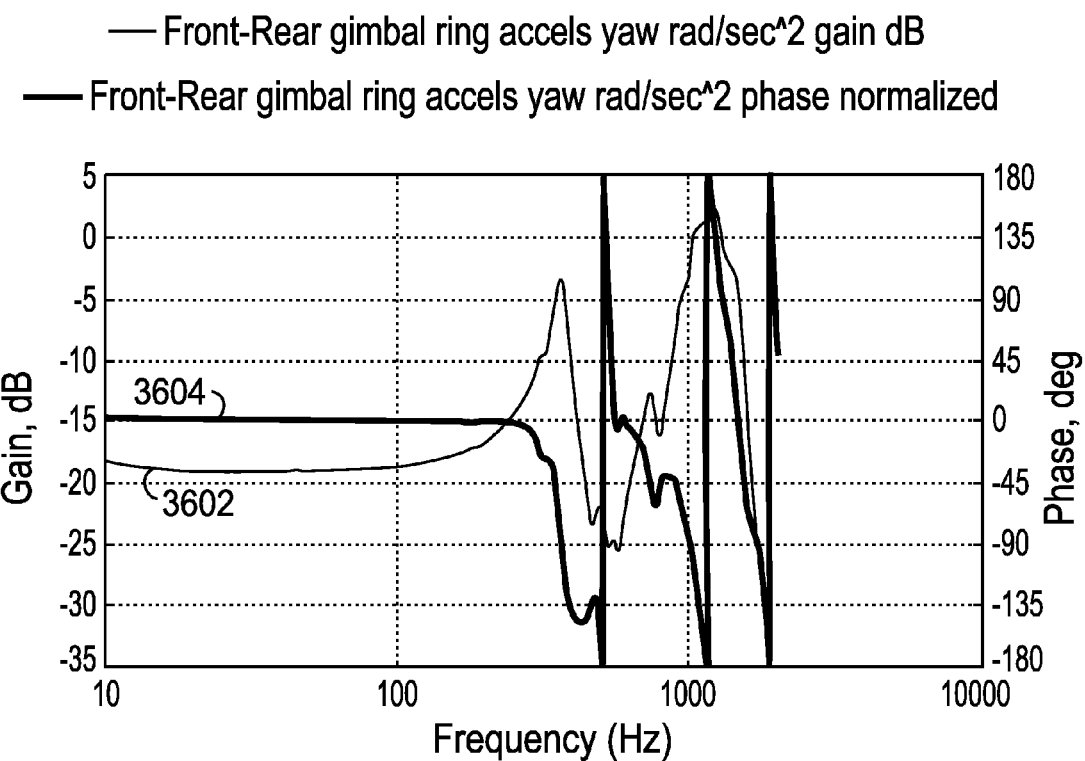
FIG. 36 is a graph depicting the torque to angular acceleration transfer function of the fifth set of accelerometers on the elevation gimbal of FIG. 41 mounted near the front and rear, respectively, of the elevation gimbal showing the response of the flexible gimbal structure of FIG. 41 and used by the NASTRAN modeled servo controller described in reference to FIGS. 13 and 32 to control the flexible gimbal structure in accordance with the principles of the present invention.

FIG. 36 shows the torque to acceleration transfer function of the fifth set of accelerometers 4106, where the flexible gimbal structure is excited by the azimuth torquer motor 4112. The fifth set of the accelerometers 4106 comprises the two accelerometers that are mounted a fifth predetermined distance apart on the fore and aft sides of the elevation gimbal ring 4111. The elevation servo controller 4109 generates a fifth collective acceleration based on a difference between the accelerations sensed by the fifth set or pair of sensors 4116 associated with another mass of the elevation gimbal ring 4111 divided by the fifth predetermined distance between the fifth set of sensors 4106. In FIG. 36, the gain response associated with the fifth collective angular acceleration from the fifth set or pair of accelerometers 4106 mounted on the elevation gimbal 4111 ring is referenced as 3602 and the phase response associated with the fifth collective angular acceleration from the fifth set or pair of accelerometers 4106 mounted on the elevation gimbal ring 4111 is referenced as 3604. As shown in FIG. 36, the gain 3602 and phase 3604 of the fifth collective angular acceleration generated by the elevation servo controller 4109 based on the sensed accelerations of the fifth set of sensors 4106 shows a peak response associated with another structural mode caused by the flexibility of the gimbal structure 4100 at approximately 350-400 Hz.

Figure 37:
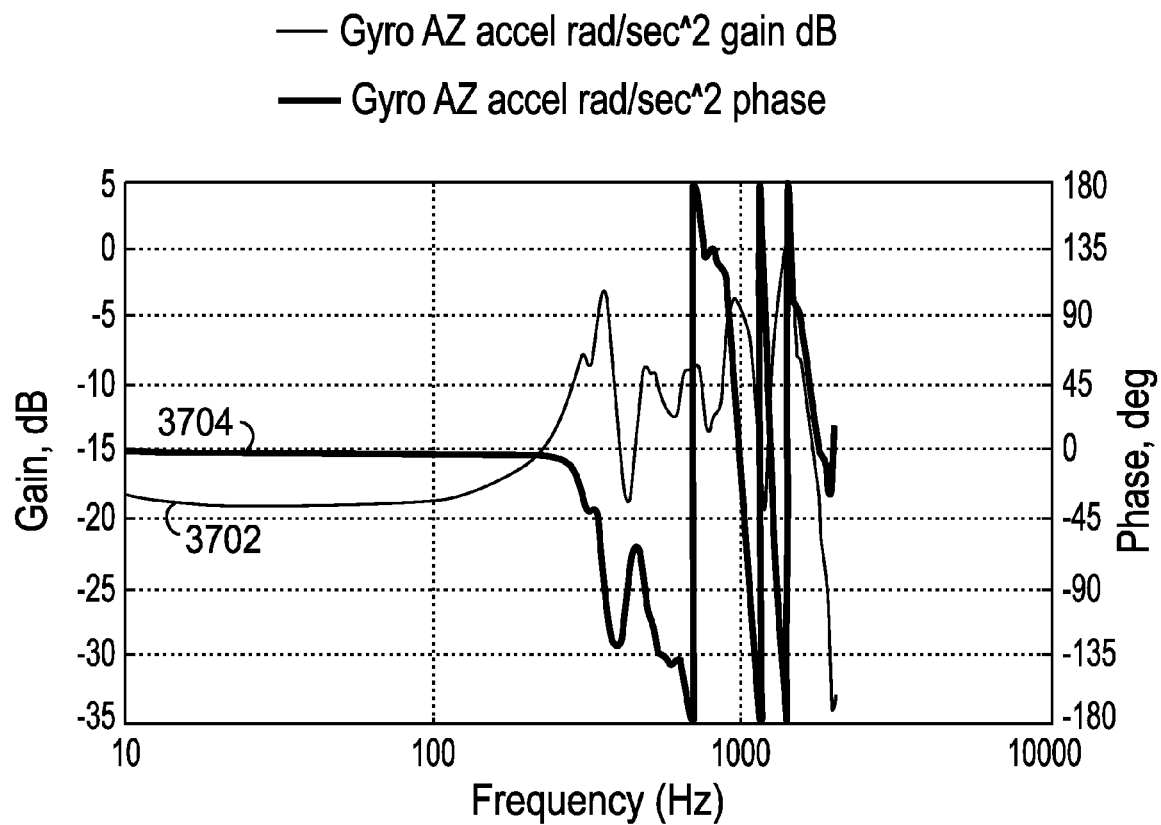
FIG. 37 is a graph depicting the torque to angular acceleration transfer function of the sixth set of accelerometers on the optical bed mounted on either side of the optical bed, which optical bed is attached to the elevation gimbal of the flexible gimbal structure of FIG. 41 and used by the NASTRAN modeled servo controller described in reference to FIGS. 13 and 32 to control the flexible gimbal structure in accordance with the principles of the present invention.

FIG. 37 shows the torque to acceleration transfer function of the sixth set of accelerometers 4107 corresponding to the gyro mounted on the optical bed 4116 that is attached to the elevation gimbal ring 4111. Again, the azimuth torquer motor 4112 is used for excitation of the flexible gimbal structure 4100. The elevation servo controller 4109 generates a sixth collective acceleration based on the acceleration sensed by the gyro sensor 4117 associated with a mass of the optical bed 4116. In FIG. 37, the gain response associated with the sixth collective angular acceleration from the gyro sensor 4117 mounted on the optical bed 4116 is referenced as 3702 and the phase response associated with the sixth collective angular acceleration from the gyro sensor 4117 is referenced as 3704. As shown in FIG. 37, the gain 3702 and phase 3704 of the sixth collective angular acceleration generated by the elevation servo controller 4109 based on the sensed accelerations of the gyro sensor 4117 mounted on the optical bed 4116 shows a peak response caused by the flexibility of the gimbal structure at approximately 350-400 Hz.

Figure 38:
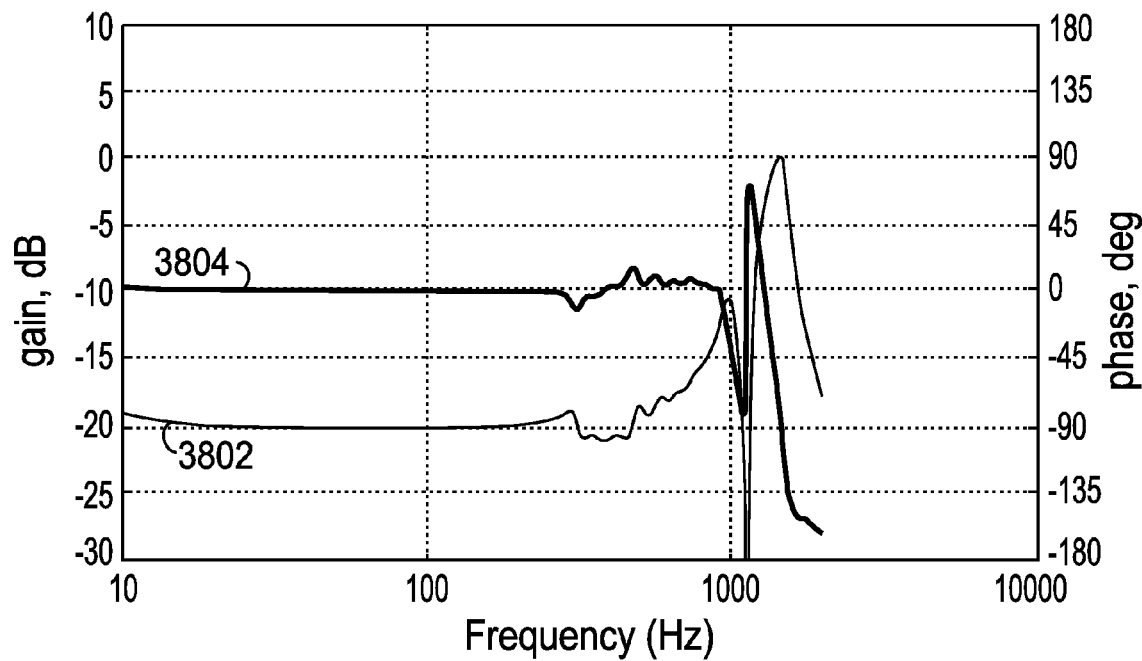
FIG. 38 is a graph of the transfer function of a combined weighted sum acceleration outputs generated by the servo controller (implemented consistent with the present invention using the NASTRAN finite element analysis modeling program) to control the flexible gimbal structure of FIG. 41 of the gimbal system versus the torque input signal from the azimuth gimbal torquer motor, where the combined weighted sum acceleration output is generated by the servo controller from the accelerations sensed by each set or pair of acceleration sensors mounted to the flexible gimbal structure.

FIG. 38 shows the torque to acceleration transfer function when all the accelerometers 4102-4107 (mounted on the azimuth gimbal and the elevation gimbal that comprise the flexible gimbal structure) are used by the servo controller to generate a compensation feedback signal 1312 based on the weighted sum (i.e., consistent with signal 710 in FIG. 7) of the collective accelerations of each set of the sensors mounted on the flexible gimbal structure 4100. In this implementation, the azimuth servo controller 4108 of the NASTRAN modeled servo system applied equal weighting coefficients of ⅙ to each sensed acceleration. These coefficients were optimized using an Excel program that calculated the open and closed loop transfer functions for the azimuth servo controller 4108 for the described flexible gimbal structure 4100. The azimuth torquer motor 4112 was used for excitation of the flexible gimbal structure 4100 and the angular acceleration from each set of sensors is measured by the servo controller 4108 and 4109 and used to generate the weighted sum of the collective angular accelerations of the respective set or pair of sensors. In FIG. 38, the gain response associated with the weight sum of the collective angular accelerations of all the sensor pairs is referenced as 3802 and the phase response associated with the weight sum of the collective angular accelerations of all the sensor pairs is referenced as 3804. As shown in FIG. 38, the resonant peaks associated with the structural modes of the flexible gimbal structure reflected in FIGS. 32-37 are effectively eliminated by the azimuth servo controller 4108 when the servo controller uses all the sensed accelerations of the sensor sets to generate a compensation feedback signal (e.g., 1312) based on the weighted sum of the respective collective accelerations derived by the azimuth servo controller 4108 from the respective sensor sets as described herein. In FIG. 38, the structural mode resonance at 1500 Hz is caused by the flexibility of the azimuth gimbal yoke between the azimuth motor 4112 and the first set of accelerometers 4102. This resonance may also be effectively eliminated from the azimuth servo controller 4108 by using one or more additional set of accelerometer sensors on the motor near the azimuth gimbal yoke exhibiting the flexure at 1500 Hz. Alternatively, the resonance at 1500 Hz may be compensated by the azimuth servo controller 4108 using a notch filter (not shown) to further adjust the compensation feedback signal 1312 generated based on the weighted sum of the sensed accelerations from each of the accelerometers mounted on the flexible gimbal structure.

Figure 39:
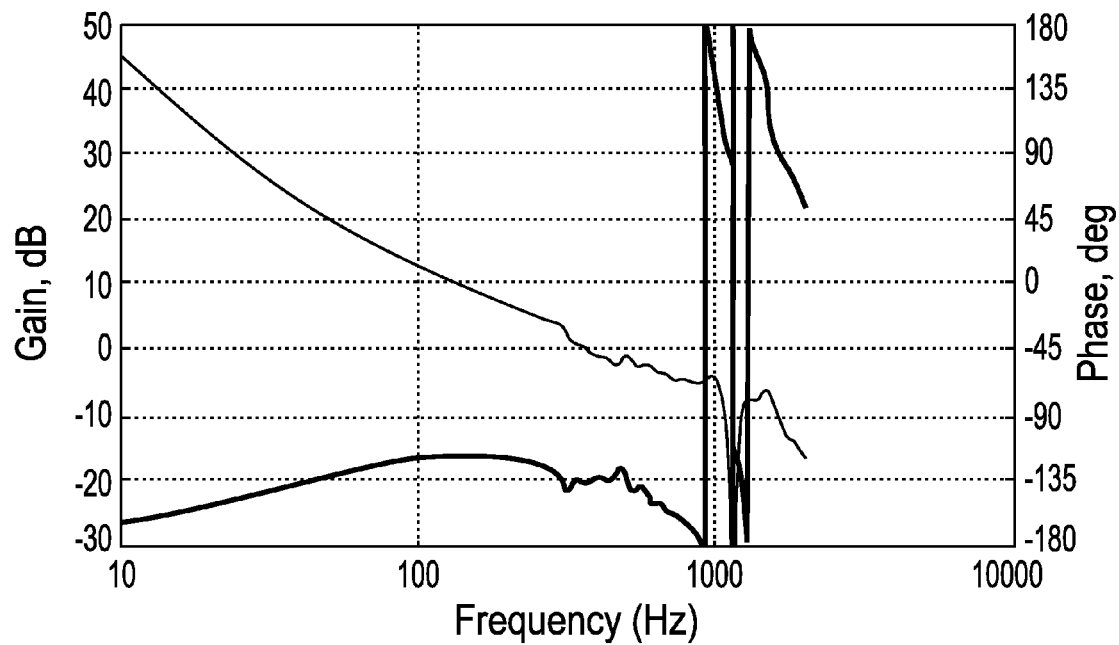
FIG. 39 is a graph depicting the open loop response of the servo system (implemented consistent with the principles of the present invention using the NASTRAN finite element analysis modeling program) to control the flexible gimbal structure of the gimbal system versus the torque input signal from the azimuth gimbal torquer motor, where the combined weighted sum acceleration outputs are generated by the servo controller from the accelerations sensed by each set of the acceleration sensors.

FIG. 39 shows the open loop response of the servo controller for the flexible gimbal structure 4100 when the servo controller 4108 and 4109 is configured to use all the accelerations of the sensor sets to generate respective collective accelerations and to generate a weighted sum compensation feedback signal based on the collective accelerations from each of the sensor sets as described above. In the open loop configuration, the weighted sum compensation feedback signal is not fed back to adjust the compensation signal supplied to the motor 4112.

Figure 40:
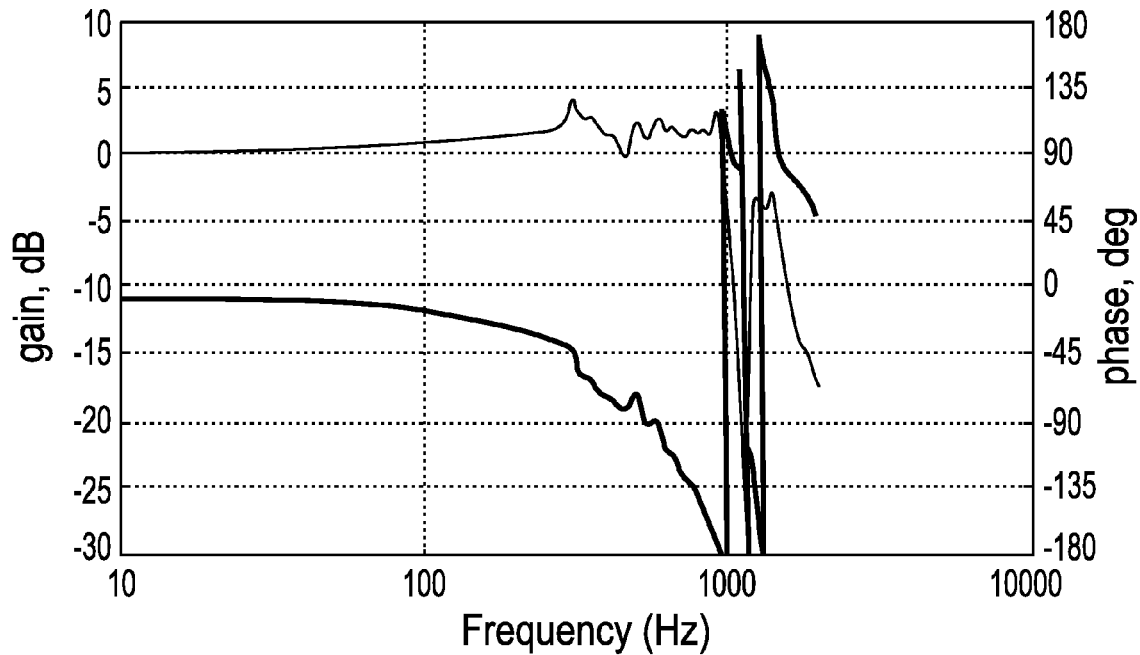
FIG. 40 is a graph depicting the closed loop response of the servo system (implemented consistent with the principles of the present invention using the NASTRAN finite element analysis modeling program) to control the flexible gimbal structure of the gimbal system versus the torque input signal from the azimuth gimbal torquer motor, where the combined weighted sum acceleration outputs are generated by the servo controller from the accelerations sensed by each set of the acceleration sensors.

FIG. 40 shows the closed loop response of the same servo controller 4108 and 4109 with the compensation feedback signal. As shown in FIG. 40, the zero dB crossover of the open loop response is at 350 Hz and the phase margin is 45 degrees, and the gain margin at 900 Hz is 5 dB, which are excellent margins.

Accordingly, servo systems consistent with the principles of the present invention enable structural mode deformations in flexible structure controlled by a servo controller or mechanism of the servo system to be eliminated when the servo controller uses sensed accelerations from accelerometer sensors mounted on the flexible structure to generate a weighted acceleration sum compensation feedback signal. A servo controller implemented consistent with the principles of the present invention may be used to control structural mode deformations in flexible gimbal structures or another flexible structure that is driven by a linear or torquer motor. Moreover, other types of sensors other than accelerometers may be employed in a servo system and with a servo controller implemented consistent with the principles of the present invention as described herein. For example, each accelerometer sensor 104 may be an angular accelerometer, potentiometer, tachometer, encoder, resolver, gyro or other sensor that measures acceleration, rate or displacement.

Accordingly, while various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A servo system for controlling movement of a flexible structure having a plurality of masses and an element coupling two of the masses, the element functioning as a spring when the flexible structure is subject to a linear or rotational input at or above a first frequency at which the element exhibits flexure, the servo system comprising:

a first pair of sensors disposed relative to a first of the two masses, a first of the first pair of sensors to sense a first acceleration of the first mass, a second of the first pair of sensors to sense a second acceleration of the first mass;

a second pair of sensors disposed relative to a second of the two masses, a first of the second pair of sensors to sense a second acceleration of the second mass, a second of the second pair of sensors to sense a second acceleration of the second mass, the first pair of sensors being spaced a first predetermined distance apart relative to the first mass, the second pair of sensors being spaced a second predetermined distance apart relative to the second mass;

a motor having a movement input and operatively configured to output one of a linear or rotational force on the first mass based on a movement signal present on the movement input; and a servo controller operatively configured to receive the first and second accelerations from the first pair of sensors and the first and second accelerations from the second pair of sensors, generate a first collective acceleration based on a difference between the first and second accelerations sensed by the first pair of sensors divided by the first predetermined distance, generate a second collective acceleration based on a difference between the first and second accelerations sensed by the second pair of sensors divided by the second predetermined distance, generate a compensation feedback signal based on the sum of the first collective acceleration and the second collective acceleration, and output the movement signal to the movement input of the motor based on the compensation feedback signal.

2. The servo system as set forth in claim 1, wherein the movement input of the motor is one of a rate input or an acceleration input and the movement signal is a corresponding one of a rate signal or an acceleration signal.

3. The servo system as set forth in claim 1, wherein the first mass has a first inertia, the second mass has a second inertia, and the servo controller includes:

a first gain amplifier operatively configured to receive the first collective acceleration and generate a first weighted collective acceleration corresponding to the proportion of a first inertia and the sum of the first inertia and the second inertia;

a second gain amplifier operatively configured to receive the second collective acceleration and generate a second weighted collective acceleration corresponding to the proportion of a second inertia and the sum of the first inertia and the second inertia; and a summer operatively configured to receive each of the weighted collective accelerations and generate the compensation feedback signal based on the sum of each of the received weighted collective accelerations.

4. The servo system as set forth in claim 1, wherein the servo controller includes a first summer operatively configured to receive the compensation feedback signal and a movement command for the motor and to output the movement signal to the motor based on the difference of the movement command and the compensation feedback signal.

5. A servo system for controlling movement of a flexible structure having a plurality of masses and a plurality of elements, each element coupling a respective two of the masses and functioning as a spring when the flexible structure is subject to a linear or rotational input at or above a corresponding input frequency at which the respective element exhibits flexure, the servo system comprising:

a plurality of sensors each disposed relative to a respective one of the masses to sense an acceleration of the respective mass;

a motor having a torque input and operatively configured to output one of a linear or rotational force on the first mass based on a torque signal present on the torque input; and a servo controller including:

a plurality of gain amplifiers operatively configured to receive the respective accelerations and generate a weighted acceleration corresponding to the proportion of each of the respective inertias and the sum of the inertias, a summer operatively configured to receive each of the weighted accelerations and generate the compensation feedback signal based on the sum of each of the received weighted accelerations, the servo controller operatively configured to output the torque signal to the torque input of the motor based on the compensation feedback signal.

6. The servo system as set forth in claim 5, wherein the servo controller is further operatively configured to receive a movement command for the motor and to output the torque input to the motor based on the difference of the movement command and the compensation feedback signal.

7. The method as set forth in claim 6, wherein the first mass has a first inertia and the second mass has a second inertia, and the method further comprises:

generating a first weighted collective acceleration corresponding to the proportion of a first inertia and the sum of the first inertia and the second inertia;

generating a second weighted collective acceleration corresponding to the proportion of a second inertia and the sum of the first inertia and the second inertia; and generating the compensation feedback signal based on the sum of each of the received weighted collective accelerations.

8. A method for controlling movement of a flexible structure having a plurality of masses and an element coupling two of the masses, the element functioning as a spring when the flexible structure is subject to a linear or rotational input at or above a first frequency at which the element exhibits flexure, the method comprising:

providing a first pair of sensors disposed relative to a first of the two masses to sense a first acceleration of the first mass by a first of the first pair of sensors and to sense a second acceleration of the first mass by a second of the first pair of sensors;

providing a second pair of sensors disposed relative to a second of the two masses to sense a second acceleration of the second mass by a first of the second pair of sensors and to sense a second acceleration of the second mass by a second of the second pair of sensors, the first pair of sensors being spaced a first predetermined distance apart relative to the first mass, the second pair of sensors being spaced a second predetermined distance apart relative to the second mass;

providing a motor having a movement input and operatively configured to output one of a linear or rotational force on the first mass based on a movement signal present on the movement input;

generating a first collective angular acceleration based on a difference between the first and second accelerations sensed by the first pair of sensors divided by the first predetermined distance;

generating a second collective angular acceleration based on a difference between the first and second accelerations sensed by the second pair of sensors divided by the second predetermined distance;

generating the compensation feedback signal based on the sum of the first collective angular acceleration and the second collective angular acceleration; and outputting the movement signal to the movement input of the motor based on the compensation feedback signal.

9. The method as set forth in claim 8, further comprising receiving a movement command for the motor, wherein the step of outputting the movement signal to the motor further comprises generating the movement signal based on the difference of the movement command and the compensation feedback signal.

10. A servo system for controlling movement of a flexible structure having the mass (or inertia) and spring distributed continuously throughout the structure such that when the flexible structure is subject to a linear or rotational input at or above a first frequency at which the structure exhibits flexure, the structure acts as both a spring and an inertia, the servo system comprising:

a motor having a movement input and operatively configured to output one of a linear or rotational force on the flexible structure based on a movement signal present on the movement input;

a plurality of pairs of sensors disposed along the structure with the first pair of sensors being positioned as near as possible to the motor to sense a plurality of angular accelerations of the structure, each pair of accelerometers displaced a specified distance, the accelerometers configured to generate and output respective accelerations; and a servo controller operatively configured to receive the respective accelerations from the sensors and generate angular accelerations by differencing the accelerometer outputs of each respective pair of sensors and dividing the differences by the distance between the respective pairs of accelerometers and using these angular accelerations to generate a compensation feedback signal based on a weighted sum of the angular accelerations, and output the movement signal to the movement input of the motor based on the compensation feedback signal. movement input of the motor based on the compensation feedback signal.

* * * * *